US012798105B2

(12) United States Patent
Shimada

(10) Patent No.: US 12,798,105 B2
(45) Date of Patent: Nov. 17, 2026

(54) METHOD FOR GENERATING CUT POINT DATA, SYSTEM FOR GENERATING CUT POINT DATA, AND AGRICULTURAL MACHINE

(71) Applicant: Kubota Corporation, Osaka (JP)

(72) Inventor: Kotaro Shimada, Fremont, CA (US)

(73) Assignee: KUBOTA CORPORATION, Osaka (JP)

( * ) Notice: Subject to any disclaimer, the term of this patent is extended or adjusted under 35 U.S.C. 154(b) by 33 days.

(21) Appl. No.: 18/956,573

(22) Filed: Nov. 22, 2024

(65) Prior Publication Data

US 2025/0205901 A1 Jun. 26, 2025

Related U.S. Application Data

(60) Provisional application No. 63/614,737, filed on Dec. 26, 2023.

(51) Int. Cl.
*B25J 9/16* (2006.01)
*A01G 3/08* (2006.01)
*A01G 17/00* (2006.01)

(52) U.S. Cl.
CPC ............ *B25J 9/1697* (2013.01); *A01G 3/085* (2013.01); *A01G 17/00* (2013.01)

(58) Field of Classification Search
CPC . B25J 9/1697; B25J 5/007; B25J 9/162; B25J 9/1628; B25J 9/163; B25J 9/1656; B25J 9/1664; B25J 9/1669; B25J 9/1679; B25J 11/0055; A01G 3/085; A01G 17/00; A01G 17/005; A01G 17/02; A01G 3/0408;

(Continued)

(56) References Cited

U.S. PATENT DOCUMENTS

2013/0199089 A1* 8/2013 George .................... A01G 3/08 47/1.43
2016/0057940 A1* 3/2016 Lyons ...................... A01G 3/02 47/1.43

(Continued)

OTHER PUBLICATIONS

Epee et al., "Characterising retained dormant shoot attributes to support automated cane pruning on *Vitis vinifera* L. cv. Sauvignon Blanc", Australian Journal of Grape and Wine Research 28, 2022, pp. 508-520.

(Continued)

*Primary Examiner* — Esvinder Singh
(74) *Attorney, Agent, or Firm* — Keating & Bennett, LLP

(57) ABSTRACT

A method for generating cut-point data including information indicating a three-dimensional position of a point on a cane of a fruit tree where the cane is to be cut off, includes, for each of one or more canes of the fruit tree, acquiring a measurement value(s) concerning one or more attributes including an attribute concerning vigor of the fruit tree, based on sensor data of the one or more canes, determining the one or more canes each as a cane to be removed or a cane to be retained based on the measurement value(s), determining a number of buds to be retained on each cane determined as a cane to be retained, generating the cut-point data for each cane determined as a cane to be removed, and based on the number of buds to be retained, generating the cut-point data for each cane determined as a cane to be retained.

20 Claims, 66 Drawing Sheets

(58) Field of Classification Search
CPC ................ A01G 3/0435; A01G 17/023; A01G 2003/005; G05B 2219/45106
See application file for complete search history.

(56) References Cited

U.S. PATENT DOCUMENTS

| | | | | |
|---|---|---|---|---|
| 2016/0205872 | A1* | 7/2016 | Chan | G05D 1/0011 |
| 2020/0120886 | A1* | 4/2020 | Geltner | B25J 9/1697 |
| 2022/0110263 | A1* | 4/2022 | Haldewang | H04N 23/90 |
| 2023/0288936 | A1 | 9/2023 | Yuasa et al. | |
| 2024/0116173 | A1 | 4/2024 | Anattasakul et al. | |
| 2024/0116193 | A1 | 4/2024 | Perrin et al. | |
| 2024/0282105 | A1 | 8/2024 | Bharathwaj et al. | |
| 2025/0165998 | A1* | 5/2025 | Fridman | G06Q 50/02 |
| 2025/0176478 | A1* | 6/2025 | Fang | A01G 17/023 |

OTHER PUBLICATIONS

Shimada, "Method for Generating Cut Point Data, System for Generating Cut Point Data, and Agricultural Machine", U.S. Appl. No. 18/956,518, filed Nov. 22, 2024.
Shimada, "Method for Generating Cut Point Data, System for Generating Cut Point Data, and Agricultural Machine", U.S. Appl. No. 18/956,522, filed Nov. 22, 2024.
Shimada, "Method for Generating Cut Point Data, System for Generating Cut Point Data, and Agricultural Machine", U.S. Appl. No. 18/956,541, filed Nov. 22, 2024.
Shimada, "Method for Generating Cut Point Data, System for Generating Cut Point Data, and Agricultural Machine", U.S. Appl. No. 18/956,549, filed Nov. 22, 2024.
Shimada, "Method for Generating Cut Point Data, System for Generating Cut Point Data, and Agricultural Machine", U.S. Appl. No. 18/956,556, filed Nov. 22, 2024.
Shimada, "Method for Generating Cut Point Data, System for Generating Cut Point Data, and Agricultural Machine", U.S. Appl. No. 18/956,569, filed Nov. 22, 2024.
Shimada, "Method for Generating Cut Point Data, System for Generating Cut Point Data, and Agricultural Machine", U.S. Appl. No. 18/956,577, filed Nov. 22, 2024.
Shimada, "Method, System, and Agricultural Machine", U.S. Appl. No. 18/956,581, filed Nov. 22, 2024.

* cited by examiner

*FIG. 14A*

| | CANE 58_1 | CANE 58_2 | CANE 58_3 | CANE 58_4 | CANE 58_5 | CANE 58_6 |
|---|---|---|---|---|---|---|
| FACTOR SCORE $F_A$ REGARDING ATTRIBUTE A | | | | | | |
| FACTOR SCORE $F_B$ REGARDING ATTRIBUTE B | | | | | | |
| FACTOR SCORE $F_C$ REGARDING ATTRIBUTE C | | | | | | |
| FACTOR SCORE $F_D$ REGARDING ATTRIBUTE D | | | | | | |
| FACTOR SCORE $F_E$ REGARDING ATTRIBUTE E | | | | | | |
| FACTOR SCORE $F_F$ REGARDING ATTRIBUTE F | | | | | | |
| TOTAL SCORE Ts | | | | | | |

*FIG.14B*

| PRIORITY LEVEL | PRIORITY LEVEL WEIGHT $W_P(n)$ FOR $n^{th}$ PRIORITY LEVEL | ATTRIBUTE | FACTOR SCORE $F_S(n)$ REGARDING ATTRIBUTE of $n^{th}$ PRIORITY LEVEL |
|---|---|---|---|
| 1st | $W_P(1)=1.5$ | ATTRIBUTE D | $F_S(1)=F_D$ |
| 2nd | $W_P(2)=1.4$ | ATTRIBUTE A | $F_S(2)=F_A$ |
| 3rd | $W_P(3)=1.3$ | ATTRIBUTE B | $F_S(3)=F_B$ |
| 4th | $W_P(4)=1.2$ | ATTRIBUTE C | $F_S(4)=F_C$ |
| 5th | $W_P(5)=1.1$ | ATTRIBUTE E | $F_S(5)=F_E$ |
| 6th | $W_P(6)=1.0$ | ATTRIBUTE F | $F_S(6)=F_F$ |

TOTAL SCORE Ts $$T_S = \sum_{n=1}^{6} F_S(n) \times W_P(n)$$

*FIG. 14C*

| | CANE 58_1 | CANE 58_2 | CANE 58_3 | CANE 58_4 | CANE 58_5 | CANE 58_6 |
|---|---|---|---|---|---|---|
| FACTOR SCORE $F_A$ REGARDING ATTRIBUTE A | | | | | | |
| FACTOR SCORE $F_B$ REGARDING ATTRIBUTE B | | | | | | |
| FACTOR SCORE $F_C$ REGARDING ATTRIBUTE C | | | | | | |
| FACTOR SCORE $F_D$ REGARDING ATTRIBUTE D | 1.1 | | | | | 1.2 |
| FACTOR SCORE $F_E$ REGARDING ATTRIBUTE E | | | | | | |
| FACTOR SCORE $F_F$ REGARDING ATTRIBUTE F | | | | | | |
| TOTAL SCORE Ts | 65 | 48 | 30 | 33 | 47 | 65 |

*FIG. 14D*

| PRIORITY LEVEL | PRIORITY LEVEL WEIGHT $W_P(n)$ FOR $n^{th}$ ATTRIBUTE | ATTRIBUTE | FACTOR SCORE $F_S(n)$ REGARDING $n^{th}$ ATTRIBUTE |
|---|---|---|---|
| 1st | $W_P(1)=1.5$ | ATTRIBUTE D | $F_S(1)=F_D$ |
| 2nd | $W_P(2)=1.4$ | ATTRIBUTE A | $F_S(2)=F_A$ |
| 2nd | $W_P(3)=1.4$ | ATTRIBUTE B | $F_S(3)=F_B$ |
| 3rd | $W_P(4)=1.3$ | ATTRIBUTE C | $F_S(4)=F_C$ |
| 4th | $W_P(5)=1.2$ | ATTRIBUTE E | $F_S(5)=F_E$ |
| 5th | $W_P(6)=1.1$ | ATTRIBUTE F | $F_S(6)=F_F$ |

TOTAL SCORE Ts $$T_S = \sum_{n=1}^{6} F_S(n) \times W_P(n)$$

FIG. 14E

| PRIORITY LEVEL | PRIORITY LEVEL WEIGHT $W_P(n)$ FOR $n^{th}$ PRIORITY LEVEL | ATTRIBUTE | FACTOR SCORE $F_S(n)$ REGARDING ATTRIBUTE of $n^{th}$ PRIORITY LEVEL |
|---|---|---|---|
| 1st | $W_P(1)=1.5$ | ATTRIBUTE D | $F_S(1)=F_D$ |
| 2nd | $W_P(2)=1.4$ | ATTRIBUTE B | $F_S(2)=F_B$ |
| 3rd | $W_P(3)=1.3$ | ATTRIBUTE C | $F_S(3)=F_C$ |
| 4th | $W_P(4)=1.2$ | ATTRIBUTE E | $F_S(4)=F_E$ |
| 5th | $W_P(5)=1.1$ | ATTRIBUTE F | $F_S(5)=F_F$ |
| 6th | $W_P(6)=0$ | ATTRIBUTE A | $F_S(6)=F_A$ |

TOTAL SCORE Ts $$T_S = \sum_{n=1}^{6} F_S(n) \times W_P(n)$$

*FIG. 16A*

T3a

| CANE | MEASUREMENT VALUE CONCERNING ATTRIBUTE x |
|---|---|
| CANE a | 1.3 |
| CANE b | 1.4 |
| CANE c | 2.0 |
| CANE d | 1.9 |
| CANE e | 1.8 |

T3b

| CLASS REGARDING ATTRIBUTE x | EVALUATION CRITERION |
|---|---|
| Good | MEASUREMENT VALUE IS 3.0 OR ABOVE |
| Okay | MEASUREMENT VALUE IS 2.0 OR ABOVE BUT BELOW 3.0 |
| Bad | MEASUREMENT VALUE IS BELOW 2.0 |

T3c

| CANE | RANK REGARDING ATTRIBUTE x | CLASS REGARDING ATTRIBUTE x |
|---|---|---|
| CANE a | 5 | Bad |
| CANE b | 4 | Bad |
| CANE c | 1 | Okay |
| CANE d | 2 | Bad |
| CANE e | 3 | Bad |

*FIG.16B*

T3d

| CLASS REGARDING ATTRIBUTE x | SCORE Sx REGARDING ATTRIBUTE x | EVALUATION CRITERION |
| --- | --- | --- |
| Good | 3 | MEASUREMENT VALUE IS 3.0 OR ABOVE |
| Okay | 2 | MEASUREMENT VALUE IS 2.0 OR ABOVE BUT BELOW 3.0 |
| Bad | 1 | MEASUREMENT VALUE IS BELOW 2.0 |

T3e

| RESULT OF RELATIVE EVALUATION (RANK) FOR CANES THAT ARE CLASSIFIED INTO SAME CLASS | COEFFICIENT Wr(n) FOR nth RELATIVE EVALUATION |
| --- | --- |
| 1st | 1.20 |
| 2nd | 1.15 |
| 3rd | 1.10 |
| 4th | 1.05 |
| 5th | 1.00 |
| IF THERE IS ONLY ONE CANE THAT IS CLASSIFIED INTO A SAME CLASS, Wr=1 | |

T3f

| CANE | CLASS FOR CANE m REGARDING ATTRIBUTE x | SCORE Sx(m) FOR CANE m REGARDING ATTRIBUTE x | COEFFICIENT Wr(m) FOR CANE m |
| --- | --- | --- | --- |
| CANE a | Bad | 1 | 1.05 |
| CANE b | Bad | 1 | 1.10 |
| CANE c | Okay | 2 | 1 |
| CANE d | Bad | 1 | 1.20 |
| CANE e | Bad | 1 | 1.15 |

FACTOR SCORE Fx(m) FOR CANE m REGARDING ATTRIBUTE x $$F_x(m) = S_x(m) \times W_r(m)/3$$

FIG.17A

| ATTRIBUTES CONCERNING BUDS ON THE CANE | ATTRIBUTES OTHER THAN BUDS |
|---|---|
| SIZE OF BUDS ON THE CANE | COLOR OF THE CANE |
| DIRECTION IN WHICH BUDS ON THE CANE ARE FACING | DIRECTION IN WHICH THE CANE EXTENDS |
| LENGTH BETWEEN NODES OF THE CANE | THICKNESS OF THE CANE |
| – | HEIGHT OF THE BASE OF THE CANE |
| – | LENGTH OF THE CANE |

FIG.17B

| ATTRIBUTES HAVING DIFFERENT EVALUATION CRITERIA DEPENDING ON CULTIVATION METHOD OF THE FRUIT TREE | ATTRIBUTES HAVING UNCHANGING EVALUATION CRITERIA IRRESPECTIVE OF CULTIVATION METHOD OF THE FRUIT TREE |
|---|---|
| DIRECTION IN WHICH THE CANE EXTENDS | COLOR OF THE CANE |
| HEIGHT OF THE BASE OF THE CANE | THICKNESS OF THE CANE |
| DIRECTION IN WHICH BUDS ON THE CANE ARE FACING | SIZE OF BUDS ON THE CANE |
| LENGTH OF THE CANE | – |
| LENGTH BETWEEN NODES OF THE CANE | – |

FIG. 17C

| ATTRIBUTES CONCERNING VIGOR OF THE FRUIT TREE | OTHER ATTRIBUTES |
|---|---|
| THICKNESS OF THE CANE | COLOR OF THE CANE |
| SIZE OF BUDS ON THE CANE | DIRECTION IN WHICH THE CANE EXTENDS |
| LENGTH BETWEEN NODES OF THE CANE | HEIGHT OF THE BASE OF THE CANE |
| – | DIRECTION IN WHICH BUDS ON THE CANE ARE FACING |
| – | LENGTH OF THE CANE |

*FIG.22B*

Tb1

| CLASS CONCERNING DIRECTION IN WHICH THE CANE EXTENDS | SCORE $S_B$ REGARDING DIRECTION IN WHICH THE CANE EXTENDS | EVALUATION CRITERION |
|---|---|---|
| 3 | 3 | ANGLE OF TILT θp IS SMALLER THAN PREDETERMINED RANGE |
| 2 | 2 | ANGLE OF TILT θp is WITHIN PREDETERMINED RANGE |
| 1 | 1 | ANGLE OF TILT θp IS LARGER THAN PREDETERMINED RANGE |

Tb2

| CLASS CONCERNING DIRECTION IN WHICH THE CANE EXTENDS | SCORE $S_B$ REGARDING DIRECTION IN WHICH THE CANE EXTENDS | EVALUATION CRITERION |
|---|---|---|
| 5 | 5 | ANGLE OF TILT θp IS SMALLER THAN PREDETERMINED RANGE AND AZIMUTH ANGLE θa IS WITHIN FIRST RANGE Ra CONTAINING 0° AND 180° |
| 4 | 4 | ANGLE OF TILT θp IS SMALLER THAN PREDETERMINED RANGE AND AZIMUTH ANGLE θa IS WITHIN SECOND RANGE Rb CONTAINING 90° AND 270° |
| 3 | 3 | ANGLE OF TILT θp IS WITHIN PREDETERMINED RANGE AND AZIMUTH ANGLE θa IS WITHIN FIRST RANGE Ra |
| 2 | 2 | ANGLE OF TILT θp IS WITHIN PREDETERMINED RANGE AND AZIMUTH ANGLE θa IS WITHIN SECOND RANGE Rb |
| 1 | 1 | ANGLE OF TILT θp IS LARGER THAN PREDETERMINED RANGE |

| CLASS CONCERNING THICKNESS OF THE CANE | SCORE $S_C$ REGARDING THICKNESS OF THE CANE | EVALUATION CRITERION |
|---|---|---|
| 3 | 3 | THICKNESS OF THE CANE IS WITHIN PREDETERMINED RANGE |
| 2 | 2 | THICKNESS OF THE CANE IS LARGER THAN PREDETERMINED RANGE |
| 1 | 1 | THICKNESS OF THE CANE IS SMALLER THAN PREDETERMINED RANGE |

*FIG.22E*

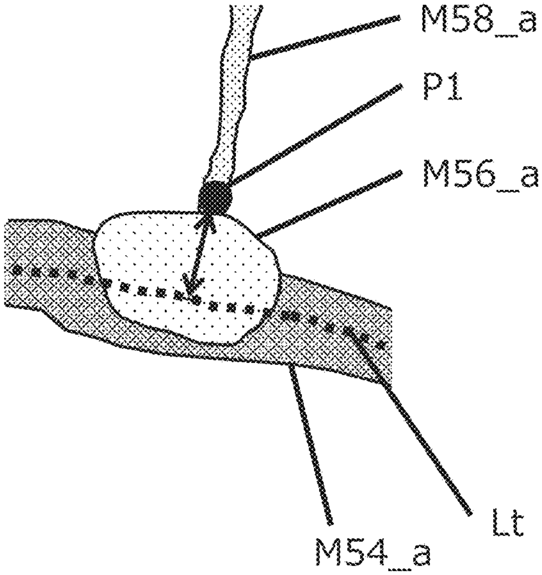

*FIG.22F*

| CLASS CONCERNING HEIGHT OF THE BASE OF THE CANE | SCORE $S_D$ REGARDING HEIGHT OF THE BASE OF THE CANE | EVALUATION CRITERION |
|---|---|---|
| 3 | 3 | HEIGHT OF THE BASE OF THE CANE FROM THE CORDON OR HEAD IS WITHIN PREDETERMINED RANGE |
| 2 | 2 | HEIGHT OF THE BASE OF THE CANE FROM THE CORDON OR HEAD IS SMALLER THAN PREDETERMINED RANGE |
| 1 | 1 | HEIGHT OF THE BASE OF THE CANE FROM THE CORDON OR HEAD IS LARGER THAN PREDETERMINED RANGE |

| CLASS CONCERNING SIZE OF BUDS | SCORE $S_E$ REGARDING SIZE OF BUDS | EVALUATION CRITERION |
|---|---|---|
| 3 | 3 | SIZE OF BUDS IS WITHIN PREDETERMINED RANGE |
| 2 | 2 | SIZE OF BUDS IS LARGER THAN PREDETERMINED RANGE |
| 1 | 1 | SIZE OF BUDS IS SMALLER THAN PREDETERMINED RANGE |

| CLASS CONCERNING DIRECTION IN WHICH BUDS ON THE CANE ARE FACING | SCORE $S_F$ CONCERNING DIRECTION IN WHICH BUDS ON THE CANE ARE FACING | EVALUATION CRITERION |
|---|---|---|
| 2 | 2 | MEAN VALUE OF DIRECTIONS IN WHICH BUDS ON THE CANE ARE FACING IS UPWARD FROM THE HORIZONTAL PLANE |
| 1 | 1 | MEAN VALUE OF DIRECTIONS IN WHICH BUDS ON THE CANE ARE FACING IS DOWNWARD FROM THE HORIZONTAL PLANE |

| CLASS CONCERNING LENGTH OF THE CANE | SCORE $S_G$ REGARDING LENGTH OF THE CANE | EVALUATION CRITERION |
|---|---|---|
| 3 | 3 | LENGTH OF THE CANE IS WITHIN PREDETERMINED RANGE |
| 2 | 2 | LENGTH OF THE CANE IS LONGER THAN PREDETERMINED RANGE |
| 1 | 1 | LENGTH OF THE CANE IS SHORTER THAN PREDETERMINED RANGE |

FIG.22M

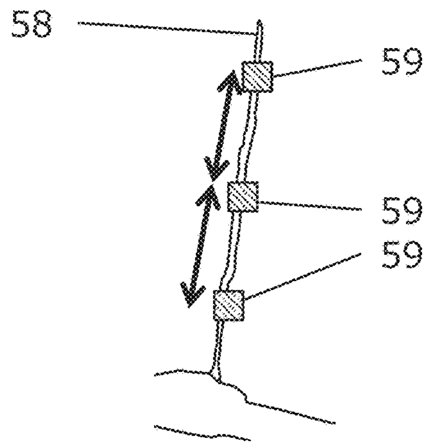

FIG.22N

| CLASS CONCERNING LENGTH BETWEEN NODES OF THE CANE | SCORE $S_H$ REGARDING LENGTH BETWEEN NODES OF THE CANE | EVALUATION CRITERION |
|---|---|---|
| 3 | 3 | MEAN VALUE OF DISTANCES BETWEEN ADJACENT BUDS IS WITHIN PREDETERMINED RANGE |
| 2 | 2 | MEAN VALUE OF DISTANCES BETWEEN ADJACENT BUDS IS LONGER THAN PREDETERMINED RANGE |
| 1 | 1 | MEAN VALUE OF DISTANCES BETWEEN ADJACENT BUDS IS SHORTER THAN PREDETERMINED RANGE |

METHOD FOR GENERATING CUT POINT DATA, SYSTEM FOR GENERATING CUT POINT DATA, AND AGRICULTURAL MACHINE

CROSS REFERENCE TO RELATED APPLICATIONS

This application claims the benefit of priority to U.S. Provisional Application No. 63/614,737 filed on Dec. 26, 2023. The entire contents of this application are hereby incorporated herein by reference.

BACKGROUND OF THE INVENTION

1. Field of the Invention

The present disclosure relates to agricultural machines, systems, and methods; systems for generating cut-point data of canes of a fruit tree; and methods for generating cut-point data of canes of a fruit tree.

2. Description of the Related Art

As attempts in next-generation agriculture, research and development of smart agriculture utilizing ICT (Information and Communication Technology) and IT (Internet of Things) is under way. Research and development is also directed to the automation and unmanned use of tractors or other work vehicles to be used in the field. For example, work vehicles which travel via automatic steering by utilizing a positioning system that is capable of precise positioning, e.g., a GNSS (Global Navigation Satellite System), are coming into practical use.

The specification of U.S. Patent Application Publication No. 2023/288936 describes a work vehicle that is capable of autonomous movements among a plurality of rows of trees in an orchard, such as a vineyard.

SUMMARY OF THE INVENTION

There is also a need for automation and unmanned application of pruning work for fruit trees in an orchard such as a vineyard. Pruning is an operation of cutting off a portion of a cane of a fruit tree, as an unwanted cane, in order to tailor the tree shape of the fruit tree. Although pruning work may be performed during both of a period of growth and a period of dormancy, in the present specification it mainly refers to the operation that is performed during a period of dormancy (e.g., winter) existing after the harvesting of fruits for a given year is finished and before the growth of the fruit tree begins for the next year. The yield and quality in the next season will be determined based on which cane is to be cut and which cane is to be retained. Thus, any pruning work that is performed during a period of dormancy is considered as one of the important operations in cultivating a fruit tree. In pruning work, for each of individual fruit trees that may have different shapes, a comprehensive judgment of the health status, sun exposure, ventilation, etc., of the fruit tree should be made, and optimum pruning needs to be performed for the respective fruit tree on the basis of experience and feeling. It is not easy to automate pruning work, which entails such judgments.

Example embodiments of the present disclosure provide methods for generating cut-point data including information indicating a three-dimensional position of a point on a cane of a fruit tree where the cane is to be cut off, systems for generating the cut-point data, and agricultural machines.

Example embodiments of the present invention relate to methods for generating cut-point data including information indicating a three-dimensional position of a point on a cane of a fruit tree where the cane is to be cut off, systems for generating the cut-point data of a cane of a fruit tree, and agricultural machines.

Example embodiments of the present disclosure provide solutions as recited in the following Items.

[Item g1]

According to an example embodiment of the present invention, a method for using a computer or computers to generate cut-point data including information indicating a three-dimensional position of a point on a cane of a fruit tree where the cane is to be cut off includes, for each of one or more canes of the fruit tree, acquiring a measurement value(s) concerning one or more attributes, including an attribute concerning vigor of the fruit tree, based on sensor data of the one or more canes being acquired by a sensor or sensors, determining the one or more canes each as a cane to be removed or a cane to be retained based on the measurement value(s), based on the measurement value(s), determining a number of buds to be retained on each cane having been determined as a cane to be retained, generating the cut-point data for each cane determined as a cane to be removed, and based on the number of buds to be retained, generating the cut-point data for each cane having been determined as a cane to be retained.

[Item g2]

According to an example embodiment of the present invention, a method as recited in Item g1, wherein the one or more attributes include at least one of a thickness of the cane, a size of buds on the cane, or a length between nodes of the cane.

[Item g3]

According to an example embodiment of the present invention, a method as recited in Item g2, wherein the one or more attributes include a thickness of the cane, and the determining the one or more canes each as a cane to be removed or a cane to be retained includes, for each of the one or more canes, determining a factor score based on the thickness of the cane, and determining the one or more canes each as a cane to be removed or a cane to be retained based on the factor score.

[Item g4]

According to an example embodiment of the present invention, a method as recited in Item g3, wherein the factor score of each of the one or more canes regarding the thickness of the cane is determined to be, if the thickness of the cane is larger than a predetermined range, lower than when the thickness of the cane is within the predetermined range, and if the thickness of the cane is smaller than the predetermined range, lower than when the thickness of the cane is larger than the predetermined range.

[Item g5]

According to an example embodiment of the present invention, a method as recited in Item g4, further including acquiring information on a setting value for the number of buds to be retained, wherein the determining the number of buds to be retained includes, when the thickness of the cane determined as a cane to be retained is smaller than the predetermined range, determining the number of buds to be retained so as to have a smaller value than the setting value.

[Item g6]

According to an example embodiment of the present invention, a method as recited in Item g5, wherein the acquiring information on a setting value for the number of buds to be retained includes acquiring information on the setting value based on a user input.

[Item g7]

According to an example embodiment of the present invention, a method as recited in Item g2, wherein the attribute concerning buds includes a size of buds on the cane, and the determining the one or more canes each as a cane to be removed or a cane to be retained includes, for each of the one or more canes, determining a factor score based on a size of buds on the cane, and determining the one or more canes each as a cane to be removed or a cane to be retained based on the factor score.

[Item g8]

According to an example embodiment of the present invention, a method as recited in Item g7, further including acquiring information on a setting value for the number of buds to be retained, wherein the determining the one or more canes each as a cane to be removed or a cane to be retained includes, for each of the one or more canes, among buds on the cane, determining the factor score based on a mean value of sizes of as many buds as the setting value, and determining the one or more canes each as a cane to be removed or a cane to be retained based on the factor score.

[Item g9]

According to an example embodiment of the present invention, a method as recited in Item g8, wherein the acquiring information on a setting value for the number of buds to be retained includes acquiring information on the setting value based on a user input.

[Item g10]

According to an example embodiment of the present invention, a method as recited in Item g8 or g9, wherein the factor score of each of the one or more canes regarding the size of buds on the cane is determined to be, if the mean value of the sizes of buds on the cane is larger than a predetermined range, lower than when the mean value of the sizes of buds on the cane is within the predetermined range, and if the mean value of the sizes of buds on the cane is smaller than the predetermined range, lower than when the mean value of the sizes of buds on the cane is larger than the predetermined range.

[Item g11]

According to an example embodiment of the present invention, a method as recited in Item g10, wherein the determining the number of buds to be retained includes, when the mean value of the sizes of buds on the cane determined as a cane to be retained is larger than the predetermined range, determining the number of buds to be retained so as to have a larger value than the setting value, and the mean value of the sizes of buds on the cane determined as a cane to be retained is smaller than the predetermined range, determining the number of buds to be retained so as to have a smaller value than the setting value.

[Item g12]

According to an example embodiment of the present invention, a method as recited in any one of Items g1 to g11, further including inputting the generated cut-point data to a controller configured or programmed to control a three-dimensional position of a cutter that cuts a cane of the fruit tree.

[Item g13]

According to an example embodiment of the present invention, a method as recited in any one of Items g1 to g12, further including grouping a plurality of canes of the fruit tree into a plurality of groups based on sensor data of the plurality of canes, wherein the acquisition of the measurement value(s), the determination as to a cane to be removed or a cane to be retained, the determination of the number of buds to be retained, and the generation of the cut-point data are performed for one or more canes that are grouped into a same group among the plurality of groups.

[Item g14]

According to an example embodiment of the present invention, a method as recited in any one of Items g1 to g13, wherein the one or more attributes include two or more attributes, the method further comprises acquiring information on priority levels of the two or more attributes, and the determining the one or more canes each as a cane to be removed or a cane to be retained includes determining the one or more canes each as a cane to be removed or a cane to be retained based on the measurement values and the priority levels.

[Item g15]

According to an example embodiment of the present invention, a method as recited in any one of Items g1 to g14, further including acquiring information on a number of buds to be retained on each cane having been determined as a cane to be retained, and based on the number of buds to be retained, generating the cut-point data for each cane to be retained.

[Item g16]

According to an example embodiment of the present invention, a method as recited in Item g15, wherein the generating the cut-point data for each cane having been determined as a cane to be retained includes generating the cut-point data so that each cane having been determined as a cane to be retained includes one or more buds after being cut.

[Item g17]

According to an example embodiment of the present invention, a method as recited in any one of Items g1 to g16, wherein the one or more canes include two or more canes, and determining the one or more canes each as a cane to be removed or a cane to be retained includes, among the two or more canes, determining that any cane other than the cane(s) determined as a cane(s) to be retained is a cane to be removed.

[Item g18]

A system for generating cut-point data including information indicating a three-dimensional position of a point on a cane of a fruit tree where the cane is to be cut off according to an example embodiment of the present invention includes a sensor or sensors to acquire sensor data of one or more canes of the fruit tree, and a data processor configured or programmed to generate the cut-point data for a cane of the fruit tree based on the sensor data, wherein the data processor is configured or programmed to, based on the sensor data, for each of the one or more canes, acquire a measurement value(s) concerning one or more attributes, including an attribute concerning vigor of the fruit tree, based on the measurement value(s), determine the one or more canes each as a cane to be removed or a cane to be retained, based on the measurement value(s), determine a number of buds to be retained on each cane having been determined as a cane to be retained, generate the cut-point data for each cane determined as a cane to be removed, and based on the number of buds to be retained, generate the cut-point data for each cane having been determined as a cane to be retained.

[Item g19]

A system for generating cut-point data including information indicating a three-dimensional position of a point on a cane of a fruit tree where the cane is to be cut off according to an example embodiment of the present invention is a cut-point data generation system including a sensor or sensors to acquire sensor data of a plurality of canes of the fruit tree, wherein the system is configured or programmed to perform the steps of a method as recited in any one of Items g1 to g17.

[Item g20]

According to an example embodiment of the present invention, a system as recited in Item g18 or g19, further including a cutter to cut a cane of the fruit tree and a controller configured or programmed to control a three-dimensional position of the cutter, wherein the data processor is configured or programmed to input the generated cut-point data to the controller, and the controller is configured or programmed to control the three-dimensional position of the cutter based on the cut-point data.

[Item g21]

According to an example embodiment of the present invention, an agricultural machine including a system as recited in Item g20.

[Item g22]

According to an example embodiment of the present invention, an agricultural machine as recited in Item g21, further including an arm supporting the cutter, a support supporting the arm, and a driver to move the support, wherein the controller is configured or programmed to control the three-dimensional position of the cutter by controlling an operation of the arm.

Example embodiments of the present disclosure may be implemented as devices, systems, methods, integrated circuits, computer programs, non-transitory computer-readable storage media, or any combination thereof. The computer-readable storage media may be inclusive of a volatile storage medium, or a non-volatile storage medium. Each of the devices may include a plurality of devices. In the case where the device includes two or more devices, the two or more devices may be provided within a single apparatus, or divided over two or more separate apparatuses.

According to example embodiments of the present disclosure, there are provided methods for generating cut-point data including information indicating a three-dimensional position of a point on a cane of a fruit tree where the cane is to be cut off, systems for generating the cut-point data, and agricultural machines, these being able to be used for promoting automation and unmanned application of pruning work for fruit trees while maintaining the fruit yield and quality.

The above and other elements, features, steps, characteristics and advantages of the present invention will become more apparent from the following detailed description of the example embodiments with reference to the attached drawings.

BRIEF DESCRIPTION OF THE DRAWINGS

FIG. 14A is a diagram for describing an example of a process to be performed in step S252.

FIG. 14B is a diagram for describing an example of a process to be performed in step S252.

FIG. 14C is a diagram for describing an example of a process to be performed in step S252.

FIG. 14D is a diagram for describing an example method of setting a priority level for each attribute.

FIG. 14E is a diagram for describing an example method of setting a priority level for each attribute.

FIG. 16A is a schematic diagram for describing an example of processes to be performed in step S244 and step S246.

FIG. 16B is a schematic diagram for describing another example of processes to be performed in step S244 and step S246.

FIG. 17A is a diagram schematically showing an example classification of attributes.

FIG. 17B is a diagram schematically showing an example classification of attributes.

FIG. 17C is a diagram schematically showing an example classification of attributes.

FIG. 22B is a diagram showing a table illustrating examples of a plurality of classes, an evaluation criterion for each of the plurality of classes, and a score corresponding to each of the plurality of classes, regarding a direction in which a cane extends.

FIG. 22E is a schematic diagram for describing the acquisition of a measurement value or an image that is used for acquiring a measurement value concerning a height of the base of a cane.

FIG. 22F is a diagram showing a table illustrating examples of a plurality of classes, an evaluation criterion for each of the plurality of classes, and a score corresponding to each of the plurality of classes, regarding a height of the base of a cane.

FIG. 22M is a schematic diagram for describing the acquisition of a measurement value or an image that is used for acquiring a measurement value concerning a length between nodes of a cane.

FIG. 22N is a diagram showing a table illustrating examples of a plurality of classes, an evaluation criterion for each of the plurality of classes, and a score corresponding to each of the plurality of classes, regarding a length between nodes of a cane.

DETAILED DESCRIPTION OF THE EXAMPLE EMBODIMENTS

Figure 1:
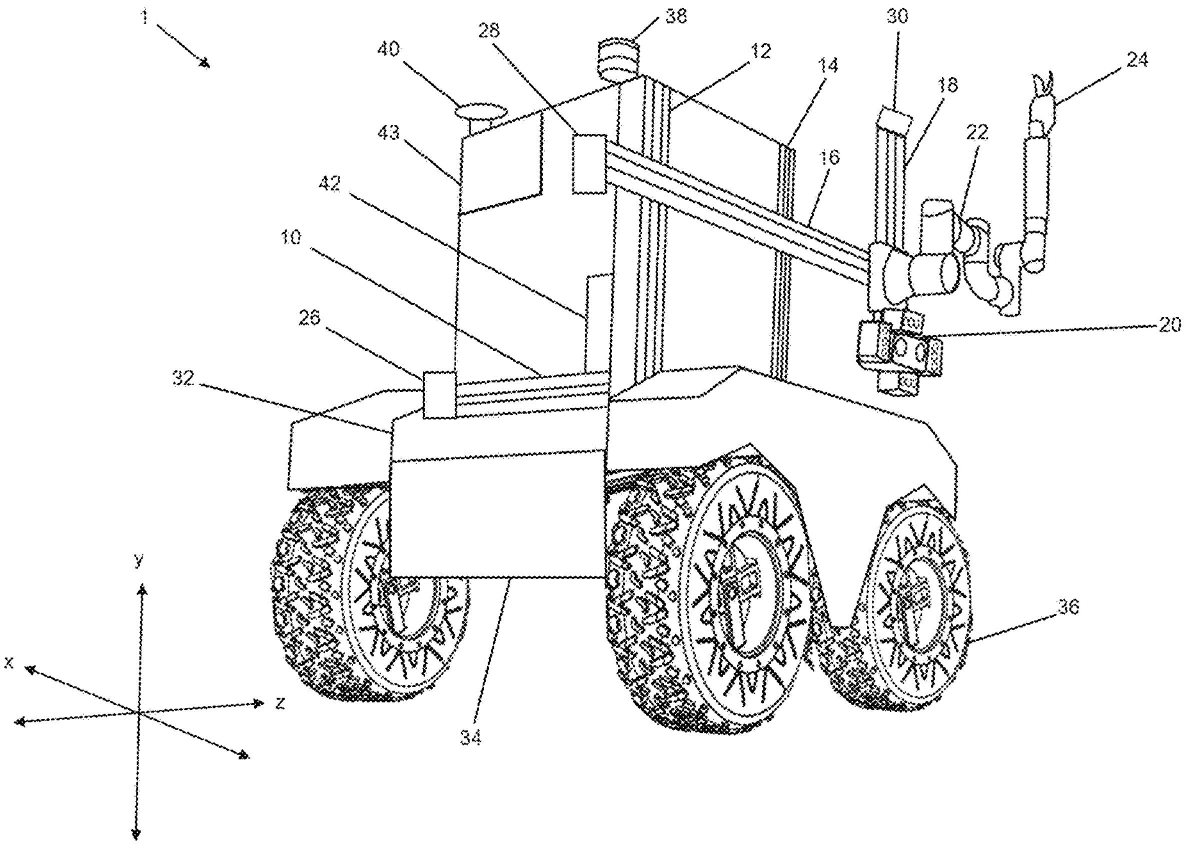
FIG. 1 is a front perspective view of a cutting system 1 according to an example embodiment of the present disclosure.

Hereinafter, with reference to the drawings, methods for generating cut-point data including information indicating a three-dimensional position of a point on a cane of a fruit tree where the cane is to be cut off, systems for generating cut-point data, and agricultural machines according to example embodiments of the present disclosure will be described. The same reference characters in a plurality of drawings denote the same or similar parts.

The following example embodiments are exemplifications to provide specific examples of the technological concepts of the present invention, and the present invention is not limited to the following example embodiments. The size, material, shape, relative arrangement, etc., of any component are intended as examples, without intending to limit the scope of the present invention to only those. The size and relative positioning of the structures shown in each drawing may be exaggerated in order to facilitate understanding.

In an example embodiment of the present disclosure, the notion "parallel" encompasses any two straight lines, sides, surfaces, etc., making an angle in the range from 0° to 5°, unless otherwise specified. In an example embodiment of the present disclosure, the notion "perpendicular" or "orthogonal" encompasses any two straight lines, sides, surfaces, etc., making an angle within about ±5° of 90°, unless otherwise specified. The angle made by any two straight lines, sides, faces, etc., has a positive value, and not a negative value, unless otherwise specified.

FIG. 1 shows a front perspective view of a cutting system 1 according to an example embodiment of the present invention. As shown in FIG. 1, the cutting system 1 can include a vehicle or the like. However, the cutting system 1 can be mounted on a cart that is able to be towed by a vehicle or a person, or a self-driving or self-propelled cart or vehicle.

As shown in FIG. 1, the cutting system 1 includes a base frame 10, side frames 12 and 14, a horizontal frame 16, and a vertical frame 18. The side frames 12 and 14 are mounted to the base frame 10, and the side frames 12 and 14 directly support the horizontal frame 16. The vertical frame 18 is mounted on the horizontal frame 16. One or more devices, such as a camera 20, a robotic arm 22, and/or a cutting tool 24, can be mounted on and supported by the vertical frame 18, and/or others of the frames 10, 12, 14, or 16, for example.

The base frame 10 includes a base frame motor 26 that is able to move the side frames 12 and 14 along the base frame 10, such that the one or more devices can be moved in a depth direction (the z-axis shown in FIG. 1). The horizontal frame 16 includes a horizontal frame motor 28 that is able to move the vertical frame 18 along the horizontal frame 16, such that the one or more devices can be moved in a horizontal direction (the x-axis shown in FIG. 1). The vertical frame 18 includes a vertical frame motor 30 that is able to move the one or more devices along the vertical frame 18 in a vertical direction (the y-axis shown in FIG. 1). Each of the base frame motor 26, the horizontal frame motor 28, and the vertical frame motor 30 can be a screw motor, for example. Screw motors can provide a relatively high level of precision to accurately move and locate the one or more devices. However, each of the base frame motor 26, the horizontal frame motor 28, and the vertical frame motor 30 can be any motor that provides a continuous torque greater than or equal to about 0.2 Nm, and preferably any motor that provides a continuous torque greater than or equal to about 0.3 Nm, for example.

Each of the base frame motor 26, the horizontal frame motor 28, and the vertical frame motor 30 can be designed and/or sized according to an overall weight of the one or more devices. In addition, a coupler for each of the base frame motor 26, the horizontal frame motor 28, and the vertical frame motor 30 can be changed according to a motor shaft diameter and/or a corresponding mounting hole pattern.

Figure 3A:
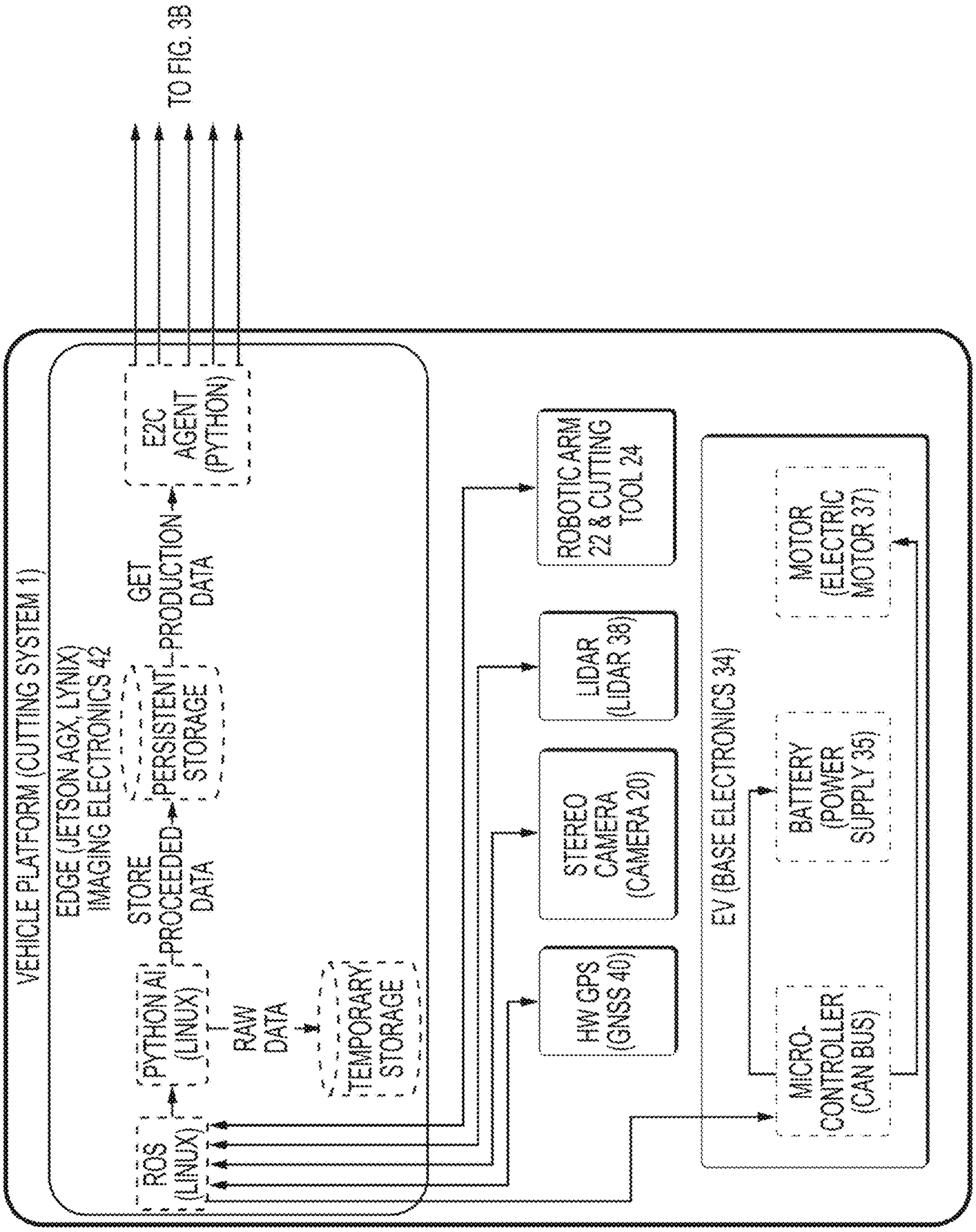
FIG. 3A is an example block diagram of a cloud system which includes a vehicle platform and which interacts with a cloud platform and a user platform.
Figure 3B:
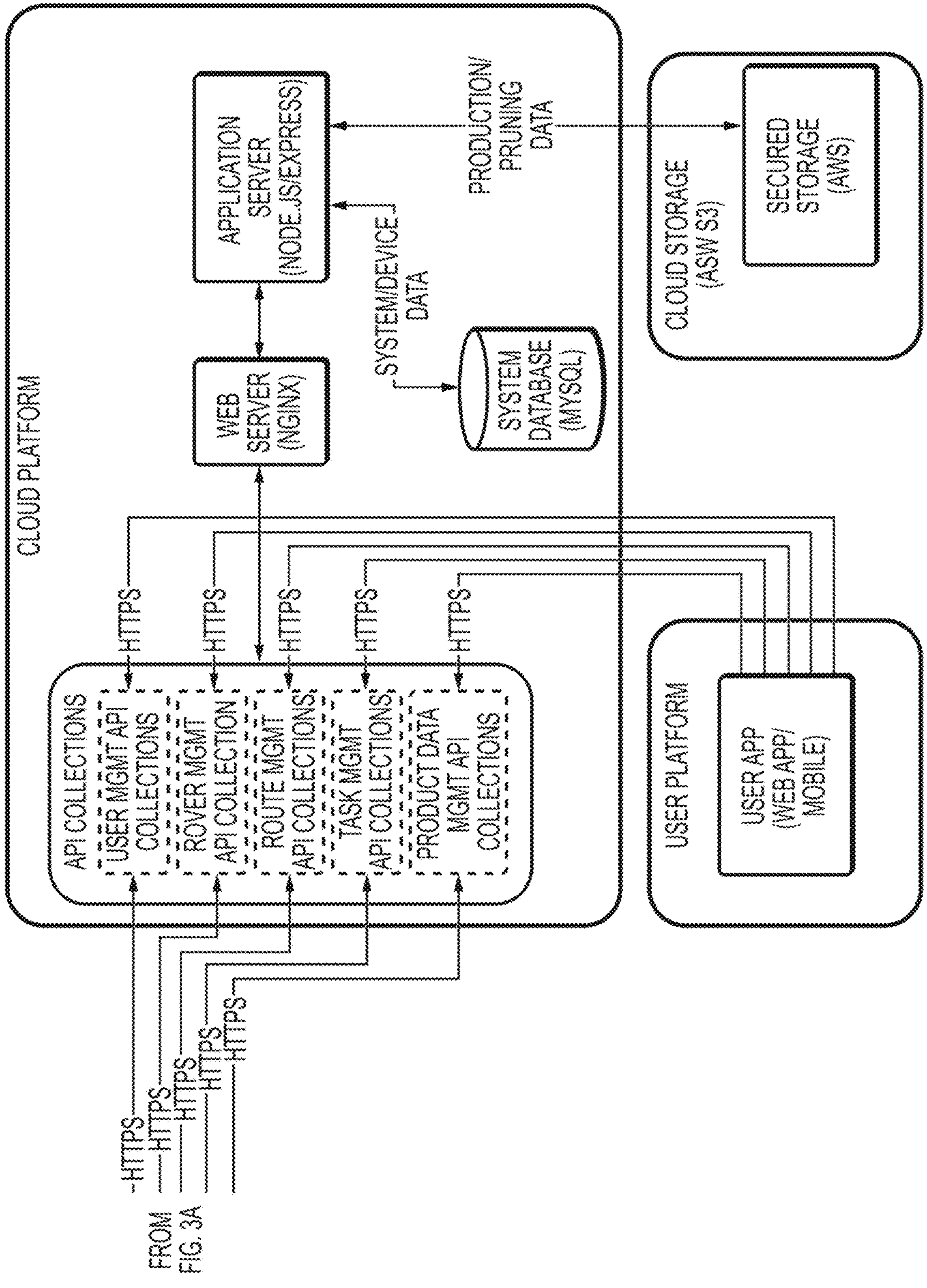
FIG. 3B is an example block diagram of a cloud system which includes a vehicle platform and which interacts with a cloud platform and a user platform.

The base frame 10 can be mounted on a base 32, and base electronics 34 can also be mounted to the base 32. A plurality of wheels 36 can be mounted to the base 32. The plurality of wheels 36 can be controlled by the base electronics 34, and the base electronics 34 can include a power supply 35 to drive an electric motor 37 or the like, as shown in FIGS. 3A and 3B, for example. As an example, the plurality of wheels 36 can be driven by an electric motor 37 with a target capacity of about 65 kW to about 75 kW and a power supply 35 for the electric motor 37 can be a battery with a capacity of about 100 kWh.

The base electronics 34 can also include a processor and memory components that are programmed or configured to perform autonomous navigation of the cutting system 1. Furthermore, as shown in FIG. 1, a LiDAR (light detection and ranging) system 38 and a Global Navigation Satellite System (GNSS) 40 can also be mounted to or supported by the base frame 10 or the base 32, and/or others of the frames 10, 12, 14, or 16, for example, so that position data of the cutting system 1 can be determined. The LiDAR system 38 and GNSS 40 can be used for obstacle avoidance and navigation when the cutting system 1 is autonomously moved. Preferably, for example, the cutting system 1 can be implemented with a remote control interface, and can communicate via one or more of Ethernet, USB, wireless communications, and GPS RTK (real time kinematics). The remote control interface and communications devices can be included in one or both of the base electronics 34 and imaging electronics 42 (described below). As shown in FIG. 1, the cutting system 1 can also include, or be communicatively connected with, a display device 43 to display data and/or images obtained by the one or more devices and to display information provided by the base electronics 34 (for example, location, speed, battery life, and the like of the cutting system 100). Alternatively, data and/or images obtained by the one or more devices and provided by the base electronics 34 can be displayed to a user through a user platform.

Figure 2:
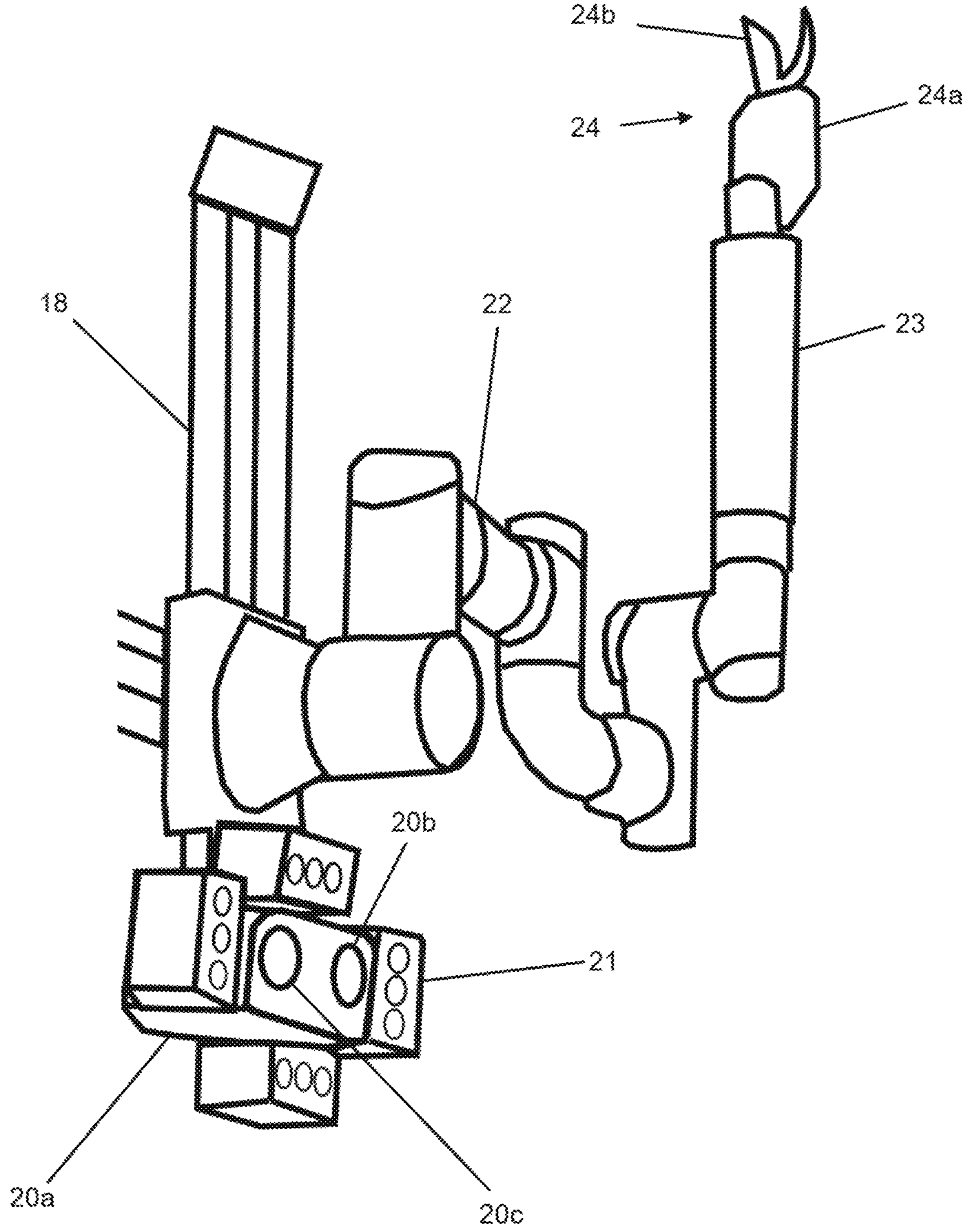
FIG. 2 is a schematic diagram showing enlarged a portion of the cutting system 1.

FIG. 2 is a close-up view of a portion of the cutting system 1 that includes the one or more devices. As shown in FIG. 2, the one or more devices can include the camera 20, the robotic arm 22, and the cutting tool 24, which can be mounted to the vertical frame 18, and/or others of the frames 10, 12, 14, or 16, for example. Additional ones of the one or more devices can also be provided on the vertical frame 18, and/or others of the frames 10, 12, 14, or 16, for example.

The camera 20 can include a stereo camera, an RGB camera, and the like. As shown in FIG. 2, the camera 20 can include a main body 20*a* that includes a first camera/lens 20*b* (e.g., a left camera/lens) and a second camera/lens 20*c* (e.g., a right camera/lens). Alternatively, the main body 20*a* is able to include more than two cameras/lenses. The resolution of the camera 20 can be 1536×2048 pixels or 2448×2048 pixels, for example, but the camera 20 can alternatively have a different resolution. The camera 20 can include, for example, PointGrey CM3-U3-31S4C-CS or PointGrey CM3-U3-50S5C sensors, 3.5 mm f/2.4 or 5 mm f/1.7 lens, and a field of view of 74.2535×90.5344 or 70.4870×80.3662. However, the camera 20 is able to include other sensors and lenses, and have a different field of view.

One or more light sources 21 can be attached to one or more sides of the main body 20*a* of the camera 20. The light sources 21 can include an LED light source that faces the same direction as the one or more devices such as the camera 20, for example, along the z-axis shown in FIG. 1. The light sources 21 can provide illumination of an object or objects to be imaged by the camera 20. For example, the light sources 21 can operate as a flash during daytime operation to compensate for ambient light when capturing images with the camera 20. During nighttime operation, the light sources 21 can operate as either a flash for the camera 20, or the light sources can provide constant illumination for the camera 20. In an example embodiment, the one or more light sources 21 include 100 watt LED modules, for example, but LED modules having a different wattage (e.g., 40 watts or 60 watts) can also be used.

The robotic arm 22 can include a robotic arm known to a person of ordinary skill in the art, such the Universal Robot 3 e-series robotic arm and the Universal Robot 5 e-series robotic arm. The robotic arm 22, also known as an articulated robotic arm, can include a plurality of joints that act as axes that enable a degree of movement, wherein the higher number of rotary joints the robotic arm 22 includes, the more freedom of movement the robotic arm 22 has. For example, the robotic arm 22 can include four to six joints, which provide the same number of axes of rotation for movement.

In an example embodiment of the present invention, a controller can be configured or programmed to control movement of the robotic arm 22. For example, the controller can be configured or programmed to control the movement of the robotic arm 22 to which the cutting tool 24 is attached to position the cutting tool 24 in accordance with the steps discussed below. For example, the controller can be configured or programmed to control movement of the robotic arm 22 based on a location of a cut-point located on an agricultural item of interest.

In an example embodiment of the present invention, the cutting tool 24 includes a main body 24*a* and a blade portion 24*b*, as shown in FIG. 2, for example. The blade portion 24*b* can include a driven blade that moves with respect to a fixed blade and is actuated to perform a cutting action together with the fixed blade. The cutting tool 24 can include, for example, a cutting device as disclosed in U.S. patent application Ser. No. 17/961,666 titled "End Effector Including Cutting Blade and Pulley Assembly" and published as U.S. Patent Application Publication No. 2024/0116193 which is incorporated in its entirety by reference herein.

In an example embodiment of the present invention, the cutting tool 24 can be attached to the robotic arm 22 using a robotic arm mount assembly 23. The robotic arm mount assembly 23 can include, for example, a robotic arm mount assembly as disclosed in U.S. patent application Ser. No. 17/961,668 titled "Robotic Arm Mount Assembly Including Rack and Pinion" and published as U.S. Patent Application Publication No. 2024/0116173 which is incorporated in its entirety by reference herein.

The cutting system 1 can include imaging electronics 42 that can be mounted on the side frame 12 or the side frame 14, as shown in FIG. 1, for example. The imaging electronics 42 can supply power to and control each of the base frame motor 26, the horizontal frame motor 28, and the vertical frame motor 30. That is, the imaging electronics 42 can include a power source to supply power to each of the base frame motor 26, the horizontal frame motor 28, and the vertical frame motor 30. In addition, the imaging electronics 42 can include a processor and memory components that are programmed or configured to control each of the base frame motor 26, the horizontal frame motor 28, and the vertical frame motor 30. The processor and memory components of the imaging electronics 42 can also be configured or programmed to control the one or more devices, including the camera 20, the robotic arm 22, the robotic arm mount assembly 23, and the cutting tool 24. In addition, the processor and memory components of the imaging electronics 42 can be configured or programmed to process image data obtained by the camera 20.

As described above, the imaging electronics 42 and the base electronics 34 can each include a processor and memory components. The processors may be hardware processors, multipurpose processors, microprocessors, special purpose processors, digital signal processors (DPSs), and/or other types of processing components configured or programmed to process data. The memory components may include one or more of volatile, non-volatile, and/or replaceable data storage components. For example, the memory components may include magnetic, optical, and/or flash storage components that may be integrated in whole or in part with the processors. The memory components may store instructions and/or instruction sets or programs that are able to be read and/or executed by the processors.

According to another example embodiment of the present invention, the imaging electronics 42 can be partially or completely implemented by the base electronics 34. For example, each of the base frame motor 26, the horizontal frame motor 28, and the vertical frame motor 30 can receive power from and/or be controlled by the base electronics 34 instead of the imaging electronics 42.

According to further example embodiments of the present invention, the imaging electronics 42 can be connected to a power supply or power supplies that are separate from the base electronics 34. For example, a power supply can be included in one or both of the imaging electronics 42 and the base electronics 34. In addition, the base frame 10 may be detachably attached to the base 32, such that the base frame 10, the side frames 12 and 14, the horizontal frame 16, the vertical frame 18, and the components mounted thereto can be mounted on another vehicle or the like.

The base frame motor 26, the horizontal frame motor 28, and the vertical frame motor 30 are able to move the one or more devices in three separate directions or along three separate axes. However, according to another example embodiment of the present invention, only a portion of the one or more devices such as the camera 20, the robotic arm 22, and the cutting tool 24, can be moved by the base frame motor 26, the horizontal frame motor 28, and the vertical frame motor 30. For example, the base frame motor 26, the horizontal frame motor 28, and the vertical frame motor 30 may move only the camera 20. Furthermore, the cutting system 1 can be configured to linearly move the camera 20 along only a single axis while the camera captures a plurality of images, as discussed below. For example, the horizontal frame motor 28 can be configured to linearly move the camera 20 across an agricultural item of interest, such as a grape vine, and the camera 20 can capture a plurality of images of the grape vine.

The imaging electronics 42 and the base electronics 32 of the cutting system 1 can each be partially or completely implemented by edge computing to provide a vehicle platform, for example, by an NVIDIA® JETSON™ AGX computer. In an example embodiment of the present invention, the edge computing provides all of the computation and communication needs of the cutting system 1. FIGS. 3A and 3B show an example block diagram of a cloud system which includes a vehicle platform and which interacts with a cloud platform and a user platform. As shown in FIGS. 3A and 3B, the edge computing of the vehicle platform includes a cloud agent, which is a service-based component that facilitates communication between the vehicle platform and the cloud platform. For example, the cloud agent can receive command and instruction data from the cloud platform (e.g., a web application on the cloud platform), and then transfer the command and instruction data to corresponding components of the vehicle platform. As another example, the cloud agent can transmit operation data and production data to the cloud platform. Preferably, the cloud platform can include software components and data storage to maintain overall operation of the cloud system. The cloud platform preferably provides enterprise-level services with on-demand capacity, fault tolerance, and high availability (for example, AMAZON WEB SERVICES™). The cloud platform includes one or more application programming interfaces (APIs) to communicate with the vehicle platform and with the user platform. Preferably, the APIs are protected with a high level of security and a capacity of each of the APIs can be automatically adjusted to meet computational loads. The user platform provides a dashboard to control the cloud system and to receive data obtained by the vehicle platform and the cloud platform. The dashboard can be implemented by a web-based (e.g., internet browser) application, a mobile application, a desktop application, and the like.

As an example, the edge computing of the vehicle platform shown in FIGS. 3A and 3B can obtain data from a HW (hardware) GPS (Global Positioning System) (for example, GNSS 40) and LiDAR data (for example, from the LiDAR system 38). In addition, the vehicle platform can obtain data from the camera 20. The edge computing of the vehicle platform can include a temporary storage, for example, to store raw data obtained by the camera 20. The edge computing of the vehicle platform can also include a persistent storage, for example, to store processed data. As a specific example, camera data stored in the temporary storage can be processed by an artificial intelligence (AI) model, the camera data can then be stored in the persistent storage, and the cloud agent can retrieve and transmit the camera data from the persistent storage.

Figure 4A:
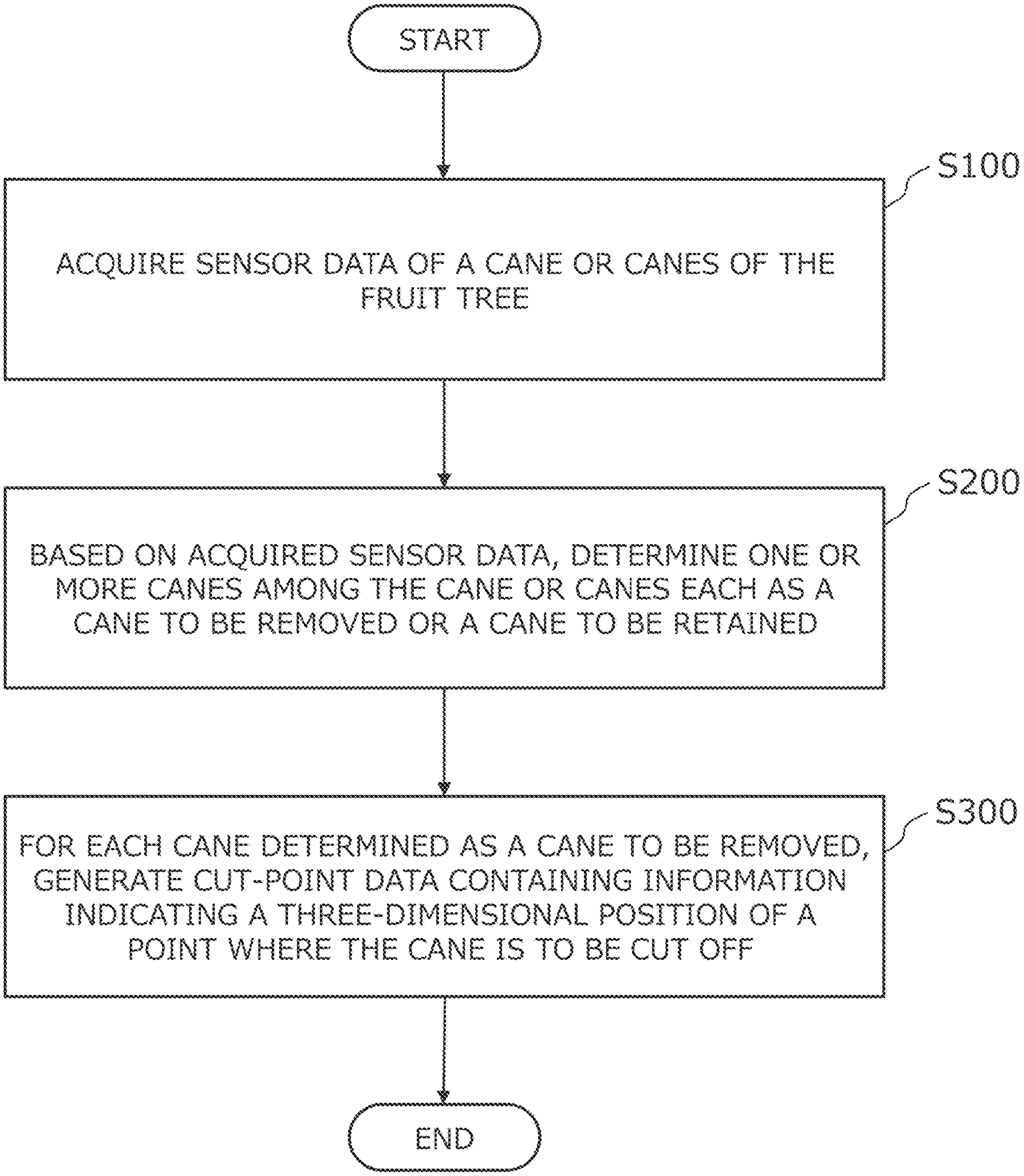
FIG. 4A is a flowchart showing an example of a procedure of generating cut-point data of canes of a fruit tree, in a cut-point data generation method or cut-point data generation system for canes of a fruit tree according to an example embodiment of the present disclosure.
Figure 4B:
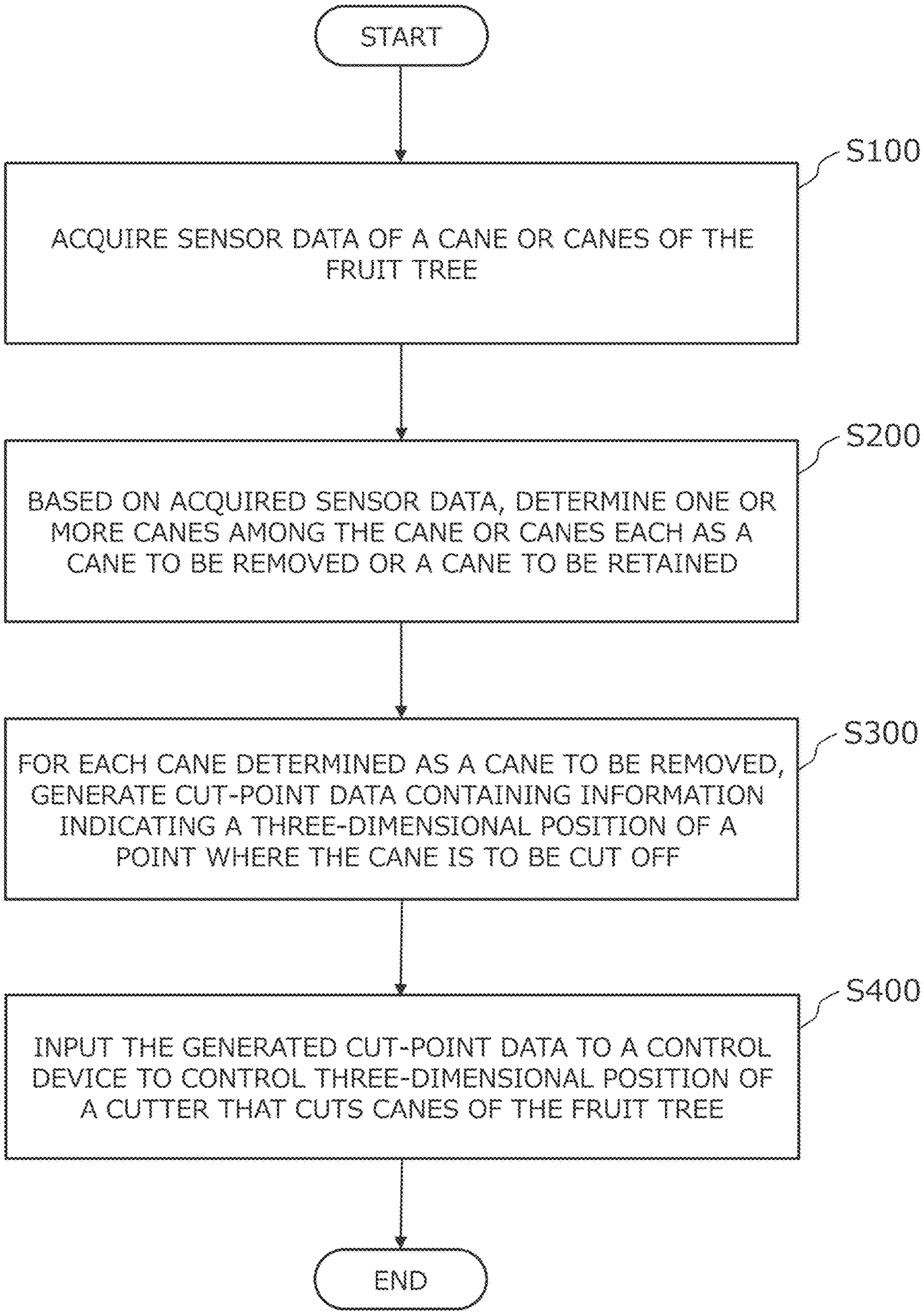
FIG. 4B is a flowchart showing another example of a procedure of generating cut-point data of canes of a fruit tree, in a cut-point data generation method or cut-point data generation system for canes of a fruit tree according to an example embodiment of the present disclosure.
Figure 4C:
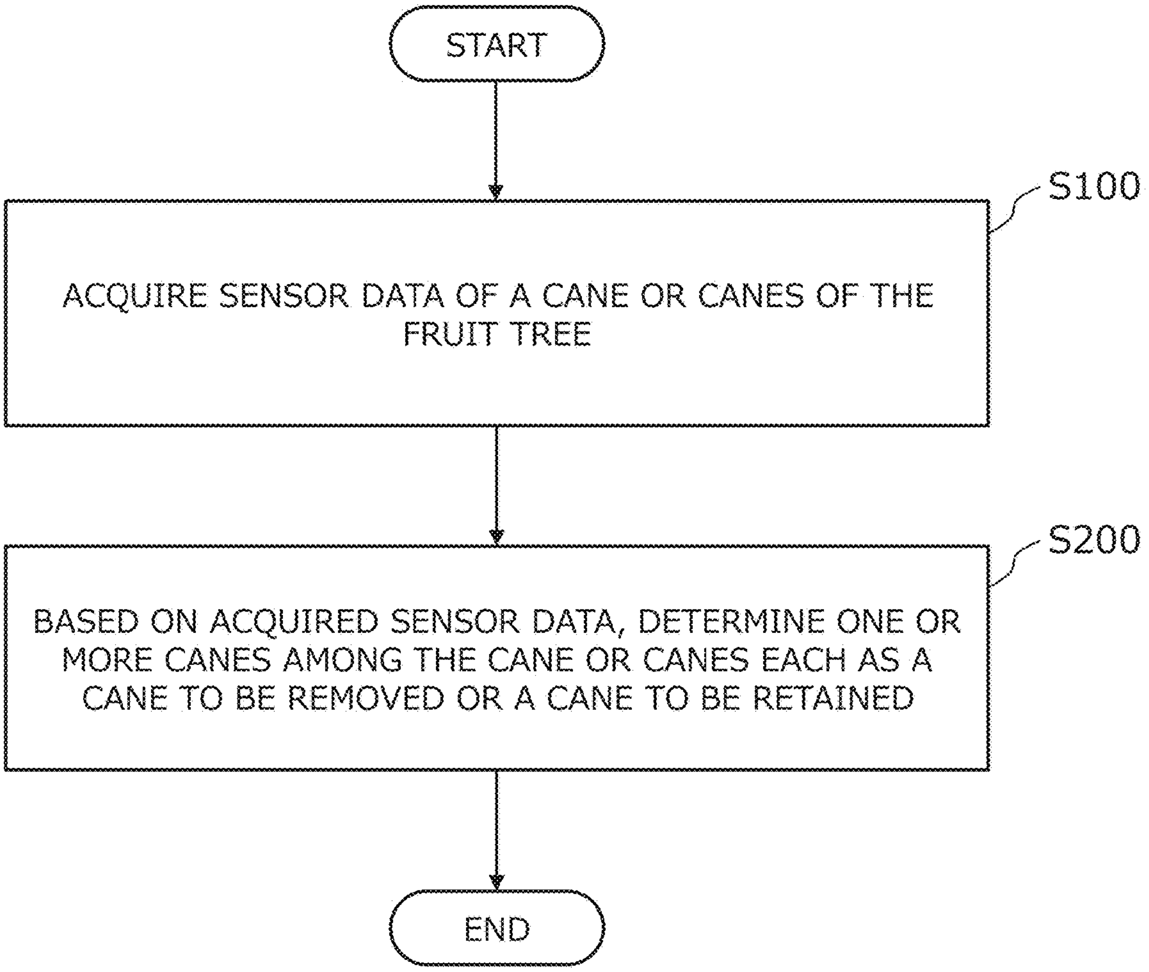
FIG. 4C is a flowchart showing an example procedure in a method or a system according to an example embodiment of the present disclosure.

With reference to FIGS. 4A to 4C, a method for generating cut-point data of a cane of a fruit tree (which may hereinafter be referred to as a "cut-point data generation method") and a system for generating cut-point data of a cane of a fruit tree (which may hereinafter be referred to as a "cut-point data generation system") according to an example embodiment of the present disclosure will be described. FIGS. 4A to 4C are flowcharts showing example procedures of generating cut-point data of canes of a fruit tree, in a cut-point data generation method for canes of a fruit tree according to an example embodiment of the present disclosure or a cut-point data generation system for canes of a fruit tree according to an example embodiment of the present disclosure. That is, a cut-point data generation method according to an example embodiment of the present disclosure may include the following steps. The processes of the following steps are performed by using a computer or computers. The computer or computers may include not only a processor of an ECU (Electric Control Unit) that is mounted on the cutting system 1, but also a processor of a server(s) (computer(s)) and/or a terminal device(s) (including mobile types and stationary types) that is connected to the cutting system 1 via a communications network as shown in FIGS. 3A and 3B. Moreover, a data processor included in a cut-point data generation system according to an example embodiment of the present disclosure performs the processes of the following steps. Some or all functions of the data processor included in a cut-point data generation system according to an example embodiment of the present disclosure can be realized by a server(s) (computer(s)) and/or a terminal device(s) (including mobile types and stationary types) that is connected to the cutting system 1 via a communications network.

Figure 5:
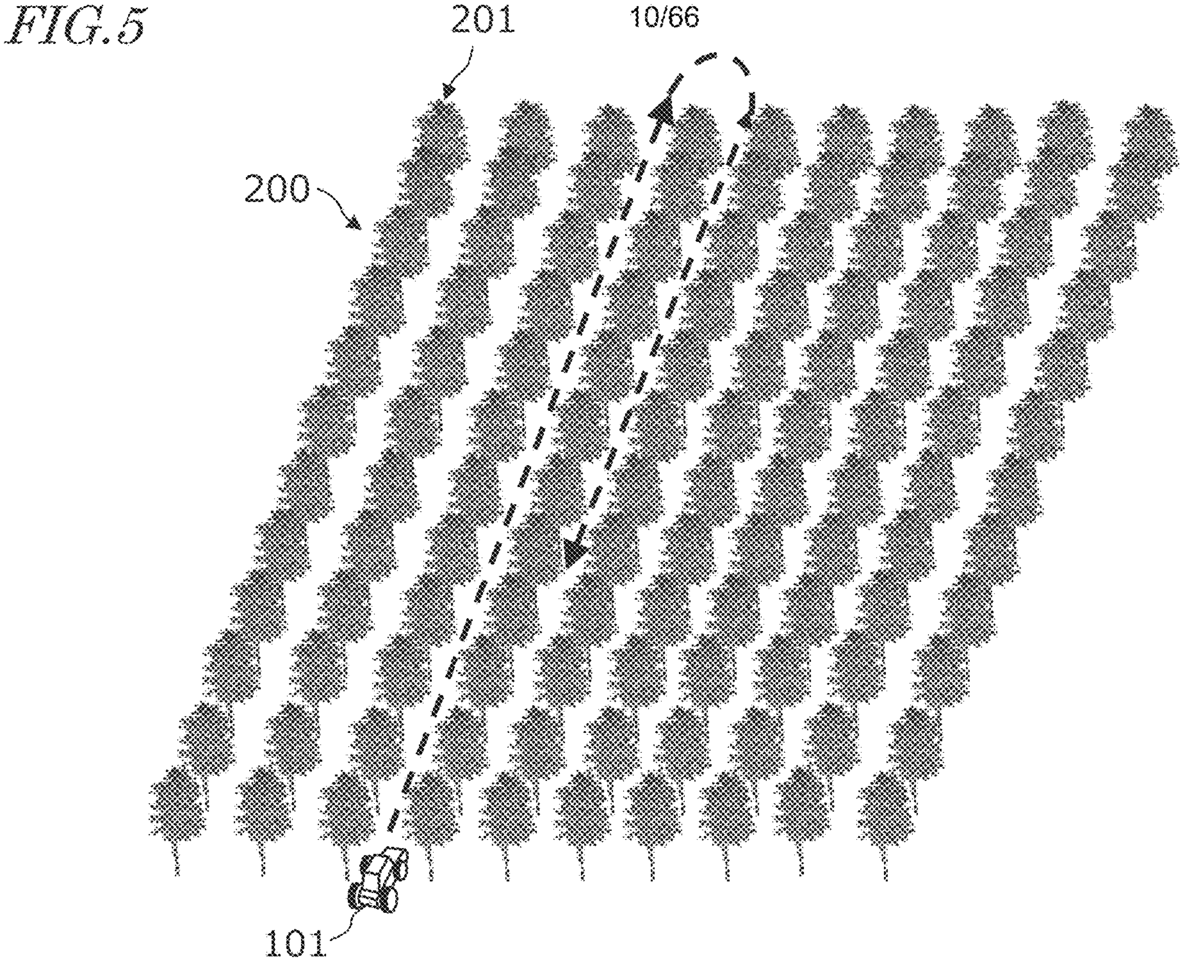
FIG. 5 is a diagram schematically showing how an agricultural machine 101 including a cutting system according to an example embodiment of the present disclosure moves in an orchard.

Herein, an example where cut-point data of canes of a fruit tree 200 is generated by using an agricultural machine 101 having a cutting system mounted thereto will be described, as illustrated in FIG. 5. In the example shown in FIG. 5, the cutting system is mounted on the agricultural machine 101 having a vehicle, and while moving among a plurality of tree rows 201 in an orchard (e.g., a vineyard), the agricultural machine 101 generates cut-point data of canes of fruit trees (e.g., grape vines) 200. The cutting system 1 moves among the plurality of tree rows 201 in the orchard along a path shown by a broken arrow in FIG. 5, for example. The agricultural machine 101 may make autonomous movements among the plurality of tree rows 201. Without being limited to a work vehicle such as a tractor, the agricultural machine equipped with the cutting system may a transport vehicle, a mobile robot, a mobile robot, or an unmanned aerial vehicle (UAV, so-called drone) such as a multicopter. Although grape vines may be illustrated as fruit trees in the present specification, example embodiments of the present disclosure are applicable to more than just grape vines.

First, FIG. 4A is referred to. At step S100, the sensor data being acquired by a sensor or sensors, sensor data of a cane or canes of the fruit tree 200 is acquired. The sensor data may include information indicating a three-dimensional structure of a plurality of canes of the fruit tree 200. For example, a LiDAR sensor included in the LiDAR system 38 of the cutting system 1 repeatedly outputs sensor data indicating a distance and direction toward each measurement point of a cane of the fruit tree 200, or a three-dimensional coordinate values of each measurement point.

An image of a cane of the fruit tree 200 acquired by the camera 20 may be acquired, and an estimated depth of the cane of the fruit tree may be acquired based on the acquired image. The sensor data does not need to include information indicating a three-dimensional structure of the plurality of canes of the fruit tree 200. For example, an image of a cane(s) of the fruit tree 200 acquired by the camera 20 may be used as sensor data. As for the method of acquiring sensor data and the method of processing the acquired sensor data, the entire disclosure of U.S. patent application Ser. No. 18/379,630 published as U.S. Patent Application Publication No. 2024/0282105 is incorporated herein by reference. An identifier may be given to each fruit tree 200. The sensor data acquired for each fruit tree 200 may be stored to a memory in association with the identifier of the corresponding fruit tree 200.

At step S200, based on the sensor data acquired in step S100, one or more canes among the plurality of canes of the fruit tree 200 are each determined as a cane to be removed or a cane to be retained. The "one or more canes" are, among the canes of the fruit tree 200, one or more canes that are the subject of processing at step S200, and may be one or more canes among which a fruiting cane is to be selected, as will be described later, for example. The "one or more canes" may be one or more canes that are grouped into the same group when the plurality of canes of the fruit tree 200 are grouped into a plurality of groups, as will be described later, for example. At step S200, each of the one or more canes that are the subject of processing is classified as a cane to be removed or a cane to be retained. A "cane to be removed" means a cane, a large portion or an entirety of which is removed so that no buds are included. A "cane to be retained" is a cane that is not a cane to be removed, i.e., a cane that is not removed at all, or a cane only a portion of which is removed so that at least one bud is left included. Examples of "canes to be removed" and "canes to be retained" will be described later. In the present specification, "buds" on a cane are meant not to include one bud (basal bud) that is the closest to the base of that cane, unless otherwise specified.

At step S300, for each cane determined as a cane to be removed at step S200, cut-point data including information indicating a three-dimensional position of a point where the cane is to be cut off is generated. As will be described later, depending on the pruning method for the fruit tree, for example, there may be cases where cut-point data will be generated also for each cane determined as a cane to be retained, and cases where no cut-point data will be generated for each cane determined as a cane to be retained. Examples of the pruning method for the fruit tree will be described with respect to spur pruning and cane pruning, by referring to FIGS. 6A to 6C and FIGS. 7A to 7D to be discussed later.

As in the example shown in FIG. 4B, the procedure of generating cut-point data of canes of a fruit tree may further include step S400. At step S400, the cut-point data generated in step S300 is input to a controller configured or programmed to control the three-dimensional position of a cutter (the cutting tool 24 in the example of FIG. 1) that cuts the canes of the fruit tree 200. In this manner, the cutter can be caused to perform cutting of the canes of the fruit tree 200.

Acquisition of sensor data in step S100 may be performed in cycles of once or multiple times per second, for example. In a period beginning from acquisition of sensor data at a given point in time and lasting until the next sensor data is acquired, the processes of step S200 and step S300 may be performed by a data processor. In such a case, the agricultural machine equipped with a cutter can consecutively perform, while moving along a tree row, cutting canes with the cutter based on the cut-point data generated with respect to each fruit tree. Note that the data processor to perform the processes of step S200 and step S300 may be mounted in the agricultural machine, or a computer or computers located outside the agricultural machine may be allowed to function as a portion or an entirety of the data processor.

As in the example shown in FIG. 4C, step S300 may be omitted in a method and system according to an example embodiment of the present disclosure. Such a system can output data indicating information with respect to each of the one or more canes being determined in S200 as a cane to be removed or a cane to be retained, for example. Such data may be input to another system for generating cut-point data. Alternatively, such data may be used for prediction of a fruit yield, for example.

In the example of FIG. 4C, the method according to an example embodiment of the present disclosure includes acquiring sensor data of one or more canes of the fruit tree by using a sensor or sensors (step S100), and, based on the sensor data, determining each of the one or more canes as a cane to be removed or a cane to be retained (step S200).

Figure 4D:
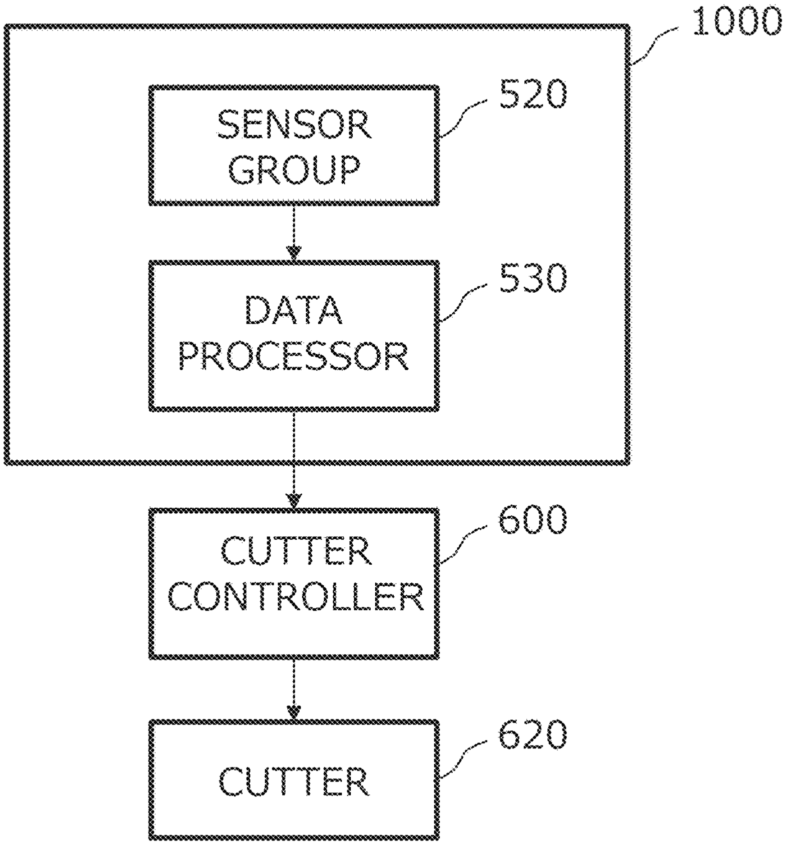
FIG. 4D is a block diagram showing a schematic example configuration of a cutting system according to an example embodiment of the present disclosure.

FIG. 4D is a block diagram showing a schematic example configuration of a cutting system according to an example embodiment of the present disclosure. As shown in FIG. 4D, a cutting system 1000 according to an example embodiment of the present disclosure includes a sensor or sensors (sensor group) 520, and a data processor 530 to generate cut-point data of canes of a fruit tree based on the sensor data acquired from the sensor group 520. The data processor 530 may be connected to a cutter controller (which may simply be referred to as a "controller") 600 to control the three-dimensional position of a cutter 620 (cutting tool) that cuts canes of the fruit tree, for example. The cutting system 1000 may further include the cutter controller 600. The cutting system 1000 may further include the cutter controller 600 and the cutter 620.

The sensor group 520 acquires sensor data of canes of the fruit tree (e.g., sensor data including information indicating a three-dimensional structure of canes of the fruit tree). The sensor group 520 may include, for example, an imager, such as a camera to acquire an image of canes of the fruit tree (e.g., a stereo camera), a LiDAR sensor to acquire point cloud data by sensing canes of the fruit tree, and the like. The sensor group 520 may include a plurality of imagers and/or a plurality of LiDAR sensors.

The data processor 530 may be a computer or computers to process the sensor data acquired by the sensor group 520. For example, it can be realized by an electronic control unit (ECU) for image recognition purposes. The data processor 530 may include one or more processors and one or more memories. A portion of the processes to be performed by the data processor 530 may be performed inside (within the camera module) of the sensor group 520 (imager), for example. In a case where both the sensor group 520 and the data processor 530 are included in the agricultural machine, the sensor group 520 and the data processor 530 may be communicatively connected via a bus, for example.

The cutter controller 600 may be a computer or computers to control the three-dimensional position of the cutter 620 based on the cut-point data generated by the data processor 530. It is realized by a computer such as an electronic control unit (ECU) or electronic control units (ECUs), for example. In the examples of FIG. 1 and FIG. 2, the cutting tool 24 is supported on the robotic arm 22. In the case where the cutter 620 is supported on an arm as in the examples of FIG. 1 and FIG. 2, the cutter controller 600 further controls the operation of the arm supporting the cutter 620.

As in the example of FIG. 1, in the case where the cutting system is mounted on an agricultural machine including a vehicle, the cutting system includes the cutting tool 24, the robotic arm 22 supporting the cutting tool 24, the base (support) 32 supporting the robotic arm 22, and a driver to move the base 32. The driver may include various devices that are needed for the travel of the agricultural machine, e.g., a prime mover, a transmission, and the like. As the ECU or ECUs included in the agricultural machine controls the prime mover, the transmission, the running gear (plurality of wheels 36), etc., that are included in the driver, moving (e.g., travel) of the agricultural machine is controlled.

The cutting system 1000 may be mounted in an agricultural machine that cuts canes of a fruit tree as in the example shown in FIG. 1, and a portion or an entirety of the processes performed by the cutting system 1000 may be performed by a computer or computers located outside the agricultural machine that cuts canes of a fruit tree. For example, it is possible to use sensor data which is acquired by a sensor that is included in another agricultural machine distinct from the agricultural machine that cuts canes of a fruit tree. Moreover, a server computer that is connected to a network may function as a portion or an entirety of the data processor 530.

Figure 4E:
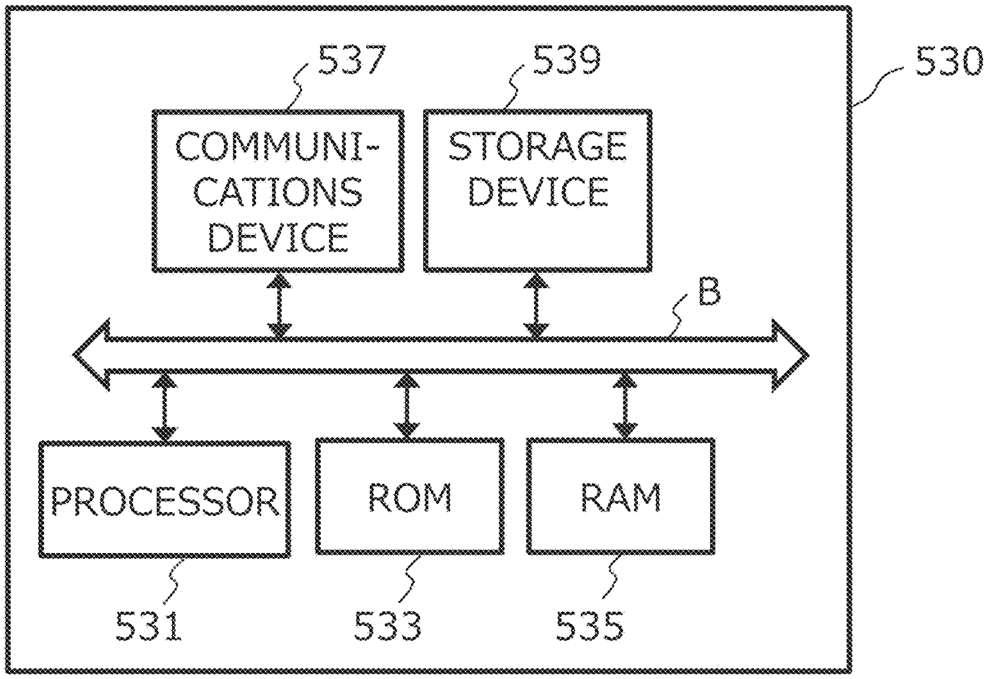
FIG. 4E is a block diagram showing an example configuration of a data processor included in a cutting system according to an example embodiment of the present disclosure.

FIG. 4E is a block diagram showing an example configuration of the data processor 530. In the example of FIG. 4E, the data processor 530 includes a processor 531, a ROM (Read Only Memory) 533, RAM a (Random Access Memory) 535, a communications device 537, and a storage device 539. These components may be interconnected via a bus B.

The processor 531 may be a semiconductor integrated circuit, also called a central processing unit (CPU) or a microprocessor. The processor 531 may include a graphics processing unit (GPU). The processor 531 consecutively executes a computer program describing predetermined instructions and being stored in the ROM 533, and performs processes that are necessary for the cut-point data generation according to example embodiments of the present disclosure. The data processor 530 may include a plurality of processors 531. The plurality of processors 531 may work in cooperation to perform the processes that are necessary for the cut-point data generation according to the present disclosure. A portion or an entirety of the processor 531 may be an FPGA (Field Programmable Gate Array), an ASIC (Application Specific Integrated Circuit), or an ASSP (Application Specific Standard Product) incorporating a CPU.

The communications device 537 is an interface to perform data communications between the data processor 530 and an external computer. The communications device 537 is capable of wired communications via a CAN (Controller Area Network) or the like, or wireless communications compliant with the Bluetooth (registered trademark) standards and/or the Wi-Fi (registered trademark) standards.

The storage device 539 is able to store sensor data acquired from the sensor group 520, sensor data currently under processing, data currently under processing to generate cut-point data, etc. The storage device 539 includes a hard disk drive or a non-volatile semiconductor memory, for example.

The hardware configuration of the data processor 530 is not limited to the above example. It is not necessary for a portion or an entirety of the data processor 530 to be mounted in the agricultural machine that cuts canes of a fruit tree. By utilizing the communications device 537, a computer or computers located outside the agricultural machine that cuts the canes of a fruit tree may be allowed to function as a portion or an entirety of the data processor 530. For example, a computer or computers included in a server computer(s) and/or a terminal device(s) that is connected to a network may function as a portion or an entirety of the data processor 530. On the other hand, a computer or computers that is mounted in the agricultural machine that cuts canes of a fruit tree may perform all functions required of the data processor 530.

An example of the "controller" in an example embodiment of the present disclosure is a computer that includes at least one processor and at least one memory storing a computer program (code) defining control processes to be executed by the processor. Another example of the "controller" is a computer equipped with an FPGA (Field-Programmable Gate Array), an ASSP (Application Specific Standard Product), an ASIC (Application-Specific Integrated Circuit), or other hardware accelerators configured to execute the control processes.

Similarly, an example of the "data processor" in an example embodiment of the present disclosure is a computer including at least one processor and at least one memory storing a computer program (code) defining operating processes to be executed by the processor. Another example of the "data processor" is a computer equipped with an FPGA, an ASIC, or other hardware accelerators configured to execute the operating processes.

A "processor" in an example embodiment of the present disclosure is a hardware electronic circuit such as a CPU (Central Processing Unit), a GPU (Graphics Processing Unit), a DSP (Digital Signal Processor), an ISP (Image Signal Processor), or an NPU (Neural Network Processing Unit). A "memory" is a hardware electronic circuit such as a ROM (Read Only Memory) or a RAM (Random Access Memory). A portion of the memory may be a storage medium that is connected to the processor via interconnects or a network. These hardware electronic circuits may be implemented by one or more integrated circuits (IC) or large-scale integrated circuits (LSI). Each functional unit or block and its associated components within the electronic circuit may be individually manufactured as an individual integrated circuit chip, or a portion or an entirety of these functional units or blocks may be combined so as to be manufactured as a single integrated circuit chip.

A program defining the operation of a processor is designed so that the processor will execute one or more functions, manipulations, steps, or process according to an example embodiment of the present invention.

Figure 4F:
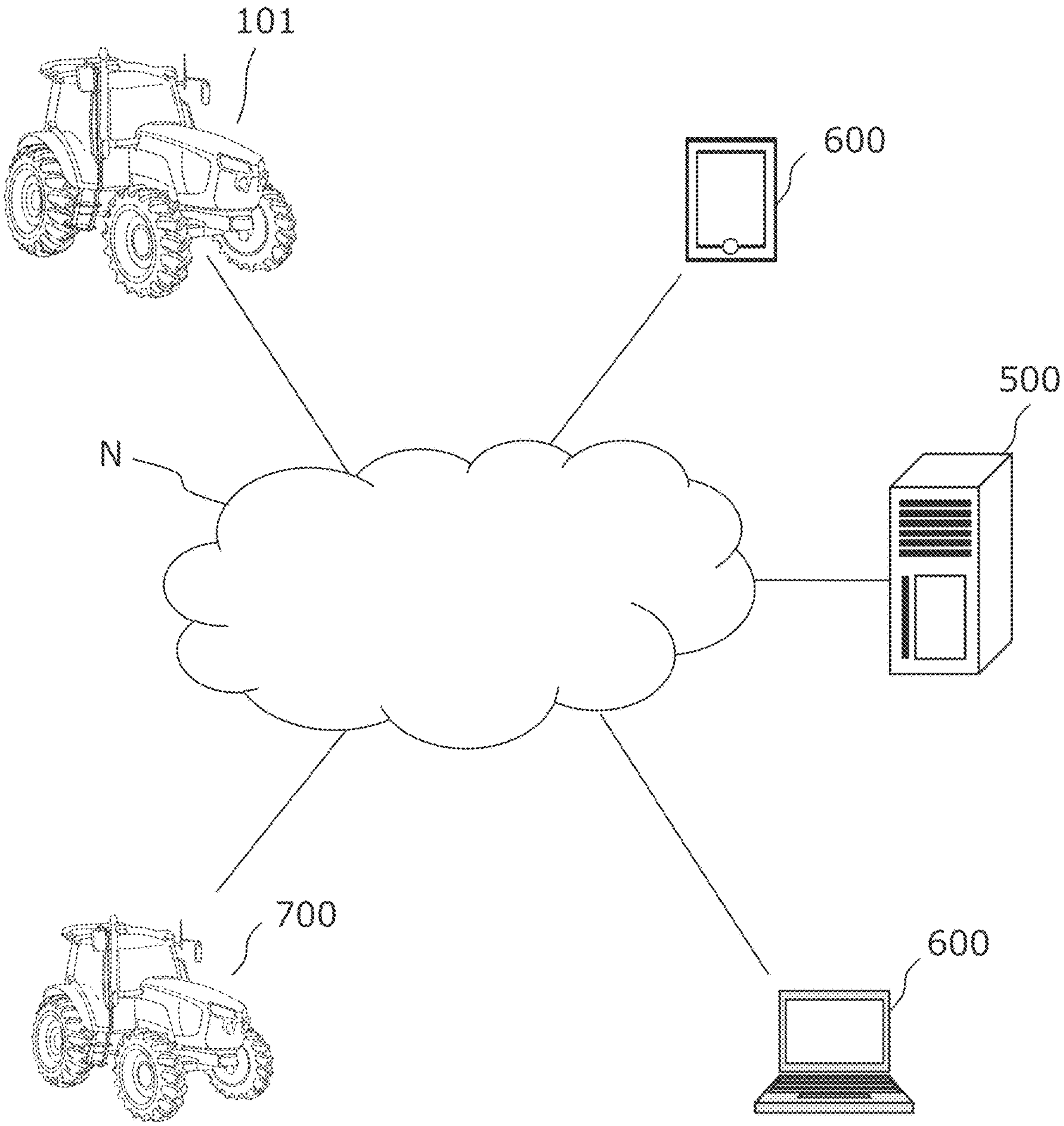
FIG. 4F is a schematic diagram showing an example configuration of a cutting system according to an example embodiment of the present disclosure.

FIG. 4F is a schematic diagram showing an example configuration of the cutting system. The data processor 530 is not limited to the example of being mounted in the agricultural machine 101. In other words, some or all functions of the data processor 530 may be realized by a server(s) (computer(s)) 500 and/or a terminal device(s) 600 (including mobile types and stationary types) that is connected to the communications device 537 of the data processor 530 via a communications network N. To such a communications network N, another agricultural machine (e.g., a tractor) 700 may be connected, and communications may be performed between the agricultural machine 101 including the data processor 530 and the other agricultural machine 700. A portion of the data used in the processing by the data processor 530 via the communications network N may be provided from the other agricultural machine 700 to the data processor 530.

Figure 6A:
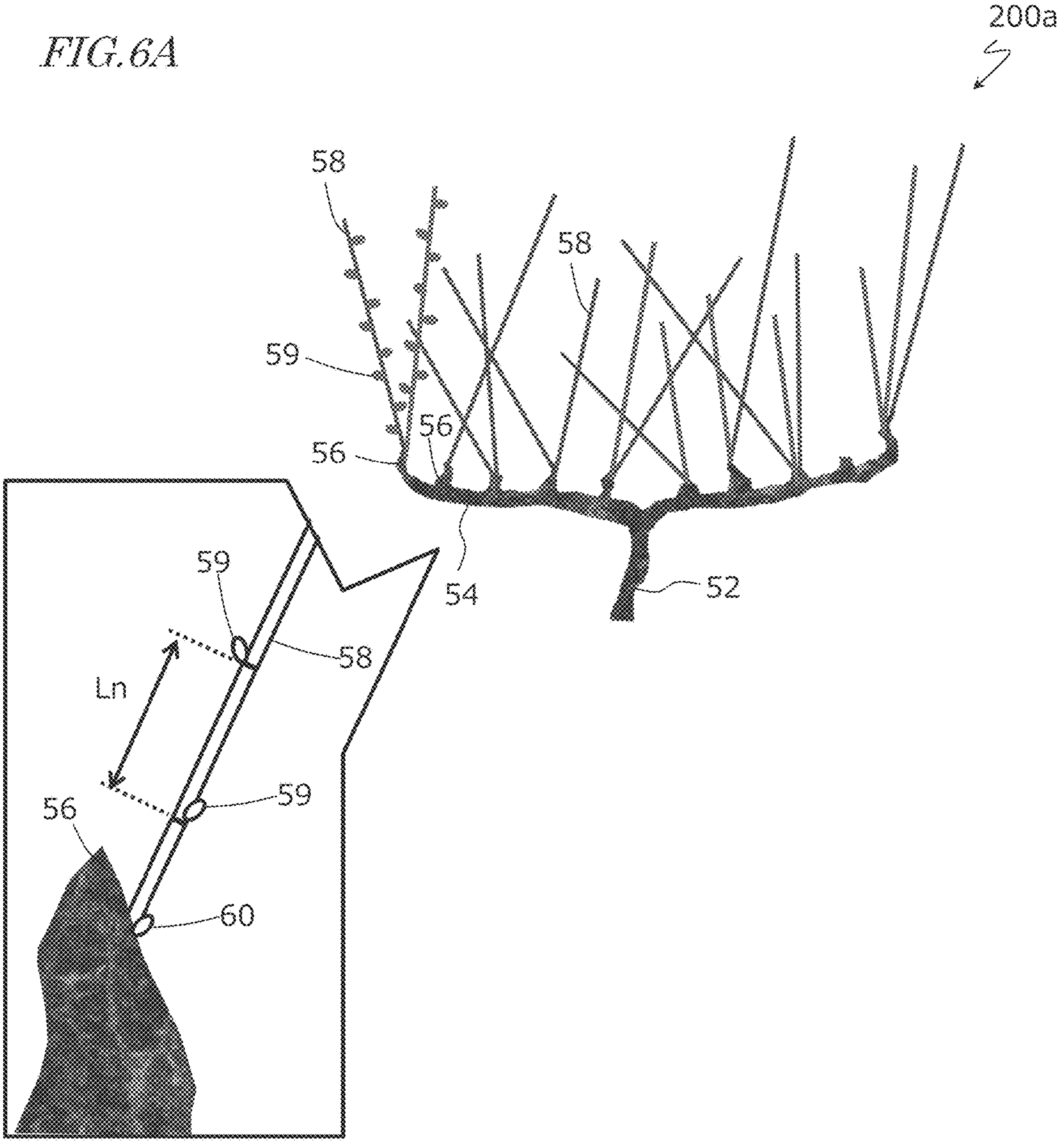
FIG. 6A is a schematic diagram for describing spur pruning.
Figure 6B:
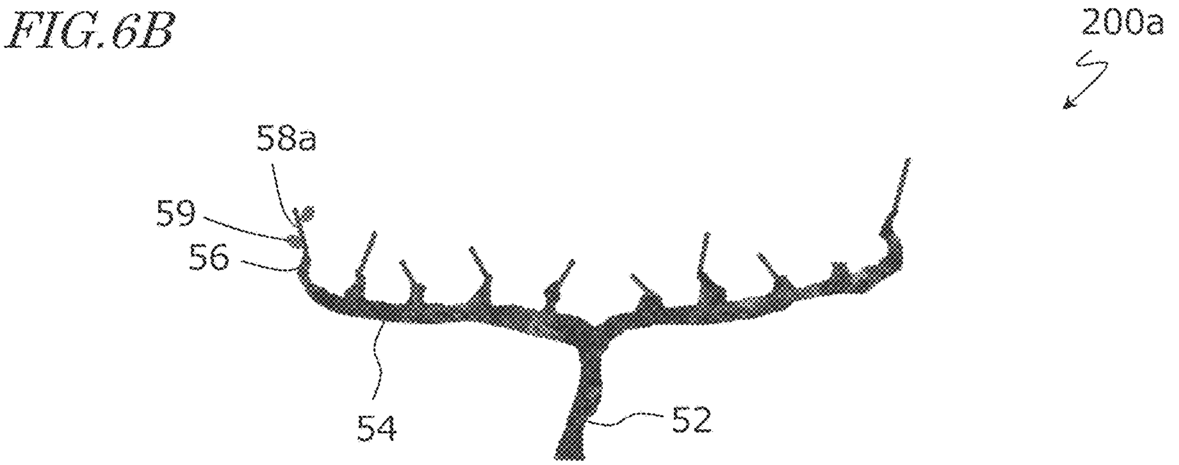
FIG. 6B is a schematic diagram for describing spur pruning.
Figure 6C:
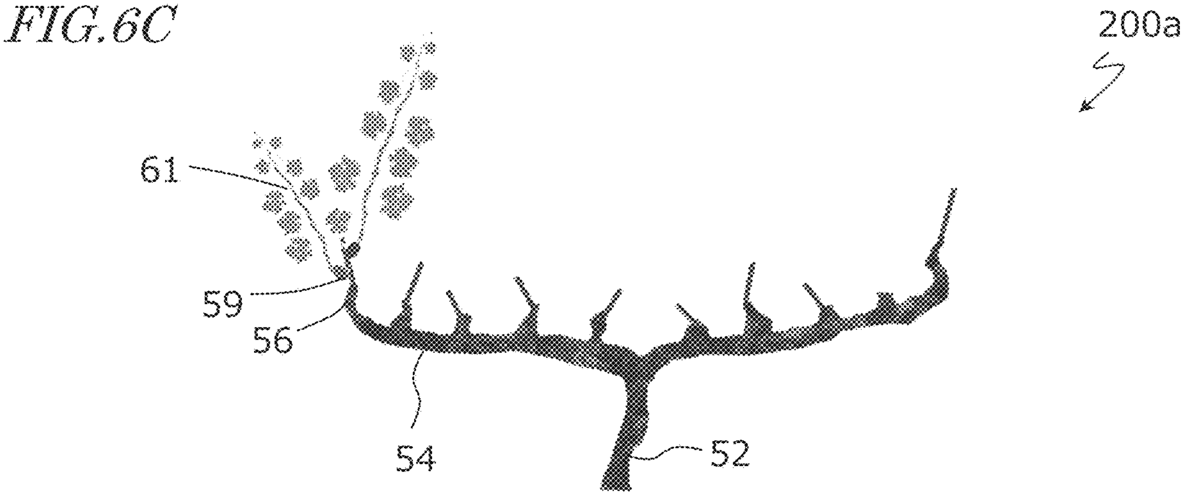
FIG. 6C is a schematic diagram for describing spur pruning.

With reference to FIGS. 6A to 6C, spur pruning will be described. FIGS. 6A to 6C are schematic diagrams for describing spur pruning. FIG. 6A schematically shows a fruit tree 200*a* before pruning, for which harvesting has been finished and whose leaves have fallen, a portion of the fruit tree 200*a* is shown enlarged in a balloon. FIG. 6B schematically shows the fruit tree 200*a* having been pruned from the state in FIG. 6A, and FIG. 6C schematically shows the fruit tree 200*a* thereafter. For simplicity, buds 59 and shoots 61 are only illustrated for less than all canes 58, while they are omitted for any other canes 58.

As shown in FIG. 6A, the fruit tree 200*a* has a plurality of spurs 56, each spur 56 having a plurality of canes 58 growing therefrom. Each cane 58 has buds 59. A basal bud 60, which is located the closest to the base of each cane 58 (i.e., on the closer side to the spur 56) is distinguished from the other buds 59 in the illustration. In the present specification, unless otherwise specified, "buds" on a cane are exclusive of the basal bud. Among the buds 59 on each cane 58, the distance between two adjacent buds 59 is referred to as a length Ln between the nodes. In spur pruning, as shown in FIG. 6B, among the plurality of canes 58 growing from each spur 56, typically only one each is retained, while all other canes 58 are removed. As for the cane 58 to be retained, too, it is cut short so as to include only a few (e.g., 2 or 3) buds 59. A cane 58 that has been cut short but is retained is indicated with reference numeral "58*a*". This retained cane 58*a* may be referred to as a fruiting cane. As a result of growing from the state in FIG. 6B, as shown in FIG. 6C, shoots 61 that have sprouted from the buds 59 on the fruiting cane 58*a* grow into canes, and bear fruits. The shoots 61 that have grown change into canes, thus becoming a target of pruning in the next period of dormancy (e.g., the next winter). Note that, for the purpose of the pruning during the next period of dormancy, the fruiting cane 58*a* and the spur 56 may be collectively referred to as a spur.

In the illustrated example, the plurality of spurs 56 are supported by thick canes 54 that extend substantially along the horizontal direction. The thick canes 54 are supported by a trunk 52 that extends substantially along the vertical direction from the ground surface. The thick canes 54 may be called cordons. Such a training method may be referred to as cordon training. As in the illustrated example, a training method where two cordons 54 extend from the trunk 52 (e.g., two cordons 54 extend on both the right and left sides of the trunk 52) is called double-cordon training or bilateral-cordon training. On the other hand, a training method where only one cordon 54 extends from the trunk 52 is called single-cordon training. Depending on the training method, the fruit tree may not have any cordon 54 that extends substantially along the horizontal direction. For example, in head training, all of the plurality of canes grow from a head that is located above the trunk, such that no cordons exist between the trunk and the canes.

In the illustrated example, among the plurality of canes 58 growing from each spur 56, only one cane 58 is retained as a fruiting cane, but this example is not limiting. For example, in addition to a fruiting cane, a renewal cane (reserve fruiting cane) may further be retained. The renewal cane is cut short so as to only include a few buds (e.g., two or three).

Figure 7A:
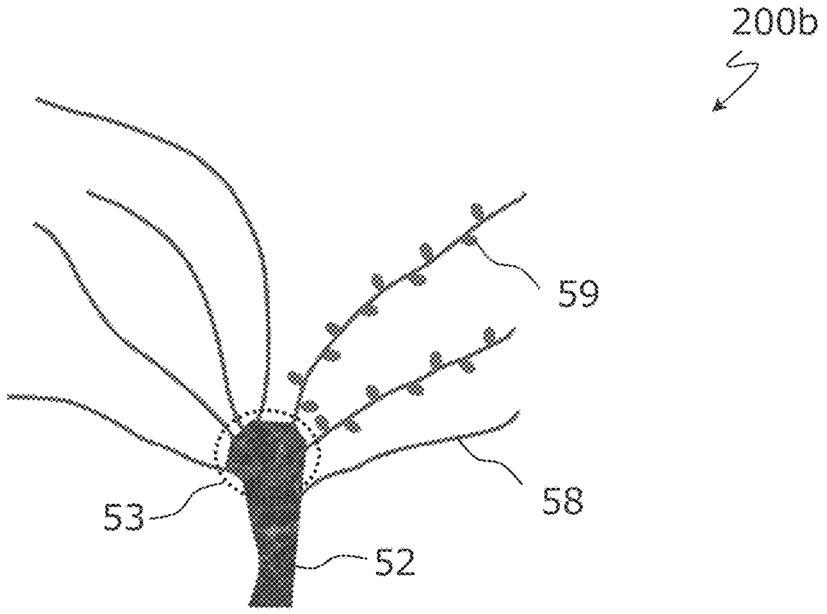
FIG. 7A is a schematic diagram for describing cane pruning.
Figure 7B:
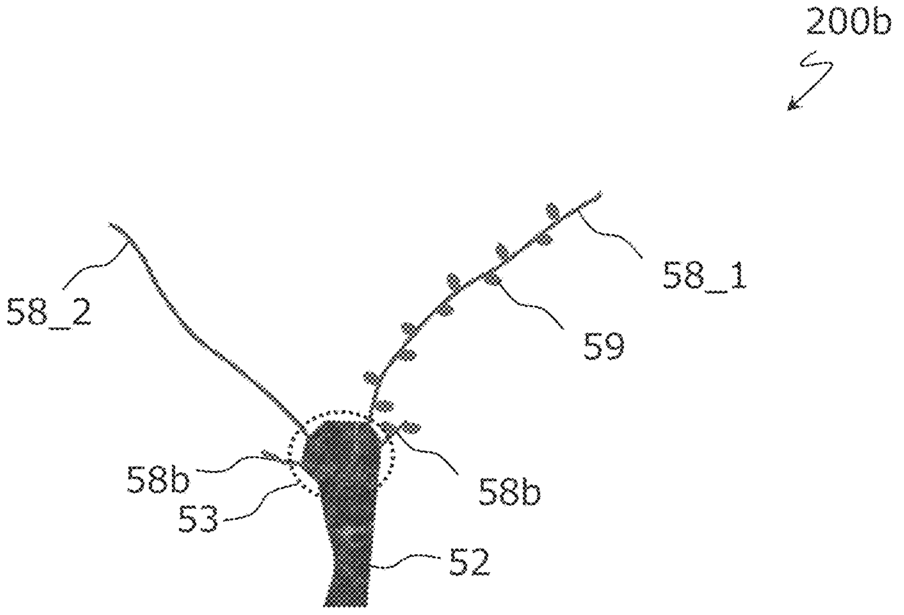
FIG. 7B is a schematic diagram for describing cane pruning.
Figure 7C:
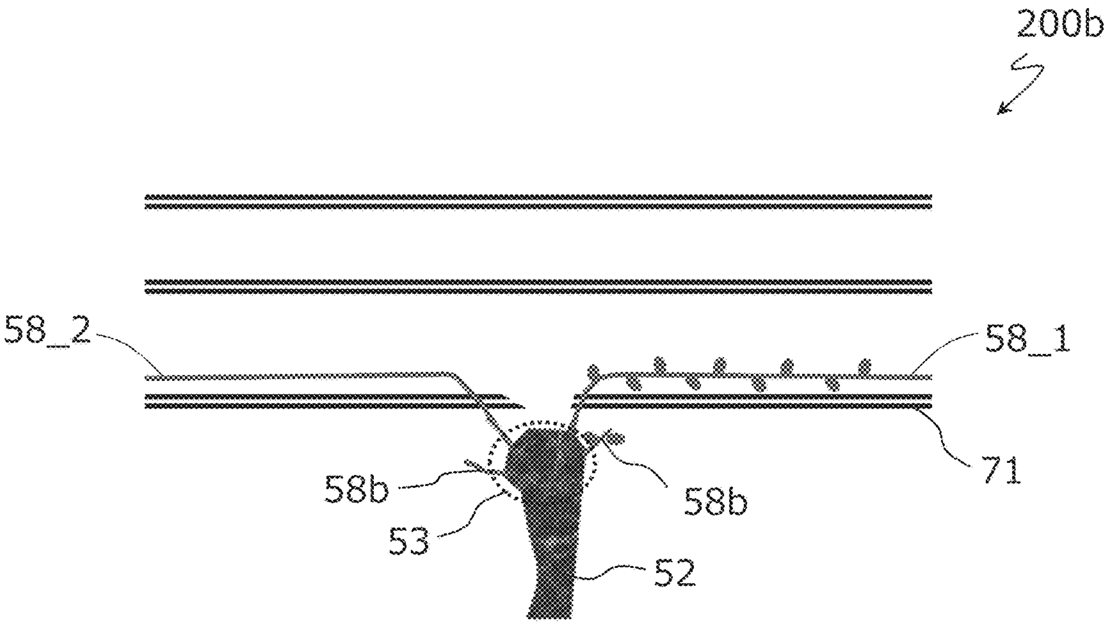
FIG. 7C is a schematic diagram for describing cane pruning.
Figure 7D:
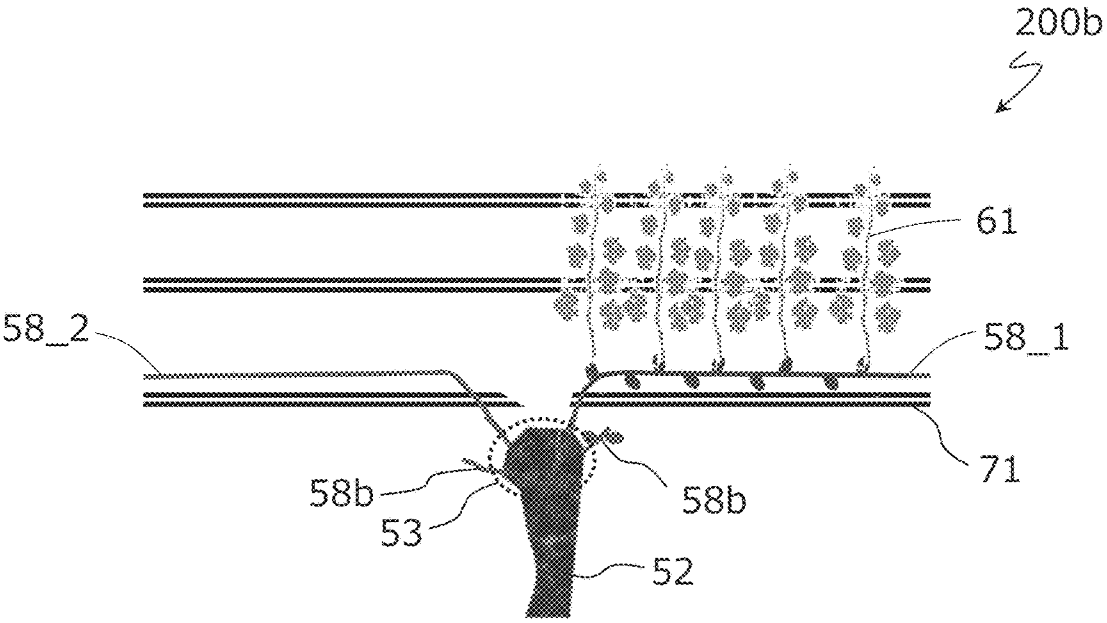
FIG. 7D is a schematic diagram for describing cane pruning.

With reference to FIGS. 7A to 7D, cane pruning will be described. FIGS. 7A to 7D are schematic diagrams for describing cane pruning. FIG. 7A schematically shows a fruit tree 200*b* before pruning, for which harvesting has been finished and whose leaves have fallen. FIG. 7B schematically shows the fruit tree 200*b* having been pruned from the state in FIG. 7A. FIG. 7C schematically shows the fruit tree 200*b* having undergone drawing and tying work from the state in FIG. 7B. FIG. 7D schematically shows the fruit tree 200*b* thereafter. For simplicity, buds 59 and shoots 61 are only illustrated for less than all canes 58, while they are omitted for any other canes 58.

In cane pruning, among the plurality of canes 58 growing from the head 53 of the trunk 52 as shown in FIG. 7A, a few (e.g., about two to four) canes 58 are retained, while all other canes 58 are removed, as shown in FIG. 7B. In the illustrated example, two canes 58_1 and 58_2 are retained among the plurality of canes 58. In cane pruning, the canes 58 to be retained (58_1 and 58_2) are basically not cut. As shown in FIG. 7C, after pruning work, drawing and tying work for the retained canes 58 is performed. In order to determine the direction for shoots to extend from the buds 59 on any retained cane 58, the retained cane 58 is bent in a desired direction, and fixed to a wire 71. In this example, for instance, the retained cane 58 is fixed to the wire 71 extending substantially along the horizontal direction so that it will extend substantially along the horizontal direction. The wire 71 may be supported by a post(s) extending substantially along the vertical direction, for example. As a result of growing from the state in FIG. 7C, as shown in FIG. 7D, the shoots 61 sprouting from the buds 59 on the retained cane 58 will grow and bear fruits. The retained cane 58 may be referred to as fruiting canes.

In cane pruning, the number of canes 58 to be retained may also vary depending on the training method for the fruit tree, for example. As in the illustrated example, in a case of allowing the fruiting canes 58 to extend on both the right and left sides of the trunk 52, two canes 58 to be retained are chosen. As in the illustrated example, a training method where two fruiting canes 58 extend from the trunk 52 is called double guyot training. On the other hand, a training method where only one fruiting cane extends from the trunk 52 is called single guyot training. Note that the training method illustrated in the figure may be classified as head training (head-trained) because no thick canes that extend substantially along the horizontal direction exist and all of the plurality of fruiting canes 58 grow from the head 53 located above the trunk 52.

As in the illustrated example, a trellis system that is configured so that shoots (or canes) extend upward along the vertical direction is said to have a shape called VSP (vertical shoot position). The trellis system includes posts, wires, nets, etc., for supporting the canes and vines of plants.

As in the illustrated example, in addition to a predetermined number (for example, two in the figure) of fruiting canes 58, renewal canes 58*b* may be further retained. The renewal canes 58*b* are retained after being cut short so as to possess a predetermined number (e.g., a few) of buds 59.

Figure 8:
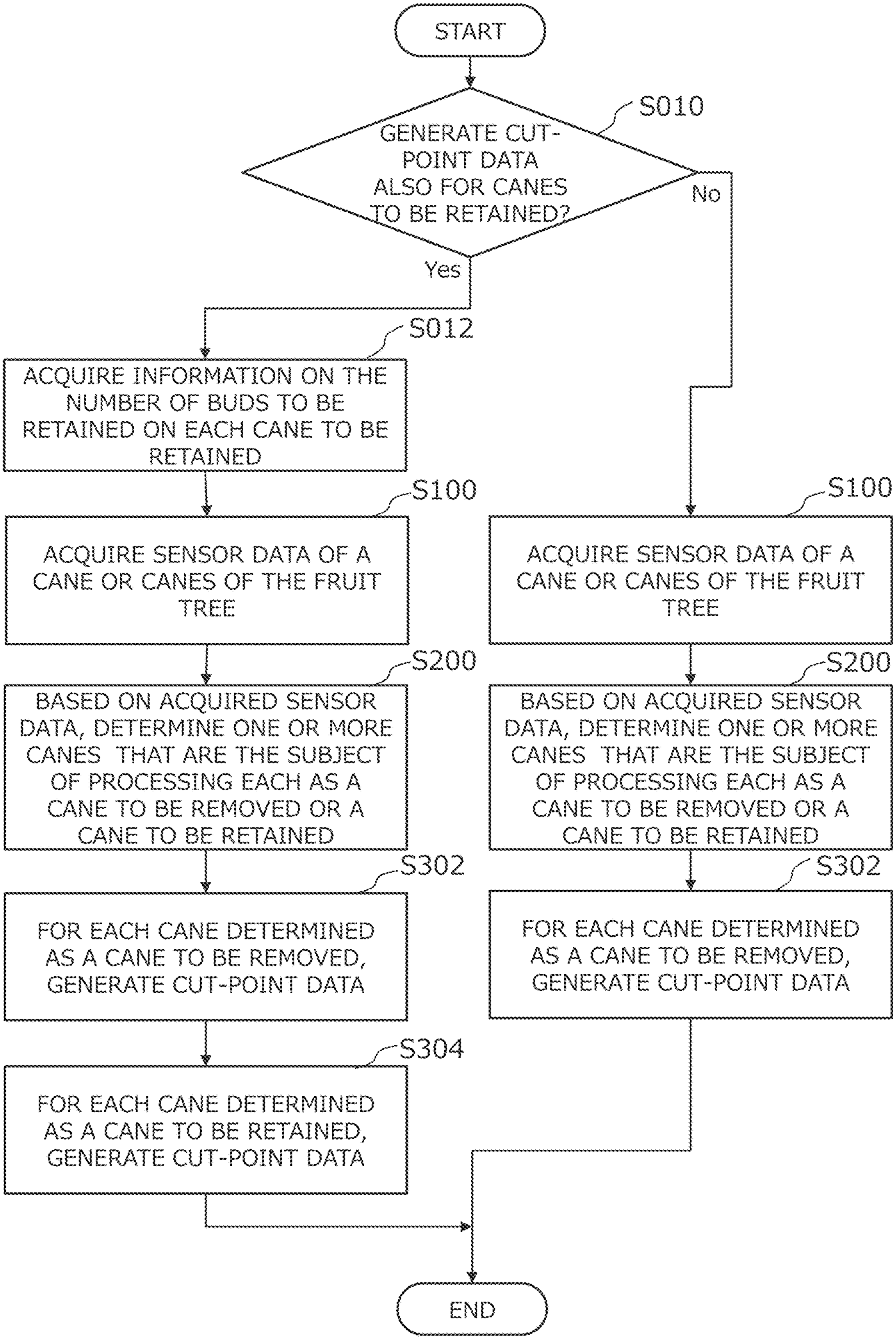
FIG. 8 is a flowchart showing an example procedure of generating cut-point data of canes of a fruit tree, according to an example embodiment of the present disclosure.

FIG. 8 is a flowchart showing an example procedure of generating cut-point data of canes of a fruit tree, according to an example embodiment of the present disclosure. The flowchart of FIG. 8 differs from the flowchart of FIG. 4A mainly in that it further includes step S010 and step S012. The example of FIG. 8 is also applicable to the flowcharts of FIGS. 4B and 4C.

As described above, the cane pruning scenario differs from the spur pruning scenario in that cut-point data may not be generated for the cane(s) 58 determined as a cane(s) to be retained. Canes that are determined as canes to be retained include fruiting canes, for example, in both cases of spur pruning and cane pruning. Canes that are determined as canes to be retained may further include renewal canes in addition to fruiting canes, in both cases of spur pruning and cane pruning. The canes to be removed are all canes other than the canes determined as canes to be retained.

At step S010 in FIG. 8, it is judged whether or not to generate cut-point data also for the cane(s) determined as a cane(s) to be retained. The judgment is made based on a user input, for example. In accordance with the pruning method for the fruit tree, training method, or the like, for example, a user may make an input as to whether cut-point data is generated for canes to be retained or not. In the case of spur pruning, for example, step S010 should be Yes. In cane pruning, too, there may be cases where cut-point data is generated for a cane(s) 58 determined as a cane(s) to be retained. For example, for the cane 58 determined to be retained as a fruiting cane, cut-point data may be generated in order to adjust the number of buds 59 on that cane 58, for example. For the cane 58 determined to be retained as a renewal cane, cut-point data may be generated so that it will possess a predetermined number of buds 59. These cases are also included in the Yes case in step S010.

If Yes at step S010, control proceeds to step S012.

At step S012, information on the number of buds to be retained on each cane to be retained is acquired. Information on the number of buds to be retained is acquired based on a user input, for example. Alternatively, the number of buds to be retained may be a predetermined value, which may be stored in a lookup table or in a memory. For example, in accordance with the cultivar of the fruit tree, the pruning method, the training method, the cultivation plan based on a yield plan, the field design (e.g., vineyard design, if the fruit tree is a grape vine), or the like, a user is able to input a number of buds to be retained on each cane to be retained. The field design and the vineyard design may be determined based on a factor including at least one of the shape of the trellis system, the pruning method, and the training method, for example.

Next, control proceeds to step S100 (acquisition of sensor data) and step S200 (determination as to a cane to be removed or a cane to be retained). The processes of step S100 and step S200 are performed similarly to the processes in the example of FIG. 4A. The one or more canes that are the subject of processing at step S200 may be one or more canes among which a fruiting cane could be selected, for example, not including cordons or trunks.

Next, control proceeds to step S300 (generation of cut-point data). If Yes at step S010, step S300 includes step S302 and step S304.

At step S302, for each cane 58 determined as a cane to be removed in step S200, cut-point data is generated. The cut-point data of the cane to be removed is generated so that each cane 58 determined as a cane to be removed does not possess any buds after being cut (i.e., so that zero buds will be possessed after being cut). For example, in the case of spur pruning and cordon training, cut-point data is generated so that cutting will be made at a position close to a spur 56 at the base of that cane 58. For example, cut-point data is generated so that cutting is made between the spur 56 at the base of that cane 58 and the bud 59 that is the closest to the spur 56 among the buds 59 on that cane 58. In the case of head training (e.g., in the case of cane pruning), cut-point data is generated so that cutting is made at a position close to a head 53 at the base of that cane 58. For example, cut-point data is generated so that cutting is made between the head 53 at the base of that cane 58 and the bud 59 that is the closest to the head 53 among the buds 59 on that cane 58.

At step S304, cut-point data is generated for each cane 58 determined as a cane to be retained. Based on information on the number of buds to be retained on each cane to be retained acquired in step S012, cut-point data for each cane 58 determined as a cane to be retained is generated. The cut-point data of the cane to be retained is generated so that each cane 58 determined as a cane to be retained possesses one or more buds 59 after being cut. The order of step S302 and step S304 is not limited, and they may be performed concurrently (in parallel).

If No at step S010, control proceeds to step S100. The No scenario at step S010 differs from the Yes scenario at step S010 in that step S012 and step S304 are not performed.

In the example of FIG. 8, step S010 and step S012 are performed before step S100, but this is not a limitation. It suffices that step S010 and step S012 are performed before step S300; for example, they may be performed at step S100 and step S200.

Figure 9A:
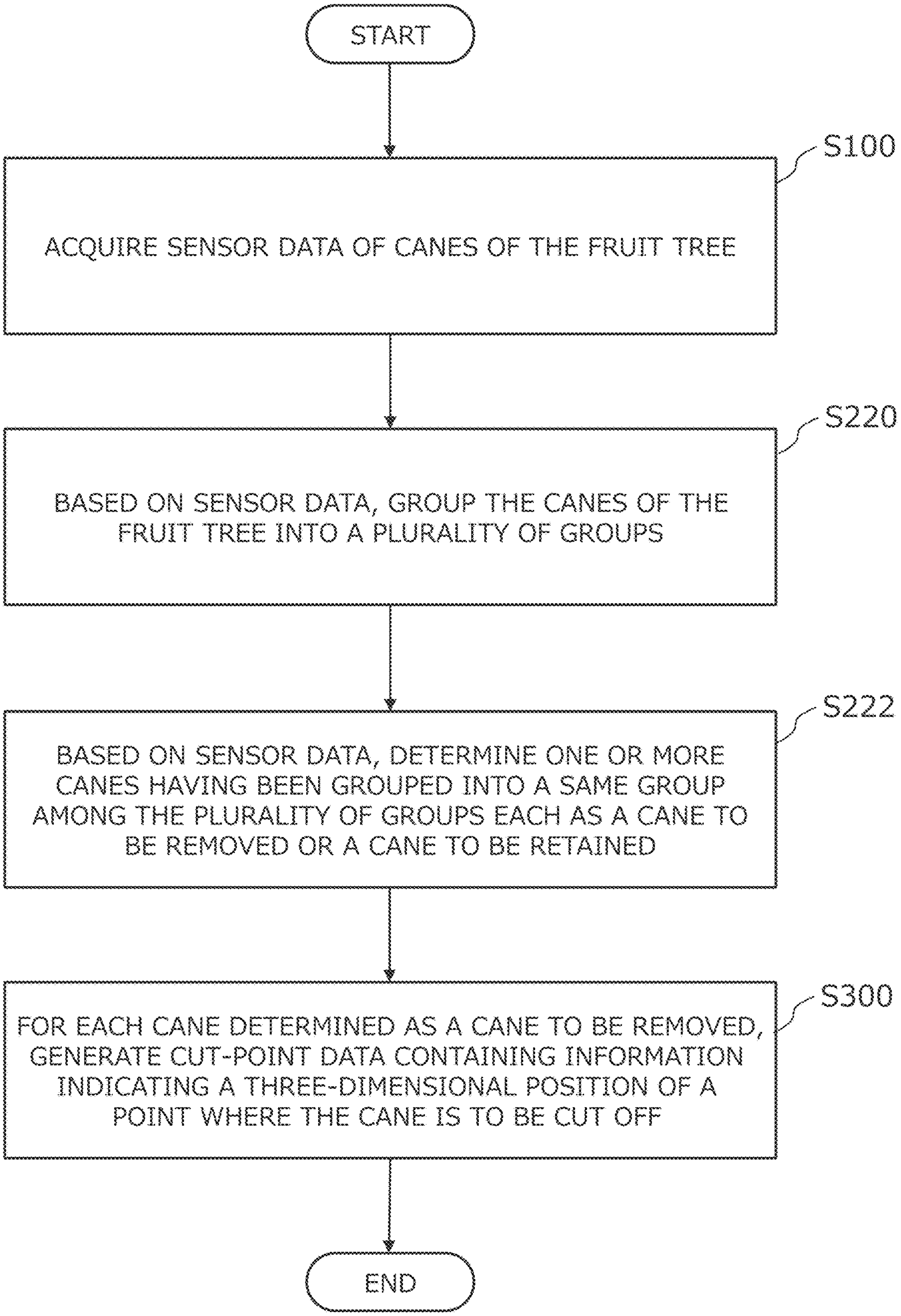
FIG. 9A is a flowchart showing an example procedure of generating cut-point data of canes of a fruit tree, according to an example embodiment of the present disclosure.

FIG. 9A is a flowchart showing an example procedure of generating cut-point data of canes of a fruit tree, according to an example embodiment of the present disclosure. The flowchart of FIG. 9A differs from the flowchart of FIG. 4A in that it includes step S220 and step S222 as the processes to be performed at step S200. The example of FIG. 9A can be combined with any of the aforementioned flowcharts. For example, the example of FIG. 9A is applicable to the flowchart of FIG. 4B, FIG. 4C, or FIG. 8. The same is also true of the subsequent examples flowcharts.

In the example of FIG. 9A, the procedure of generating cut-point data of canes of a fruit tree includes acquiring sensor data of a plurality of canes of the fruit tree by a sensor or sensors (step S100), grouping the plurality of canes into a plurality of groups based on the sensor data (step S220), based on the sensor data, determining one or more canes having been grouped into a same group among the plurality of groups each as a cane to be removed or a cane to be retained (step S222), and, for each cane determined as a cane to be removed, generating cut-point data including information indicating a three-dimensional position of a point where the cane is to be cut off (step S300).

The process of step S100 is performed similarly to the process in the example of FIG. 4A.

After step S100, at step S220, based on the sensor data acquired in step S100, the plurality of canes 58 of the fruit tree are grouped into a plurality of groups. Grouping of the plurality of canes 58 may be performed based on the respective base positions of the plurality of canes 58. For example, in the case of spur pruning and cordon training, the plurality of groups respectively correspond to the plurality of spurs 56 of the fruit tree. Among the plurality of canes 58 of the fruit tree, any canes 58 growing from the same spur 56 may be grouped into the same group. Among the plurality of canes 58 of the fruit tree, any canes 58 growing from within a region spanning a predetermined range may be grouped into the same group.

In the case of cane pruning and/or head training, the plurality of canes of the fruit tree are grouped into a group or groups, of a varying number depending on the number of canes to be retained as fruiting canes, for example. Example combinations of the number Nn of canes to be retained as fruiting canes and the number Ng of groups are: (Nn,Ng)=(1,1); (2,2); (3,3 or 2); (4 or more,2); and so on. For instance, in the case of using a training method (double guyot) where two fruiting canes extend from the head, the plurality of canes of the fruit tree can be grouped into two groups. When the plurality of canes of one fruit tree include canes extending in a direction (e.g., one of the right or left direction) with respect to a head or a trunk in the center and canes extending in an opposite direction (e.g., the other of the right or left direction) from the head or trunk, one or more canes extending in one direction are grouped into a first group and one or more canes extending in the other direction are grouped into a second group. When the plurality of canes of one fruit tree extend only in one direction with respect to a head or a trunk in the center (e.g., in the case of single guyot), all canes are treated as one group. That is, the aforementioned grouping process may be omitted.

Figure 10A:
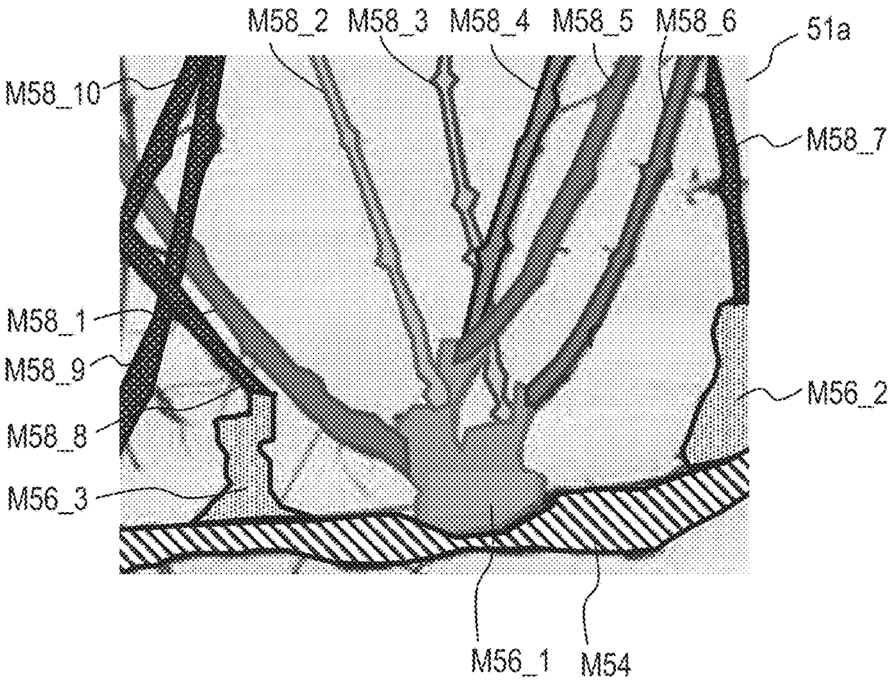
FIG. 10A is a diagram showing another example of an image to be used in step S220.
Figure 10B:
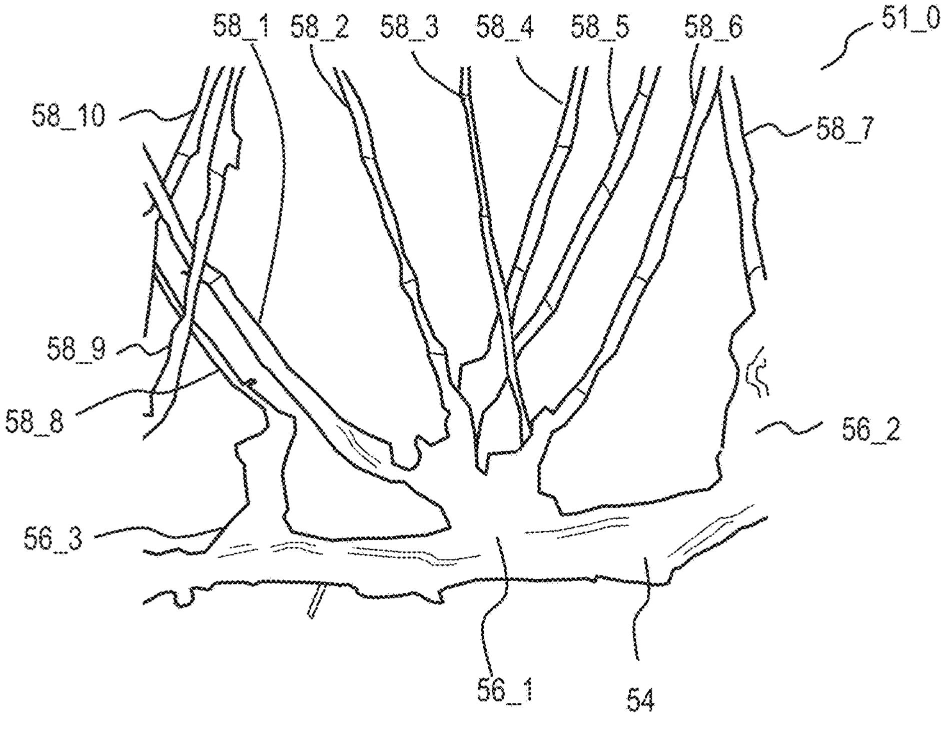
FIG. 10B is a diagram showing an example of an image acquired in step S100.
Figure 10C:
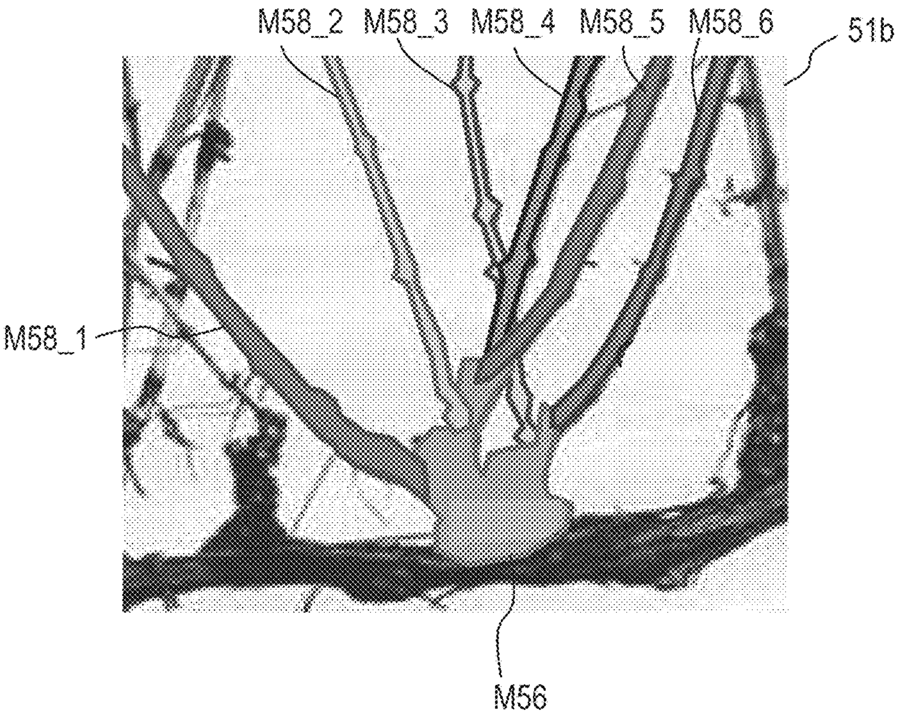
FIG. 10C is a diagram showing another example of an image to be used in step S220.

FIGS. 10A and 10C are examples of images to be used in step S220, and FIG. 10B is an example of an image acquired in step S100. An image 51*a* shown in FIG. 10A can be obtained through an instance segmentation being applied to an image 51_0 of a fruit tree obtained with the camera 20 as shown in FIG. 10B. "Segmentation (division into regions)" is a general term for algorithms in which objects or instances that are included in an image are classified in a pixel-by-pixel manner into classes or categories, for use in deep learning. Among other segmentations, instance segmentation is an algorithm that classifies instances included in an image. By applying instance segmentation to an image including canes of a fruit tree, individual segments of a fruit tree can be identified or extracted. The segmented image contains masks to extract respective sites (e.g., trunk, cordons, fruiting canes, canes, spurs, etc.) of a fruit tree within the input image data. For example, the segmented image 51*a* includes spur masks M56_1, M56_2 and M56_3 to extract spurs 56_1, 56_2 and 56_3, respectively, cane masks M58_1, M58_2, M58_3, M58_4, M58_5 and M58_6 to extract canes 58_1, 58_2, 58_3, 58_4, 58_5 and 58_6, respectively, and a cordon mask M54 to extract the cordon 54. In the figure, the region extracted by each mask is indicated with a hatching (or color) and a reference numeral for the mask. The cane masks M58_1 to M58_6 may be collectively referred to as cane masks M58, whereas the spur masks M56_1 to M56_3 may be collectively referred to as spur masks M56.

At step S220, based on the segmented image 51*a* as shown in FIG. 10A, for example, the plurality of canes 58 of the fruit tree can be grouped into a plurality of groups. Based on the segmented image 51*a*, each cane 58 may be associated with its corresponding spur 56. Canes 58 that are associated with an identifier indicating the same spur 56 are grouped into the same group. For example, each cane mask M58 may be associated with the nearest spur mask M56. For example, as a pixel(s) that is included in both a cane mask M58 and a spur mask M56 becomes identified, an overlap between the cane mask M58 and the spur mask M56 is known, whereby a connection point between the cane mask M58 and the spur mask M56 becomes identified. As the connection points between the cane masks M58 and the spur masks M56 becomes identified, each cane mask M58 allows itself to be associated with the spur mask M56 that it adjoins via a connection point. For example, in the example of FIG. 10A, as the cane masks M58_1 to M58_6 are associated with the spur mask M56_1, it is recognized that the six canes 58_1 to 58_6 indicated by the cane masks M58_1 to M58_6 are growing from the spur 56_1 indicated by the spur mask M56_1. Therefore, the six canes 58_1 to 58_6 growing from the spur 56_1 are grouped into a group that is associated with the spur 56_1. In order to schematically represent results of the grouping, FIG. 10C shows a segmented image 51*b* that only contains these masks. The segmented image 51*b* shown in FIG. 10C differs from the segmented image 51*a* shown in FIG. 10A in that it includes no other masks.

Although FIGS. 10A and 10B show example images that only include the neighborhood of the spur 56_1 in the fruit tree, in practice, images including a broader range may be used in step S220 (grouping process). Images including the entire fruit tree may be used.

Similarly to the example of FIG. 10A, buds on a cane may be identified or extracted by applying instance segmentation to an image including canes of the fruit tree, or identified or detected through object detection. For each of the buds identified through instance segmentation or object detection, an identifier (e.g., a cane mask M58) indicating the corresponding cane is associated. When buds are identified through instance segmentation, by identifying a pixel(s) included in both of a bud mask to extract a bud and a cane mask M58, a connection point between the bud mask and the cane mask M58 is identified. The bud mask for each bud may be associated with a cane mask M58 that it adjoins via the connection point. For the object detection process, an object detection model that has been trained by using an algorithm based on deep learning can be used. Moreover, object detection algorithms such as YoloV5 and Yolov4 can be used. An image to which an object detection process has been applied may include bounding boxes of a rectangular shape to detect respective buds. The center point of a bounding box, or any of the four vertices of the rectangle, may be used as reference coordinates indicating the position of a bud. Based on the relative positioning between the position (reference coordinates) of each bud and the cane masks M58, each bud may be associated with the nearest cane mask M58.

Next, at step S222, based on the sensor data acquired in step S100, each of the one or more canes 58 that were grouped into the same group in step S220 is determined as a cane to be removed or a cane to be retained. Because canes to be retained (e.g., fruiting canes) can be selected from among the one or more canes 58 that were grouped into the same group within the plurality of canes of the fruit tree, pruning work can be efficiently performed while maintaining the fruit yield and quality. When the plurality of groups correspond to the plurality of spurs 56, it becomes possible to select a fruiting cane(s) 58 for each spur 56, whereby cut-point data that is better adapted to the needs in pruning work can be generated. For example, from among one or more canes 58 that were grouped into the same group, a cane(s) 58 may be selected and determined as a cane to be retained, and any other cane 58 than the cane(s) 58 determined as the cane(s) to be retained may be determined as canes to be removed. In this case, the one or more canes that were grouped into the same group are two or more canes. Information on the number and kinds of canes to be retained may be acquired based on a user input, for example, and based on the acquired information, a cane(s) 58 may be selected as a cane(s) to be retained. The process of step S222 may be performed based on a segmented image as shown in FIG. 10C, for example.

All of the one or more canes 58 that were grouped into the same group may possibly be determined as canes to be removed. For example, if canes to be retained cannot be selected from among the one or more canes 58 that were grouped into the same group, or if there is no cane 58 that qualifies as a cane to be retained, all of the one or more canes 58 may be determined as canes to be removed. On the other hand, all of the one or more canes 58 that were grouped into the same group may be determined as canes to be retained. For example, if all of the one or more canes 58 that were grouped into the same group are judged unsuitable for pruning (cutting) (e.g., premature), all of the one or more canes 58 may be determined as canes to be retained. In this case, generation of cut-point data does not need to be performed.

Based on the determination in step S222, the process of step S300 is performed. The process of step S300 is performed similarly to the process in the example of FIG. 4A or FIG. 8.

After step S300, step S400 may further be included as in the example of FIG. 4B. In other words, the cut-point data generated in step S300 may be input to a controller configured or programmed to control a three-dimensional position of a cutter that cuts canes of the fruit tree (e.g., the cutting tool 24 in the cutting system 1 of FIG. 1). Thus, it is possible to use a cutter to perform cutting of canes of the fruit tree.

Figure 9B:
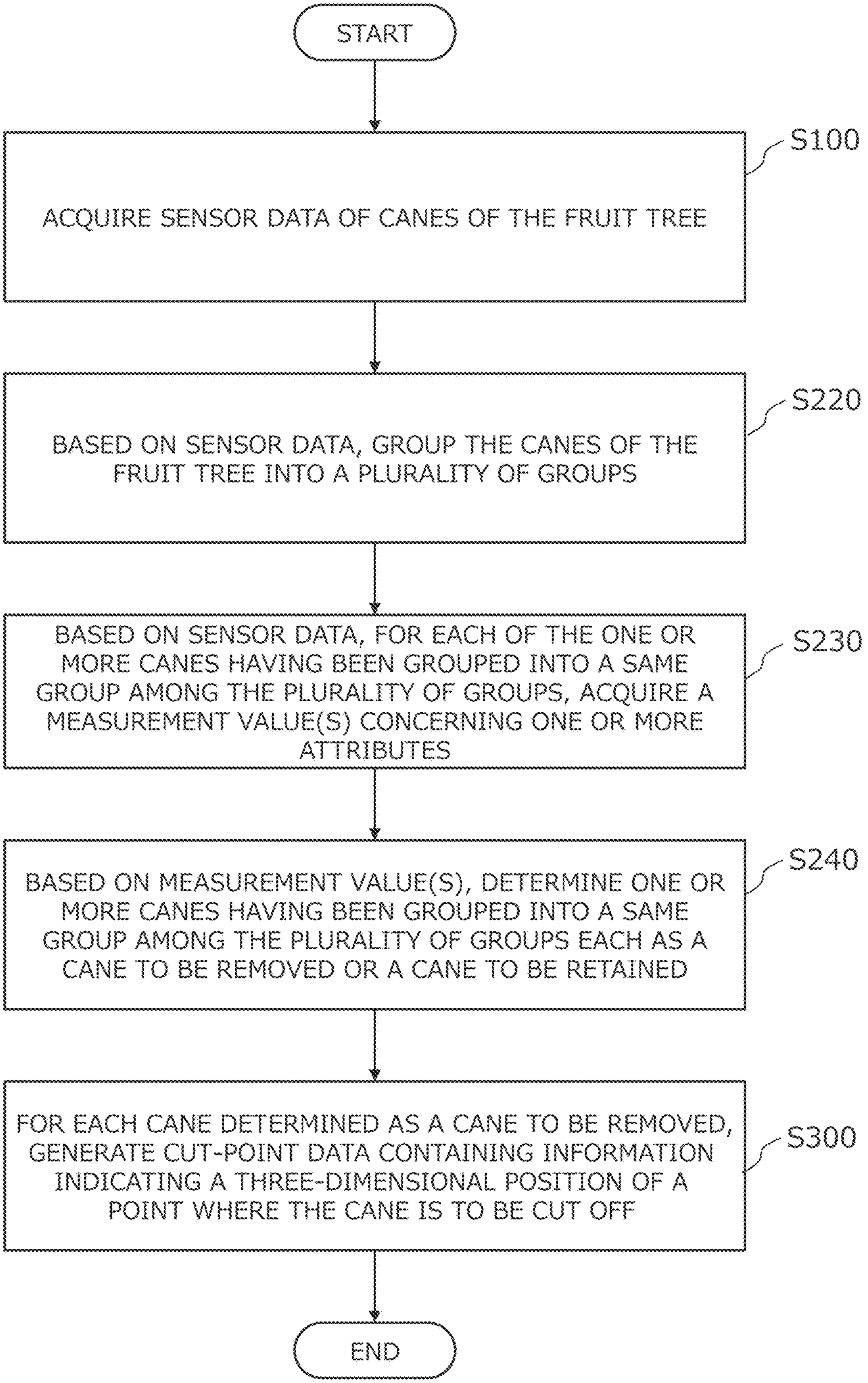
FIG. 9B is a flowchart showing an example procedure of generating cut-point data of canes of a fruit tree, according to an example embodiment of the present disclosure.

FIG. 9B is a flowchart showing an example procedure of generating cut-point data of canes of a fruit tree, according to an example embodiment of the present disclosure. The flowchart of FIG. 9B differs from the flowchart of FIG. 9A in that it includes step S230 and step S240, instead of step S222.

The processes of step S100 and step S220 are performed similarly to the processes in the example of FIG. 9A.

At step S230, based on the sensor data acquired in step S100, for each of the one or more canes 58 that were grouped into the same group in step S220, a measurement value(s) concerning one or more attributes is acquired. The one or more attributes include a color of the cane 58, a direction in which the cane 58 extends, a thickness of the cane 58, a height of the base of the cane 58, a size of the buds 59 on the cane 58, a direction in which the buds 59 on the cane 58 are facing, a length of the cane 58, a length between nodes of the cane 58 (i.e., distance between adjacent buds 59), and so on. Two or more attributes among the above may be included. In an example embodiment of the present disclosure, an "attribute" of a cane refers to an attribute that shows on the appearance of the cane, and may also be expressed as a morphological feature, an apparent property, or an apparent feature. Details of each attribute will be described later. For example, based on a segmented image as shown in FIG. 10C, for each of the one or more canes 58 that were grouped into the same group, a measurement value(s) concerning the respective attribute(s) is acquired.

Next, at step S240, based on the measurement value(s) acquired in step S230, each of the one or more canes 58 that were grouped into the same group in step S220 is determined as a cane to be removed or a cane to be retained. A specific example of a method of determination as to a cane to be removed or a cane to be retained based on a measurement value(s) concerning one or more attributes will be described later.

Based on the determination in step S240, the process of step S300 is performed.

As will be described with reference to FIG. 11A, at step S240, canes that should not be selected as canes to be retained (which may be referred to as "unpromising canes") may be detected, and excluded from candidates of canes to be retained. For example, canes having problems in their health status may be excluded from candidates of canes to be retained. As described above, canes to be retained may include fruiting canes, for example. Because selecting canes having a poor health status as fruiting canes can be avoided, a decrease in the fruit yield and quality can be reduced or prevented.

Figure 11A:
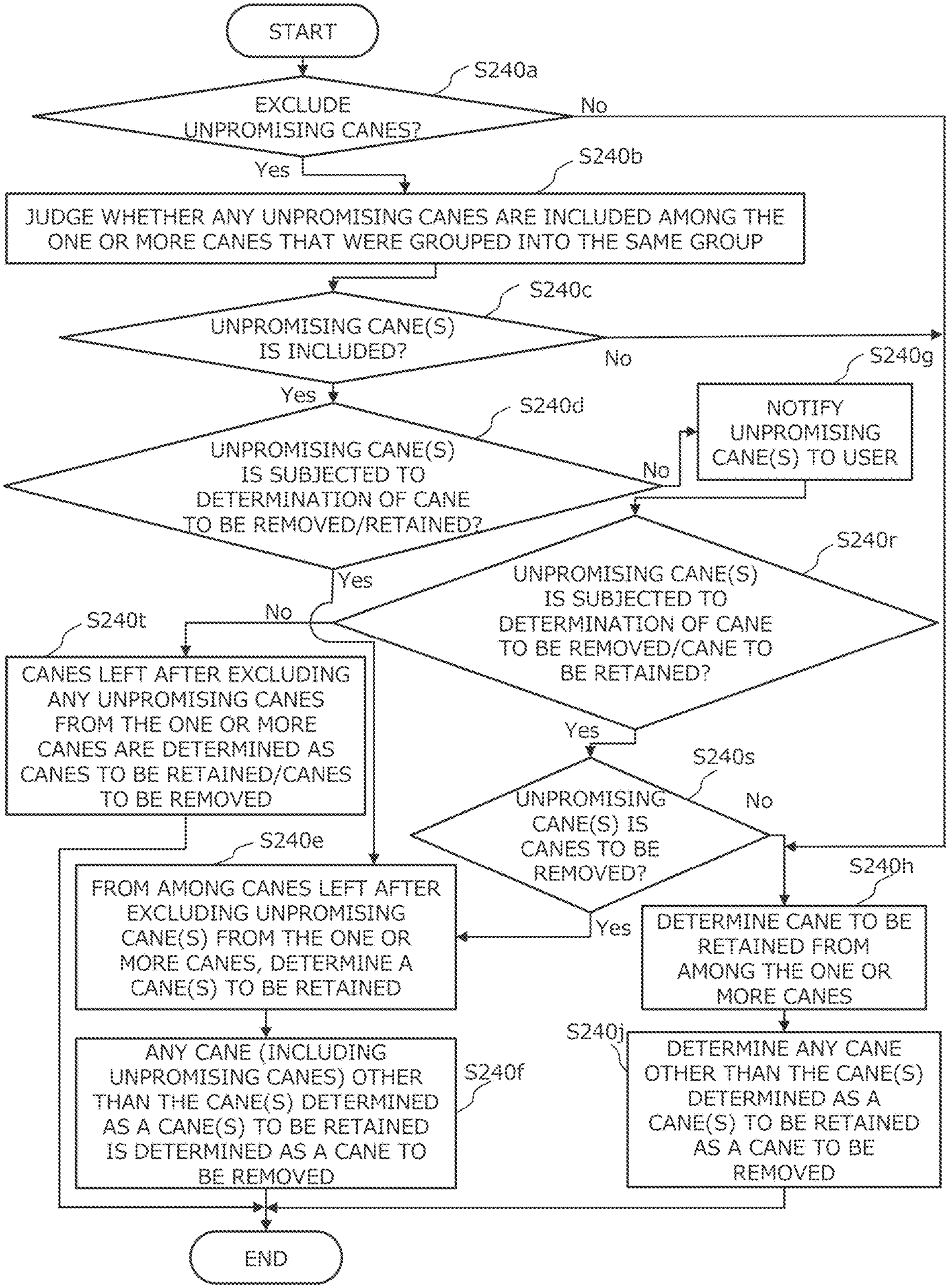
FIG. 11A is a flowchart of a process of detecting unpromising canes, which may be performed at step S240.

FIG. 11A shows a flowchart of a process of detecting unpromising canes, which may be performed at step S240.

At step S240*a*, it is judged whether or not unpromising canes are to be excluded. For example, based on a user input, it is judged as to whether a process of excluding unpromising canes is performed or not. If Yes at step S240*a*, control proceeds to step S240*b*. If No at step S240*a*, control proceeds to step S240*h*. Step S240*h* and its subsequent step S240*j* may be performed similarly to step S240 shown in FIG. 9*b*, for example.

At step S240*b*, based on the sensor data acquired in step S100, it is judged whether or not any unpromising canes are included among the one or more canes that were grouped into the same group in step S220 within the plurality of groups. For example, it is judged whether or not any unpromising canes are included among the six canes 58_1 to 58_6 grouped into the same group based on the segmented image 51*a* shown in FIG. 10A. Based on the segmented image 51*a*, for each of the six canes 58_1 to 58_6, information concerning one or more attributes (e.g., a color of the cane, a shape of the cane, a thickness of the cane, a length of the cane, a cultivar of the fruit tree, an age of the fruit tree, a geographical status, etc.) is acquired, and it is judged to be an unpromising cane or not based on the acquired information. Specifically, for example, a healthy cane is usually brown, whereas a cane of poor health status may have an at least partially black or white surface. For instance, a cane whose surface area has been judged to be black or white in a predetermined range (or a predetermined proportion) may be detected as an unpromising cane (diseased cane). If any unpromising canes are included among the six canes 58_1 to 58_6 (Yes at step S240*c*), control proceeds to step S240*d*. If no unpromising canes are included among the six canes 58_1 to 58_6 (No at step S240*c*), control proceeds to step S240*h*.

The judgment as to whether any unpromising canes are included among the one or more canes that were grouped into the same group may be made by any one of, or a combination of any one or more of, the following methods, for example.

(i) For example, by acquiring a measurement value regarding the color of the cane, it can be judged whether the cane is an unpromising cane or not. The judgment is made through the processes of the following steps as shown in FIG. 11C, for example. FIG. 11C is a flowchart showing an example of a process to be performed in step S240*b*.

step S10-1: By using a sensor or sensors (e.g., a camera(s)), sensor data of the cane (e.g., an image including the cane) is acquired.

step S10-2: By using the acquired sensor data, a portion corresponding to the cane is extracted. For example, the acquired image is subjected to a segmentation (e.g., instance segmentation) using AI.

step S10-3: Information concerning the color of the portion corresponding to the extracted cane (e.g., RGB values, HSL values, and their statistics) is acquired.

step S10-4: Based on the acquired information concerning color, a judgement is made as to whether it is an unpromising cane or not. For example, a relationship between information concerning color and evaluation criteria as to whether a cane is unpromising or not (e.g., a table) may be stored in a storage device, and the judgement is made by referring to the stored information (table).

(ii) Based on whether the cane has cane spots and/or knots on its surface, it can be judged whether the cane is an unpromising cane or not because a cane having cane spots and/or knots on its surface is likely to be diseased. This may be combined with the method of judgment of (i) above. The judgment is made through the processes of the following steps as shown in FIG. 11D, for example. FIG. 11D is a flowchart showing an example of a process to be performed in step S240*b*.

step S12-1: By using a sensor or sensors (e.g., a camera (s)), sensor data of the cane (e.g., an image including the cane) is acquired.

step S12-2 and step S12-3: By using the acquired sensor data, a portion corresponding to the cane is extracted (step S12-2), and it is judged whether the cane has cane spots and/or knots or not (step S12-3). For example, in step S12-2, the acquired image is subjected to a segmentation (e.g., instance segmentation) to extract a portion corresponding to the cane. In step S12-3, detection of cane spots and knots can be made through an object detection using artificial intelligence (AI), for example.

(iii) By using a machine learning model, it can be judged whether the cane is an unpromising cane or not. The judgment is made through the processes of the following steps as shown in FIG. 11E, for example. FIG. 11E is a flowchart showing an example of a process to be performed in step S240*b*.

step S14-1: By using an imager or imagers (e.g., a camera(s)), an image of the cane is acquired.

step S14-2: Images of diseased canes and images of healthy canes are provided as a training data set, and a trained model which has learned this under supervised learning is provided. Note that the order of step S14-1 and step S14-2 may be arbitrary, and they may be performed concurrently (in parallel).

step S14-3: The cane image acquired in step S14-1 is input to the trained model provided in step S14-2, and a judgement (output) is made as to whether the cane is likely to be diseased or not.

(iv) Based on inputs of other information, it is possible to judge whether the cane is an unpromising cane or not. For example, if information as to suspicions of disease that can be obtained during any non-pruning operation (e.g., quality measurement work, etc.) to be performed for that fruit tree, information of past diseases (history) of that fruit tree, disease prediction information, or the like has been obtained (or available), such information may be input and stored to the system. If such information has been input to the system, it can be judged whether the cane is an unpromising cane or not based on such information.

At step S240*d*, based on a user input, for example, it is judged whether or not unpromising canes are to be subjected to the process of determination as to a cane to be removed or a cane to be retained. For example, the user may previously input a setting, when an unpromising cane is detected, to automatically continue or not to continue on the process of determining any cane other than unpromising canes as a cane to be removed or a cane to be retained. If Yes at step S240*d* (e.g., a setting to automatically continue on the process of determining each unpromising cane as a cane to be removed or a cane to be retained has been made), control proceeds to step S240*e*.

At step S240*e*, from among the canes left after excluding any unpromising canes from the one or more canes that were grouped into the same group, a cane(s) to be retained is selected and determined. Thereafter, at step S240*f*, from among the canes left after excluding any unpromising canes from the one or more canes that are the subject of processing, any cane other than the cane(s) determined as a cane(s) to be retained is determined as a cane to be removed. At this time, any unpromising canes are also determined as canes to be removed.

If No at step S240*d* (e.g., a setting to not automatically continue on the process of determining each unpromising cane as a cane to be removed or a cane to be retained has been made), control proceeds to step S240*g*. At step S240*g*, the user is notified that an unpromising cane(s) has been detected. Information identifying the unpromising cane(s) may be further notified to the user.

After step S240*g*, as will be described with respect to the processes of step S240*r* and step S240*s* below, it is determined which of the following processes is applicable to the unpromising canes: they are determined as canes to be removed; they are to be subjected to the process of determination as to a cane to be removed or a cane to be retained; or they are not to be subjected to the process of determination as to a cane to be removed or a cane to be retained (e.g., information that they are neither canes to be removed nor canes to be retained is assigned to them, and cut-point data for unpromising canes is not generated). For example, upon receiving a notification that an unpromising cane has been detected, the user can check data such as an image of the detected unpromising cane, and select any one of the above processes and input it.

After step S240*g*, at step S240*r*, based on a user input, for example, it is judged whether or not unpromising canes are to be subjected to the process of determination as to a cane to be removed or a cane to be retained. If Yes at step S240*r*, at step S240*s*, based on a user input, for example, it is judged whether or not unpromising canes are determined as canes to be removed. If Yes at step S240*s*, control proceeds to the aforementioned step S240*e* and its subsequent step S240*f*. For example, in a case where any detected unpromising cane is determined as a cane to be removed right away, e.g., when the detected unpromising cane is likely to be a diseased cane, step S240*r* may be Yes and step S240*s* may be Yes. In this case, canes to be retained are selected from among the canes left after excluding any canes detected as unpromising canes at step S240*e* and step S240*f*. If No at step S240*s*, control proceeds to the aforementioned step S240*h* and its subsequent step S240*j*, where each of the one or more canes that are grouped into the same group is determined as a cane to be removed or a cane to be retained, including those canes which are detected as unpromising canes. For example, in a case where there is little need to immediately determine a detected unpromising cane as a cane to be removed, e.g., when the detected unpromising cane is unlikely to be a diseased cane, step S240*r* may be Yes and step S240*s* may be No. In this case, at step S240*h* and step S240*j*, a process of selecting a cane to be retained from among those canes which are detected as unpromising canes is performed.

If No at step S240*r*, i.e., unpromising canes are not to be subjected to the process of determination as to a cane to be removed or a cane to be retained, control proceeds to step S240*t*. At step S240*t*, each of the canes left after excluding any unpromising canes from the one or more canes that were grouped into the same group is determined as a cane to be removed or a cane to be retained. The aforementioned example is applicable in the determination as to a cane to be removed or a cane to be retained. For example, if it is difficult to judge whether a detected unpromising cane is a diseased cane or not, step S240*r* should be No, and control proceeds to step S240*t*. As for the detected unpromising cane, information that it is neither a cane to be removed nor a cane to be retained is assigned, and the determination as to a cane to be removed or a cane to be retained is withheld.

Figure 10D:
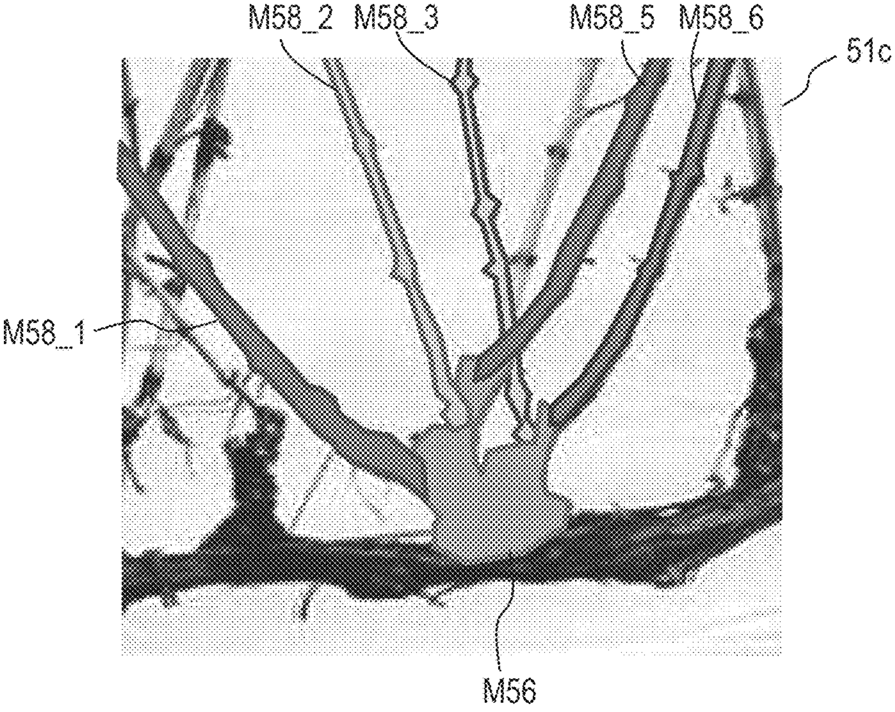
FIG. 10D is a diagram showing an example of an image to be used in step S240.

FIG. 10D is an example of an image used in step S240. In order to schematically show results of detecting unpromising canes, the segmented image 51*c* shown in FIG. 10D does not include the cane mask M58_4, thus differing from the segmented image 51*b* shown in FIG. 10C. For example, based on the segmented image 51*a* shown in FIG. 10A, if the cane 58_4 is judged to be an unpromising cane among the six canes 58_1 to 58_6 grouped into the same group, then a cane(s) to be retained can be selected from among the five canes left after excluding the cane 58_4. Alternatively, if the cane 58_4 is judged to be an unpromising cane, then the process of generating cut-point data may be skipped for the entire fruit tree, and control may proceed to the processing of the next fruit tree.

Figure 11B:
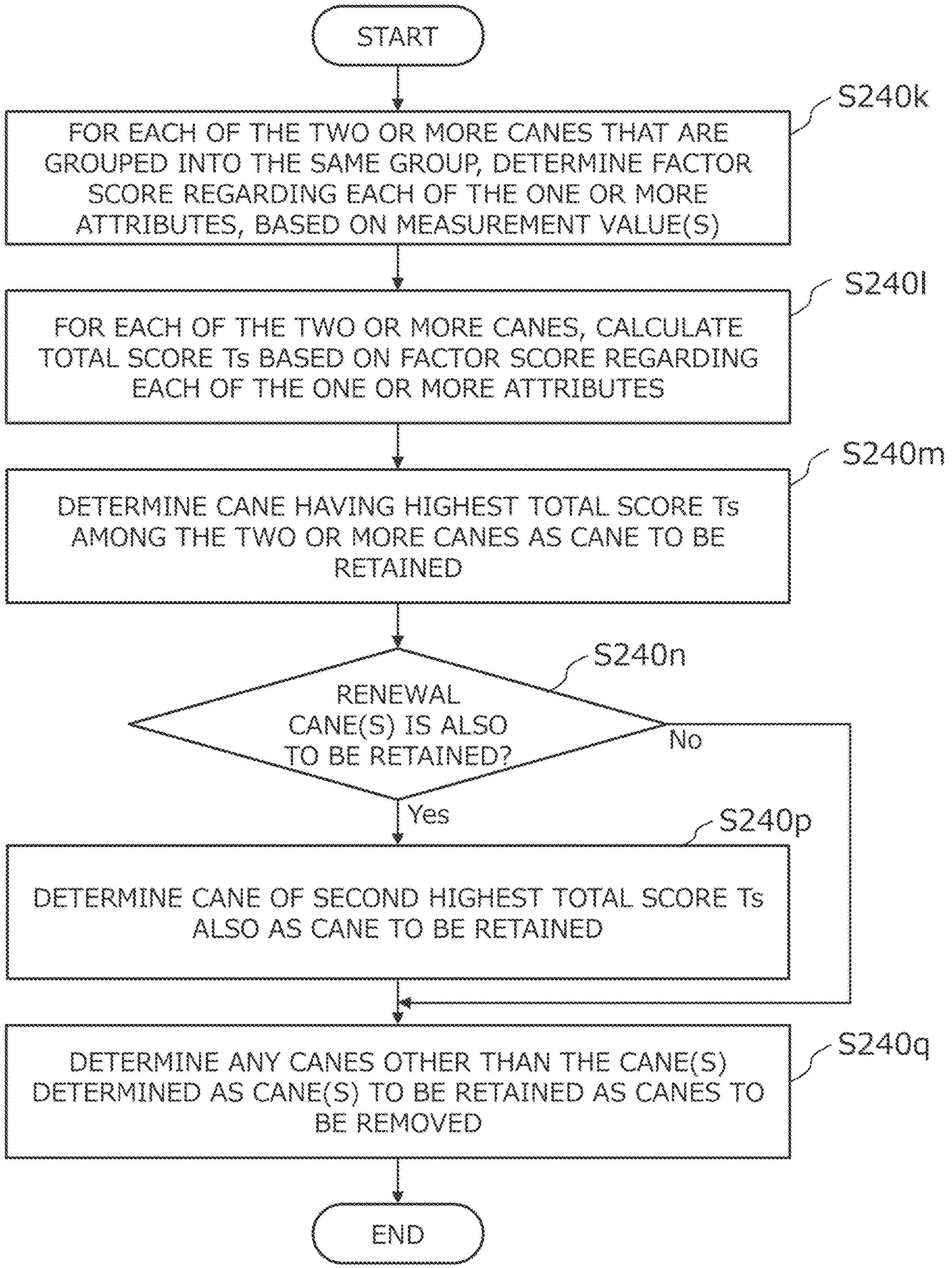
FIG. 11B is a flowchart of a specific example of a process of acquisition and evaluation of a measurement value(s) concerning one or more attributes that is performed at step S240.
Figure 11C:
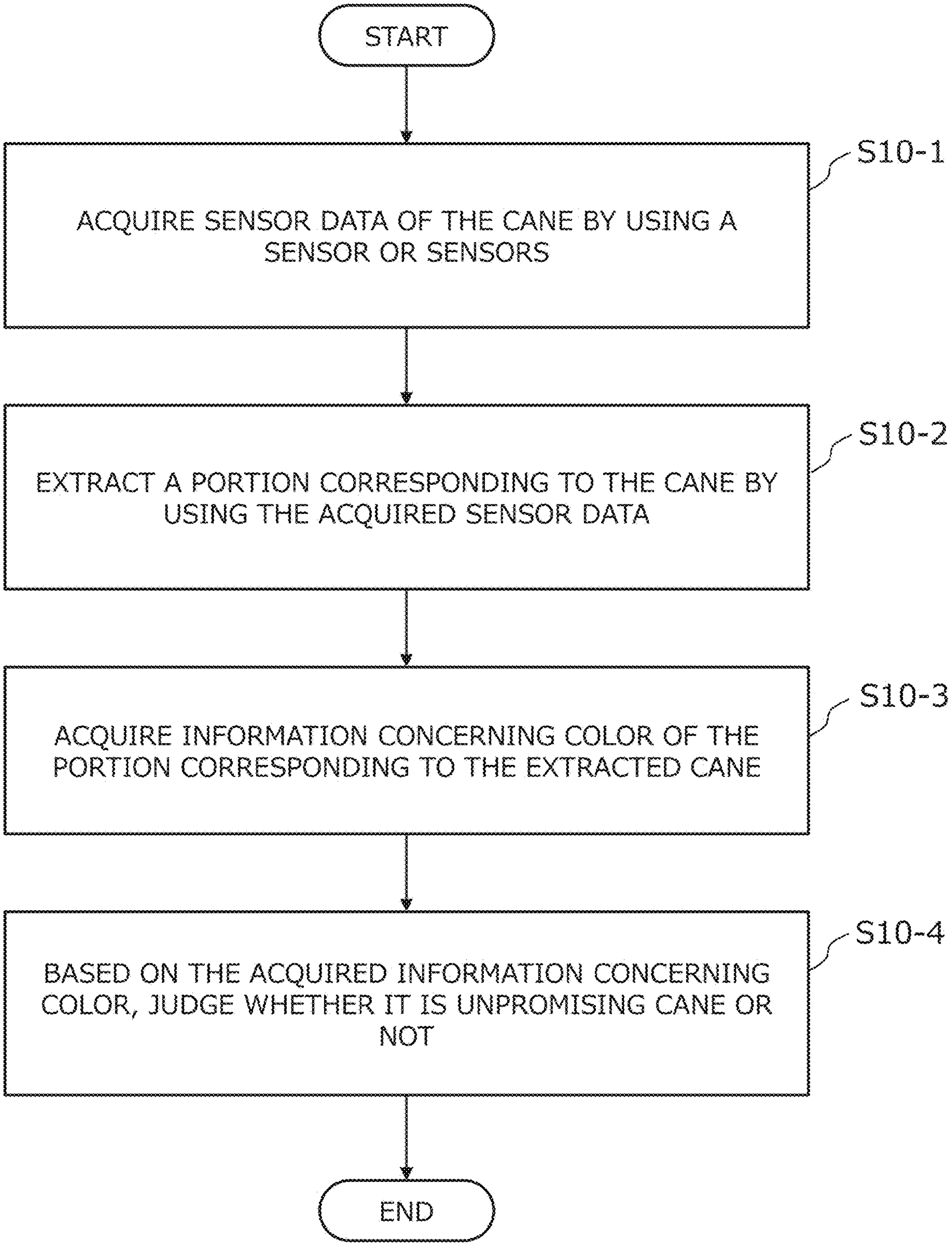
FIG. 11C is a flowchart showing an example of a process to be performed in step S240*b*.
Figure 11D:
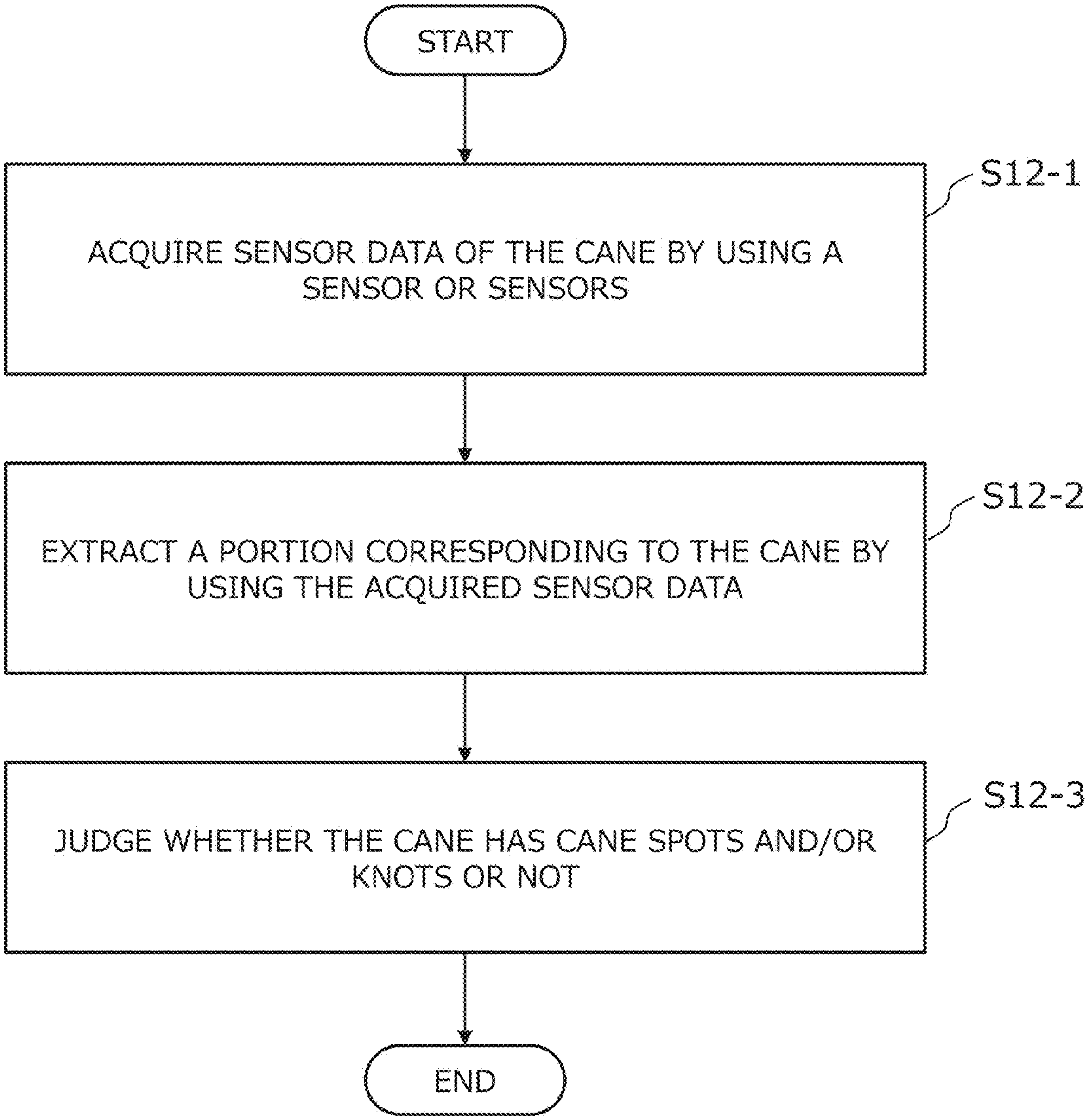
FIG. 11D is a flowchart showing an example of a process to be performed in step S240*b*.
Figure 11E:
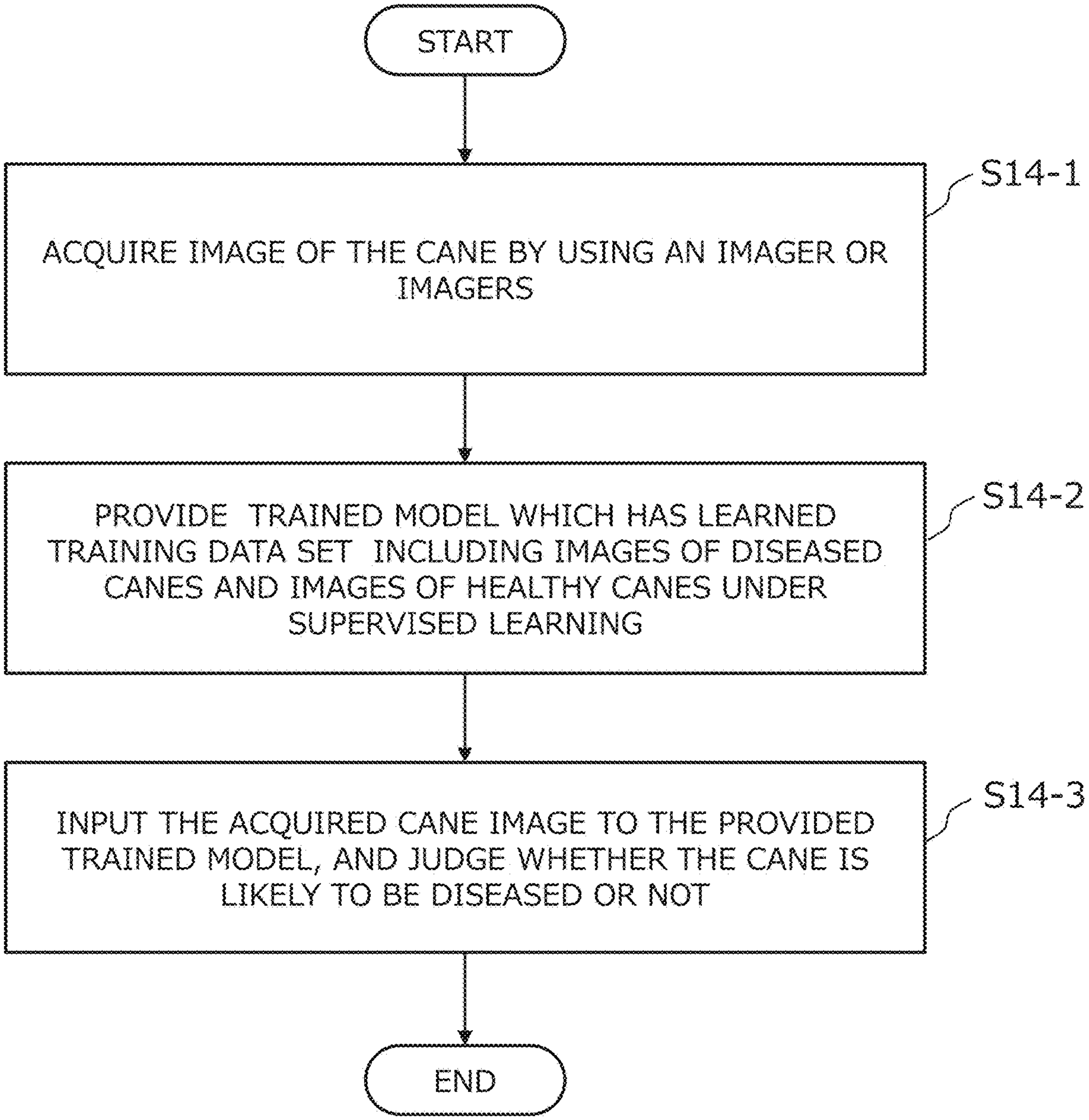
FIG. 11E is a flowchart showing an example of a process to be performed in step S240*b*.

With reference to FIG. 11B, a specific example of a process of acquisition and evaluation of a measurement value(s) concerning one or more attributes that is performed at step S240 will be described.

FIG. 11B is a flowchart showing a specific example of a process of acquisition and evaluation of a measurement value(s) concerning one or more attributes that is performed at step S240. Herein, a case where there are two or more canes that are grouped into the same group among the plurality of groups will be described. As will be described below, in the example of FIG. 11B, a total score of each cane is calculated based on the factor score of each cane regarding each attribute, and based on the total score, for each of the two or more canes that are grouped into the same group, a determination as to a cane to be removed or a cane to be retained is made. Note that both of the processing of FIG. 11A and the processing of FIG. 11B may be performed at step S240.

As shown in FIG. 11B, at step S240*k*, for each of the two or more canes that are grouped into the same group among the plurality of groups at step S220, a factor score is determined regarding each of the one or more attributes, based on the measurement value(s) acquired in step S230.

The factor score of each cane regarding each attribute may be determined so that the factor score becomes higher as the cane has a more preferable state as a fruiting cane regarding that attribute. A cane that is preferable as a fruiting cane is, for example, a cane that is expected to bear fruits of good quality. For example, the factor score of each cane regarding the thickness of the cane may be determined so as to be highest when the thickness of the cane is within a predetermined range, and lower when it is larger or smaller than the predetermined range. The reason is that, if the cane is too thin, it may be inferior in fruit productivity, and if the cane is too thick, its fruit quality may be degraded. Specific examples of methods of determining the factor score of each cane regarding each attribute (e.g., evaluation criteria) will be described later.

At step S240*l*, for each of the two or more canes, based on the factor score regarding each of the one or more attributes as determined in step S240*k*, a total score Ts is calculated. The total score Ts of each cane may be a total value of the respective factor scores regarding the one or more attributes (if there is one attribute, then that factor score shall be the total score Ts).

At step S240*m*, among the two or more canes, the cane of the highest total score Ts as calculated at step S240*l* is determined as a cane to be retained. The cane of the highest total score Ts can be selected as the cane to be retained (e.g., a fruiting cane).

When the factor score of each cane regarding each attribute is determined such that it is higher as the cane is in a more preferable state as a fruiting cane regarding that attribute, it is considerable that a cane is more desirable as a fruiting cane if a total score Ts of the sum of these is higher. By selecting a cane of the highest total score Ts as a fruiting cane, a cane that is expected to bear fruits of a highest quality in that season or the next season can be selected as a fruiting cane among the two or more canes. Therefore, while maintaining the fruit yield and quality, automation of pruning work can be promoted.

At step S240*n*, based on a user input, for example, in addition to the cane of the highest total score Ts as calculated at step S240*l*, it is judged whether the second cane should also be determined as a cane to be retained. For example, in a case where a renewal cane is also to be retained in addition to a fruiting cane, not only the cane of the highest total score Ts but also the cane of the second highest total score Ts is determined as a cane to be retained. A cane of the second highest total score Ts is likely to be the second most desirable cane as a fruiting cane. By selecting a cane of the second highest total score Ts as a renewal cane, automation of pruning work can be promoted while maintaining the fruit yield and quality.

At step S240*n*, if all of the total scores Ts of the two or more canes that are grouped into the same group are lower than a predetermined value, it may be determined that the cane of the second highest total score Ts is not a cane to be retained. In other words, it may be determined that there will be only one cane (i.e., only the cane of the highest total score Ts) to be retained. This case corresponds to not retaining any renewal canes, for example. If all of the total scores Ts of the two or more canes that are grouped into the same group are lower than a predetermined value, by not retaining any renewal canes, the nutritional status of the fruiting cane can be improved, and a decrease in the fruit yield and quality can be reduced or prevented.

If all of the total scores Ts of the two or more canes that are grouped into the same group are lower than a predetermined value, then, at the generation of cut-point data (step S300), the cut-point data may be generated so that the number of buds remaining on the cane determined as a cane to be retained is smaller than a value that is set through a user input or the like.

If Yes at step S240*n*, then at step S240*p*, among the two or more canes that are grouped into the same group, the cane of the second highest total score Ts is also determined as a cane to be retained. After step S240*p*, control proceeds to step S240*q*. Also if No at step S240*n*, control proceeds to step S240*q*.

At step S240*q*, among the two or more canes that are grouped into the same group, all canes other than the cane(s) determined as a cane(s) to be retained are determined as canes to be removed.

Note that the process of step S240 is not limited to the above example. For example, in a case where there is only one cane that is grouped into the same group among the plurality of groups, a determination as to a cane to be removed or a cane to be retained may be made based on a total score that is calculated in the above manner. For example, if the total score is lower than a predetermined value, it may be determined as a cane to be removed, and if the total score is equal to or greater than the predetermined value, it may be determined as a cane to be retained. Furthermore, the number of buds to be retained on each cane to be retained may be determined so that the number of buds remaining on the cane determined as a cane to be retained is smaller than a value that is set through a user input or the like.

Figure 12:
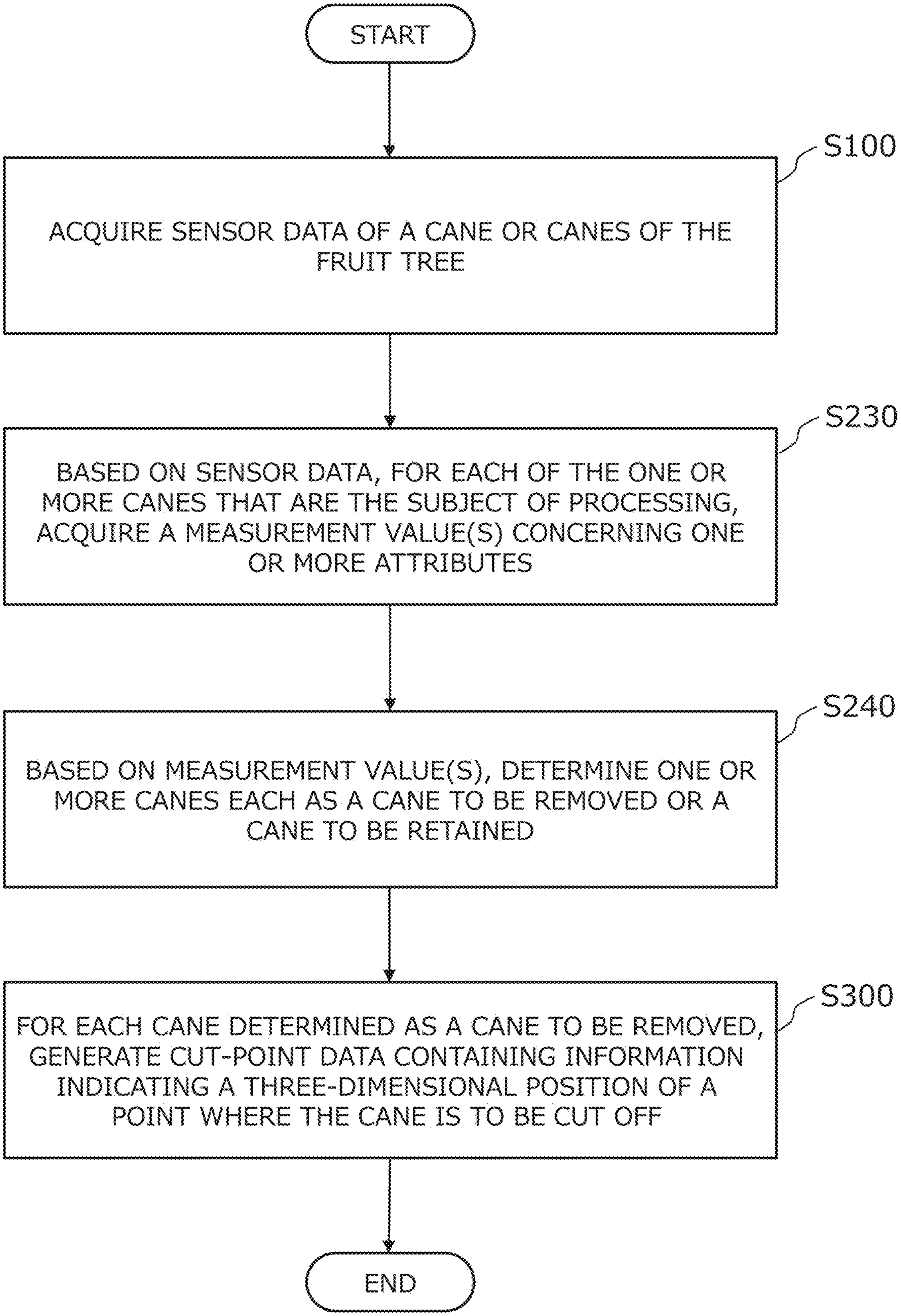
FIG. 12 is a flowchart showing an example procedure of generating cut-point data of canes of a fruit tree, according to an example embodiment of the present disclosure.

FIG. 12 is a flowchart showing an example procedure of generating cut-point data of canes of a fruit tree, according to an example embodiment of the present disclosure. The flowchart of FIG. 12 differs from the flowchart of FIG. 9B in that step S220 (grouping) is not included. Depending on the pruning method or the training method for the fruit tree, the grouping process may be unnecessary.

The process in each step of FIG. 12 is performed similarly to the example of FIG. 9B. However, the process that is performed for one or more canes that were grouped into the same group among the plurality of groups at step S220 in the example of FIG. 9B is performed for the one or more canes that are the subject of processing at step S200 including the processes of step S230 and step S240 in the example of FIG. 12.

Figure 13A:
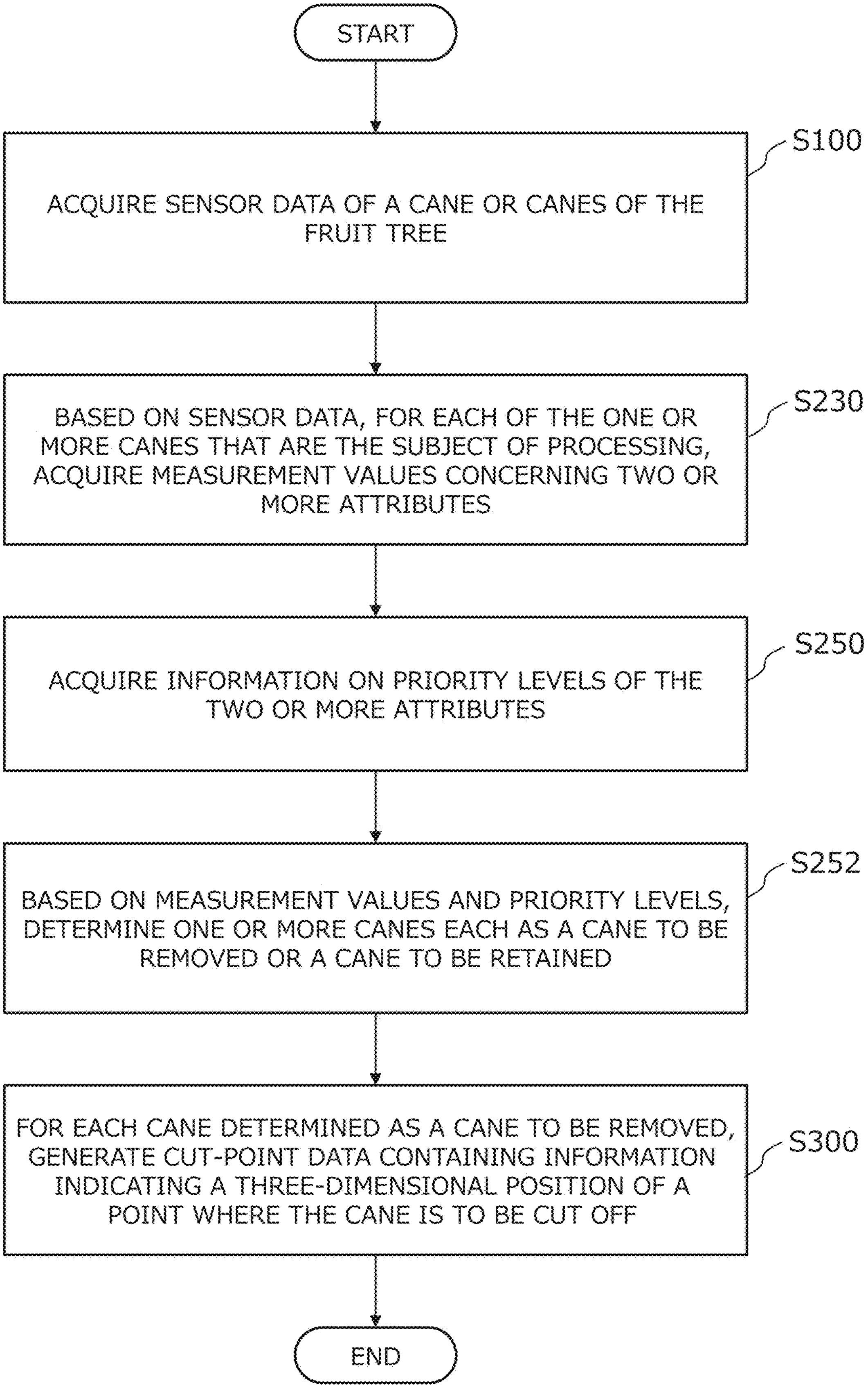
FIG. 13A is a flowchart showing an example procedure of generating cut-point data of canes of a fruit tree, according to an example embodiment of the present disclosure.

With reference to FIG. 13A, setting of priority levels for attributes will be described.

FIG. 13A is a flowchart showing an example procedure of generating cut-point data of canes of a fruit tree, according to an example embodiment of the present disclosure. The flowchart of FIG. 13A differs from the flowchart of FIG. 4A in that it includes step S230, step S250, and step S252 as the processes to be performed at step S200. The example of FIG. 13A can be combined with any of the aforementioned flowcharts.

In the example of FIG. 13A, the procedure of generating cut-point data of canes of a fruit tree includes acquiring sensor data of one or more canes of the fruit tree by a sensor or sensors (step S100), based on the sensor data, for each of the one or more canes, acquiring measurement values concerning two or more attributes (step S230), acquiring information on priority levels of the two or more attributes (step S250), based on the measurement values and the priority levels, determining each of the one or more canes as a cane to be removed or a cane to be retained (step S252), and, for each cane determined as a cane to be removed, generating cut-point data including information indicating a three-dimensional position of a point where the cane is to be cut off (step S300).

The process of step S100 is performed similarly to the process in the example of FIG. 4A.

The process of step S230 is performed similarly to the process in the example of FIG. 9B.

At step S250, information on priority levels of two or more attributes is acquired. The information on the priority levels is acquired based on a user input, for example. Note that the order of step S250 and step S230 may be arbitrary. Step S250 may be performed concurrently (in parallel) with step S230.

Figure 13B:
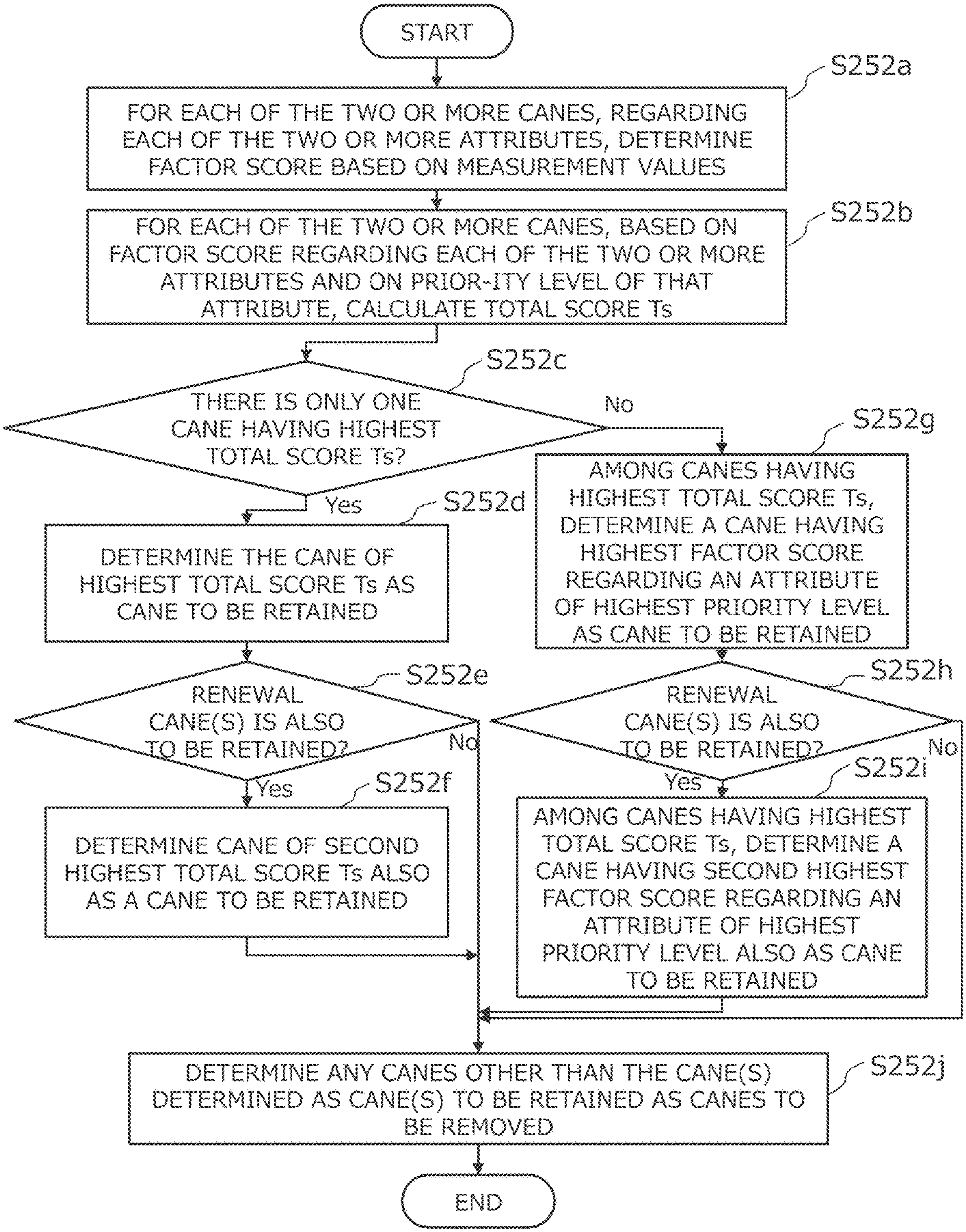
FIG. 13B is a flowchart showing a specific example of a process to be performed in step S252.

At step S252, based on the measurement values acquired in step S230 and the priority levels acquired in step S250, each of the one or more canes that are the subject of processing is determined as a cane to be removed or a cane to be retained. Step S252 will be described by referring to FIG. 13B and FIGS. 14A to 14C. FIG. 13B is a flowchart showing a specific example of a process to be performed in step S252. FIGS. 14A to 14C are diagrams for describing an example of a process to be performed in step S252. The example of FIG. 13B will illustrate a case where two or more canes are the subject of processing. As will be described below, in the example of FIG. 13B, based on the factor score of each cane regarding each attribute and a priority level for each attribute, a total score of each cane is calculated, and based on the calculated total score, a determination as to a cane to be removed or a cane to be retained is made for each of the two or more canes that are the subject of processing.

As shown in FIG. 13B, at step S252*a*, for each of the two or more canes that are the subject of processing, a factor score is determined regarding each of the two or more attributes, based on the measurement values acquired in step S230. For example, FIG. 14A shows an example where acquisition of measurement values concerning six attributes A to F and evaluations thereof are made with respect to six canes 58_1 to 58_6 that are grouped into the same group. Specifically, for each of the six canes 58_1 to 58_6, factor scores $F_A$ to $F_F$ regarding six attributes A to F are respectively determined. As for the empty slots in the table of FIG. 14A, the factor scores $F_A$ to $F_F$ are determined at step S252*a*, and total scores Ts are determined at step S252*b* described below. Note that the number of canes that are the subject of processing and the number of attributes are mere examples, and are not limitations. The process of step S252*a* may be performed similarly to the process of step S240*k* in the example of FIG. 11B. At step S252*a*, too, the factor score of each cane regarding each attribute may be determined so that the factor score becomes higher as the cane has a more preferable state as a fruiting cane regarding that attribute.

At step S252*b*, for each of the two or more canes that are the subject of processing, a total score Ts is calculated based on the factor score regarding each of the two or more attributes determined in step S252*a* and on information on the priority levels acquired in step S250.

FIG. 14B is a diagram for describing an example of calculating a total score Ts for each cane, based on a factor score regarding each attribute and a priority level of each attribute. For example, in the example of FIG. 14B, priority levels (order of prioritization) are set in descending order of attribute D, attribute A, attribute B, attribute C, attribute E, and attribute F. In the example of FIG. 14B, the total score Ts of each cane is calculated by taking a sum of a value obtained by multiplying its factor score regarding each attribute by a priority level weight $W_P$ that is in accordance with the priority level of that attribute. Although example values of the priority level weight $W_P$ are shown in FIG. 14B, without being limited to these examples, the priority level weight $W_P$ may be set so as to increase as the priority level increases. The method of calculating the total score Ts is not limited to this example, either. For instance, a total score Ts may be calculated based on a value obtained by correcting a factor score regarding each attribute based on the priority level of that attribute.

The priority levels of the respective attributes are not limited to the example in FIG. 14B of giving every attribute a different rank. Other examples will be described with reference to FIGS. 14D and 14E. For instance, as in the example of FIG. 14D, among the six attributes, two or more attributes may be given the same rank. In such a case, the two or more attributes that are given the same rank (i.e., attribute A and attribute B in the example of FIG. 14D) have the same value of priority level weight $W_P$ applied thereto. Although attribute A and attribute B are denoted by different numbers in the example of FIG. 14D, the former as the second and the latter as the third, this is for the convenience of expressing the calculation formula for the total score Ts. Actually, both of attribute A and attribute B have the second priority level. As in the example of FIG. 14E, another possible way of setting priority levels is to, in the calculation of the total score Ts, not include a factor score(s) regarding one or more attributes among the six attributes. In such a case, the attribute that is chosen not to be included in the calculation of the total score Ts (i.e., attribute A in the example of FIG. 14E) has a priority level weight $W_P$ of zero value. The examples of FIGS. 14D and 14E may be combined.

Regarding the total score Ts of each cane as calculated at step S252*b*, if there is only one cane having the highest total score Ts (if Yes at step S252*c*) among the two or more canes that are the subject of processing, then at step S252*d*, the cane of the highest total score Ts is determined as a cane to be retained. Among the six canes 58_1 to 58_6, the cane of the highest total score Ts can be the cane to be retained (e.g., a fruiting cane).

Among the two or more canes that are the subject of processing, if there exists a plurality of canes having the highest total score Ts (if No at step S252*c*), then at step S252*g*, a cane having the highest factor score regarding the attribute of the highest priority level among the canes having the highest total score Ts is determined as a cane to be retained. For example, if the results of total score Ts as calculated in the example of FIG. 14B are as shown in the table of FIG. 14C, then, the cane 58_1 and cane 58_6 have the highest total score Ts among the six canes 58_1 to 58_6. Between the cane 58_1 and the cane 58_6, the cane 58_6 having the higher factor score FD regarding attribute D, which is an attribute of the highest priority level, can be the cane to be retained (e.g., a fruiting cane). Note that the factor scores and total score Ts values shown in FIG. 14C are only examples, and values are only shown with respect to some sites.

After step S252*d*, at step S252*e*, based on a user input, for example, it is judged whether not only the cane of the highest total score Ts but also the second cane should also be determined as a cane to be retained. For example, in the case where renewal canes are also to be retained, the cane of the second highest total score Ts is also determined as a cane to be retained. At step S252*e*, if all of the total scores Ts of the two or more canes that are the subject of processing are lower than a predetermined value, it may be determined that the cane of the second highest total score Ts is not a cane to be retained, so that there will be only one cane (i.e., only the cane of the highest total score Ts) to be retained. This case corresponds to not retaining any renewal canes, for example.

If all of the total scores Ts of the two or more canes that are the subject of processing are lower than a predetermined value, at the generation of cut-point data (step S300), the cut-point data may be generated so that the number of buds remaining on the cane determined as a cane to be retained is smaller than a value that is set through a user input or the like.

If Yes at step S252*e*, then at step S252*f*, among the two or more canes that are the subject of processing, the cane of the second highest total score Ts is also determined as a cane to be retained. After step S252*f*, control proceeds to step S252*j*. Also if No at step S252*e*, control proceeds to step S252*j*.

At step S252*h*, too, a judgment is made similarly to step S252*e*. However, since there exists a plurality of canes having the highest total score Ts, it is judged whether another cane should also be determined as a cane to be retained, in addition to the cane that has already been determined as a cane to be retained at step S252*g*.

If Yes at step S252*h*, then at step S252*i*, with respect to the two or more canes that are the subject of processing, among the canes having the highest total score Ts, a cane having the second highest factor score regarding the attribute of the highest priority level is determined as a cane to be retained. For example, in the example of FIG. 14C, with respect to the six canes 58_1 to 58_6, between the cane 58_1 and cane 58_6 of the highest total score Ts, the cane 58_1 having the second highest factor score FD regarding attribute D, which is an attribute of the highest priority level, is determined as a cane to be retained. Herein, preferably, the factor score regarding each attribute is determined so that the two or more canes that are the subject of processing have respectively different factor scores. For example, it is preferable that the factor score regarding each attribute differs among the six canes 58_1 to 58_6. If the factor score regarding each attribute differs among the six canes 58_1 to 58_6, even when there emerges a plurality of canes having the same value of total score Ts, priority can be judged based on the factor score FD regarding attribute D of the highest priority level. In a case where there are two or more attributes of the highest priority level (i.e., where the highest priority level is set for two or more attributes alike), priority can be judged based on a sum of factor scores regarding the two or more attributes of the highest priority level. Such a method of factor score determination will be described later.

After step S252*i*, control proceeds to step S252*j*. Also if No at step S252*h*, control proceeds to step S252*j*.

At step S252*j*, among the two or more canes that are the subject of processing, all canes other than the cane(s) determined as a cane(s) to be retained are determined as canes to be removed.

Based on the determination in step S252, the process of step S300 is performed. The process of step S300 is performed similarly to the process in the example of FIG. 4A or FIG. 8.

After step S300, step S400 may further be included as in the example of FIG. 4B. In other words, the cut-point data generated in step S300 may be input to a controller configured or programmed to control a three-dimensional position of a cutter that cuts canes of the fruit tree (e.g., the cutting tool 24 in the cutting system 1 of FIG. 1). Thus, it is possible to use a cutter to perform cutting of canes of the fruit tree.

In the example described with reference to FIG. 11B, a cane to be retained is determined based on a total score Ts that is calculated based on the factor score of each cane regarding each attribute. On the other hand, in the example of FIGS. 13A and 13B, a total score Ts is calculated based on a factor score regarding each attribute and on information on a priority level for each attribute, and a cane(s) to be retained is determined based on the total scores Ts. Typically, a cane of the highest total score Ts is selected as a fruiting cane. It is possible to set priority levels for attributes associated with the selection of fruiting canes and allow them to be reflected on the total scores Ts. For example, customization is possible in accordance with the cultivar of the fruit tree, orchard conditions, vineyard design, user preferences, and the like. Various fruit tree cultivars and orchard conditions can be supported. If a plurality of canes exist that have the same total score Ts when selecting canes to be retained, their priority can be judged based on the priority levels of attributes.

Figure 13C:
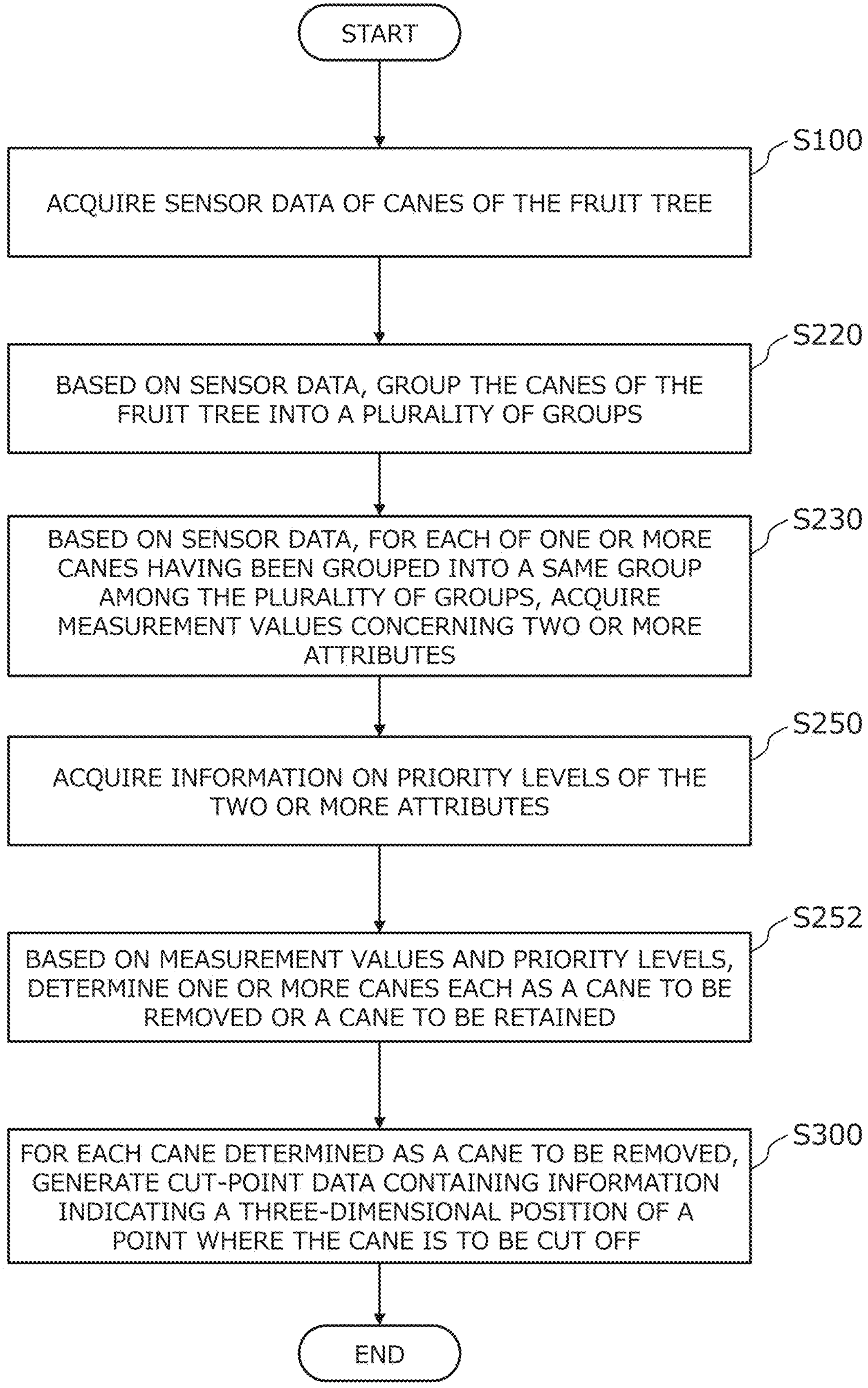
FIG. 13C is a flowchart showing an example procedure of generating cut-point data of canes of a fruit tree, according to an example embodiment of the present disclosure.

FIG. 13C is a flowchart showing an example procedure of generating cut-point data of canes of a fruit tree, according to an example embodiment of the present disclosure. The flowchart of FIG. 13C differs from the flowchart of FIG. 13A in that it further includes step S220 (grouping).

At step S220 in FIG. 13C, based on the sensor data acquired in step S100, the plurality of canes 58 of the fruit tree are grouped into a plurality of groups. The process of step S220 is performed similarly to the process of step S220 in FIG. 9A.

The process in each step of FIG. 13C other than step S220 is performed similarly to the example of FIG. 13A. However, in the example of FIG. 13C, the process that is performed for one or more canes that are the subject of processing in the example of FIG. 13A is performed for one or more canes that were grouped into the same group among the plurality of groups in step S220.

Figure 13D:
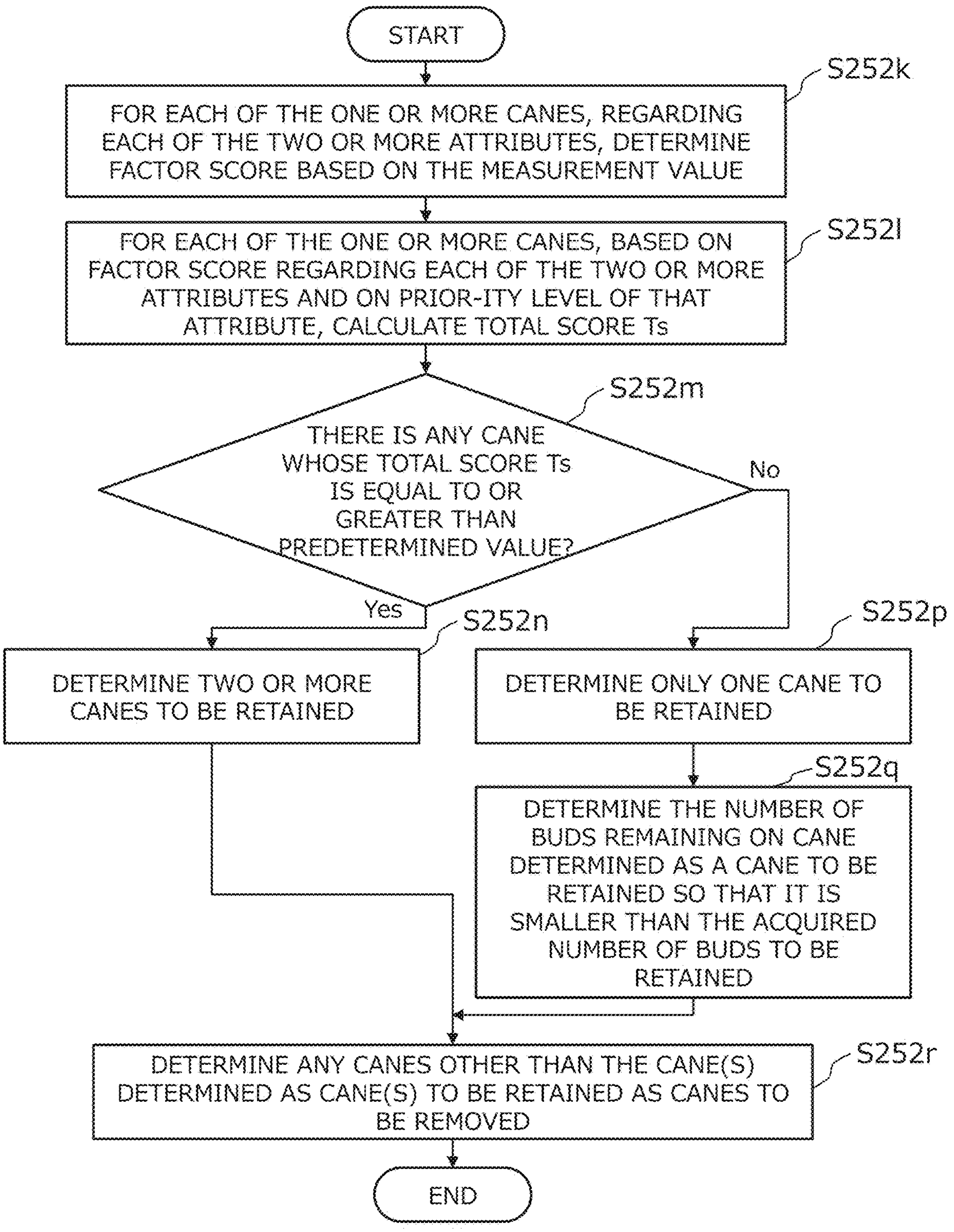
FIG. 13D is a flowchart showing a specific example of a process to be performed in step S252.

FIG. 13D is a flowchart showing another example of the process performed at step S252. The example of FIG. 13D illustrates a case where there is one or more canes that are the subject of processing.

At step S252*k* in FIG. 13D, for each of the one or more canes that are the subject of processing, a factor score regarding each of the two or more attributes is determined, based on the measurement values acquired in step S230. At step S252*l*, for each of the one or more canes that are the subject of processing, a total score Ts is calculated based on a factor score regarding each of the two or more attributes determined in step S252*k* and on information on the priority levels acquired in step S250. Step S252*k* and step S252*l* may be performed similarly to step S252*a* and step S252*b* in FIG. 13B.

At step S252*m*, it is judged whether the one or more canes that are the subject of processing include any cane whose total score Ts calculated in step S252*l* is equal to or greater than a predetermined value. If all of the total scores Ts of the one or more canes that are the subject of processing are lower than the predetermined value (if No at step S252*m*), then at step S252*p*, it is determined that only one cane (e.g., only the cane of the highest total score Ts) is to be retained. This corresponds to not retaining any renewal canes, for example. Furthermore, at step S252*q*, the number of buds to be retained on each cane to be retained is determined so that the number of buds remaining on the cane determined as a cane to be retained is smaller than a value that is set through a user input or the like. If the one or more canes that are the subject of processing include any cane whose total score Ts is equal to or greater than the predetermined value (if Yes at step S252*m*), then at step S252*n*, two or more canes to be retained are determined from among the one or more canes that are the subject of processing. For example, the cane of the highest total score Ts and the cane of the second highest total score Ts are determined as canes to be retained. The aforementioned example is applicable to the method of determining canes to be retained.

At step S252*r*, among one or more canes that are the subject of processing, all canes other than the cane(s) determined as a cane(s) to be retained are determined as canes to be removed.

The process of step S252 is not limited to the examples of FIGS. 13B and 13D. For instance, there is only one cane (e.g., a cane that is grouped into the same group among the plurality of groups) that is the subject of processing, a determination as to a cane to be removed or a cane to be retained may be made based on a total score calculated as above. For example, if the total score of the cane is lower than a predetermined value, the cane may be determined as a cane to be removed, and if the total score of the cane is equal to or greater than the predetermined value, the cane may be determined as a cane to be retained. The predetermined value herein may be set to a lower value than the predetermined value used in step S252*m* of FIG. 13D, for example.

Figure 15A:
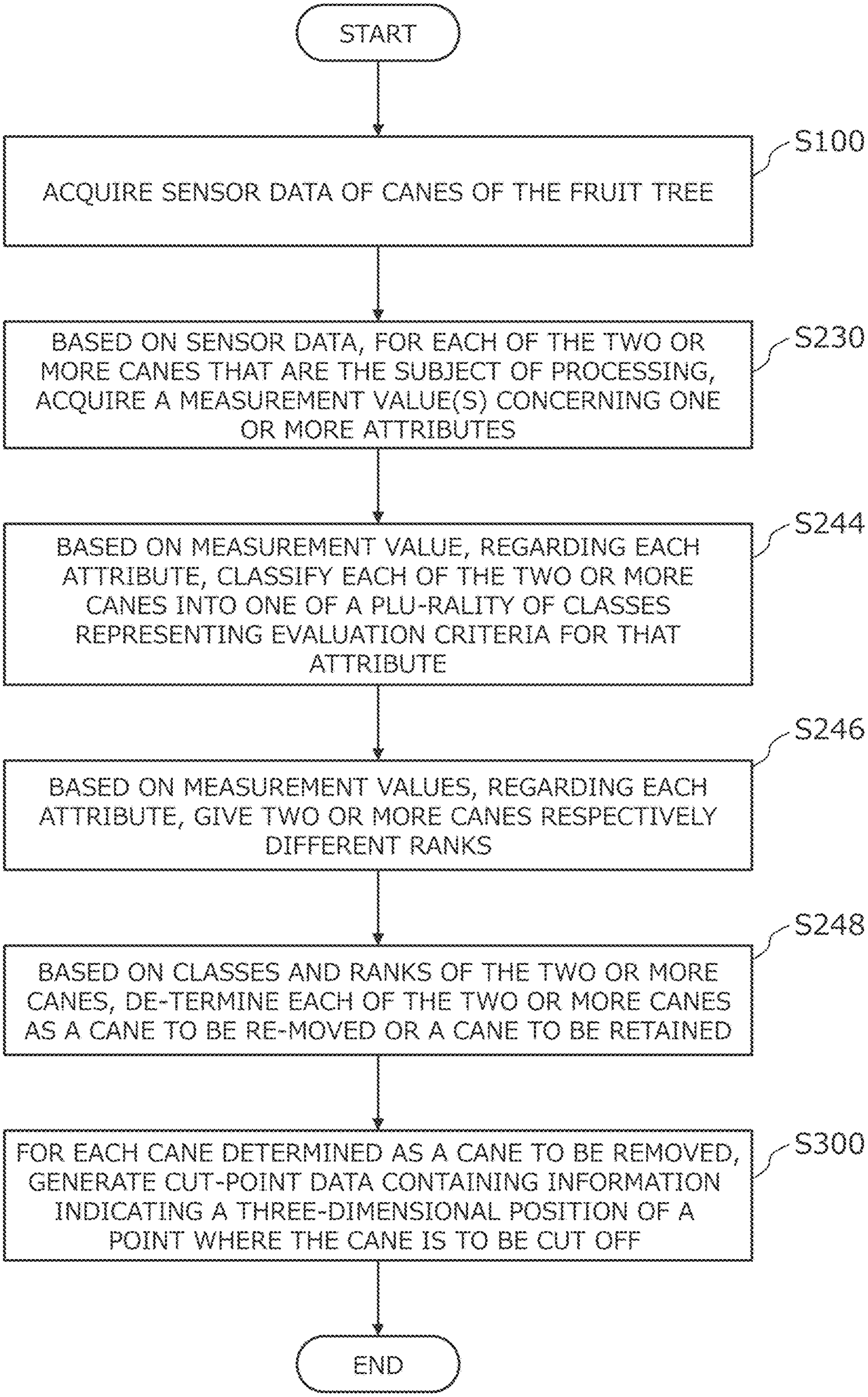
FIG. 15A is a flowchart showing an example procedure of generating cut-point data of canes of a fruit tree, according to an example embodiment of the present disclosure.
Figure 15B:
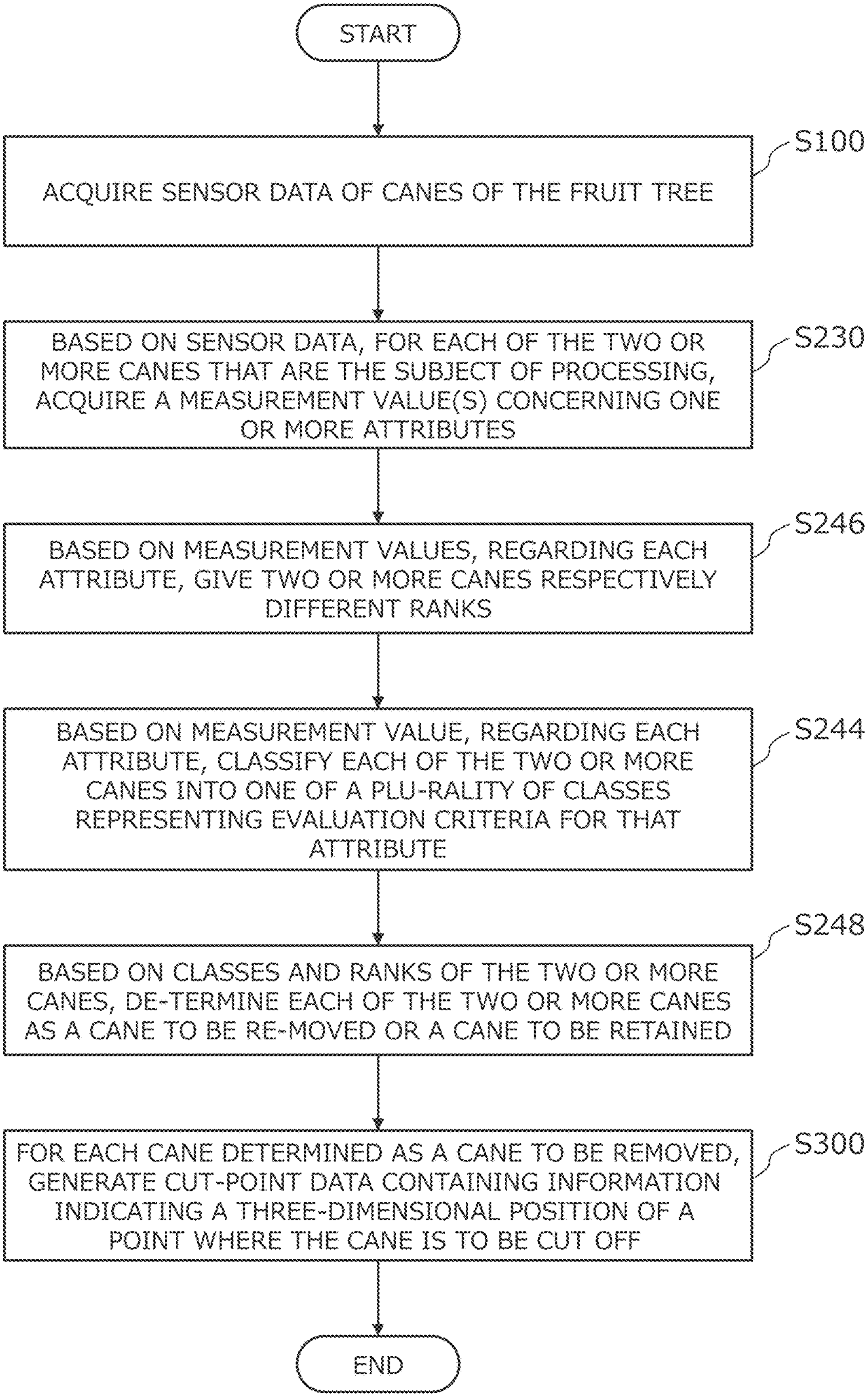
FIG. 15B is a flowchart showing an example procedure of generating cut-point data of canes of a fruit tree, according to an example embodiment of the present disclosure.

With reference to FIGS. 15A and 15B, an example method of determining two or more canes that are the subject of processing as canes to be removed or canes to be retained based on their results of classification and ranking will be described.

FIGS. 15A and 15B are flowcharts showing example procedures of generating cut-point data of canes of a fruit tree, according to an example embodiment of the present disclosure. The flowchart of FIG. 15A is an example variation of the flowchart of FIG. 12, and differs from the flowchart of FIG. 12 in that it includes step S244, step S246, and step S248, instead of step S240 in the example of FIG. 12. The flowchart of FIG. 15B differs from the flowchart of FIG. 15A in that the order of step S244 and step S246 is reversed. The examples of FIGS. 15A and 15B can be combined with any of the aforementioned flowcharts.

In the example of FIG. 15A, the procedure of generating cut-point data of canes of a fruit tree includes acquiring sensor data of two or more canes of the fruit tree by a sensor or sensors (step S100), based on the sensor data, for each of the two or more canes, acquiring a measurement value(s) concerning one or more attributes (step S230), regarding each of the one or more attributes, based on the measurement value, classifying each of the two or more canes into one of a plurality of classes representing evaluation criteria for that attribute (step S244), regarding each of the one or more attributes, based on the measurement values, giving the two or more canes respectively different ranks (step S246), based on the classes and the ranks of the two or more canes, determining each of the two or more canes as a cane to be removed or a cane to be retained (step S248), and, for each cane determined as a cane to be removed, generating cut-point data including information indicating a three-dimensional position of a point where the cane is to be cut off (step S300).

The process of step S100 is performed similarly to the process in the example of FIG. 4A.

The process of step S230 is performed similarly to the process in the example of FIG. 9B or FIG. 12.

At step S244, regarding each of the one or more attributes, each of the two or more canes that are the subject of processing is classified into one of a plurality of classes representing evaluation criteria for that attribute, based on the measurement value acquired in step S230. Regarding each attribute, a plurality of classes are predefined based on evaluation criteria. Among the two or more canes that are the subject of processing, a plurality of canes may be classified into the same class.

At step S246, regarding each of the one or more attributes, based on the measurement values acquired in step S230, the two or more canes that are the subject of processing are given respectively different ranks.

Step S244 and step S246 may be performed each independently. As in the examples shown in FIGS. 15A and 15B, whichever one of step S244 and step S246 may be performed first. Step S244 and step S246 may be performed concurrently (in parallel).

FIG. 16A is a schematic diagram for describing an example of processes to be performed in step S244 and step S246. In FIG. 16A, Table T3*a* shows measurement values concerning an attribute x, as are acquired with respect to five canes a to e, which are the two or more canes that are the subject of processing, Table T3*b* shows three classes and their evaluation criteria regarding the attribute x, and Table T3*c* shows ranking results regarding the attribute x and classification results regarding the attribute x, with respect to five canes a to e. At step S244, based on the measurement value (Table T3*a*) concerning the attribute x acquired in step S230 and the evaluation criteria (Table T3*b*) for the attribute x, each of cane a to cane e is classified into three classes "Good", "Okay", or "Bad" regarding the attribute x (Table T3*c*). At step S246, based on the measurement values (Table T3*a*) concerning the attribute x acquired in step S230, the measurement values are ranked in descending order (Table T3*c*). It is assumed herein that a higher measurement value concerning the attribute x represents a higher desirability as a fruiting cane. Values, classes, etc., in FIG. 16A are all mere examples.

At step S248, based on the class determined in the classification in step S244 and on the rank given in step S246, each of the two or more canes that are the subject of processing is determined as a cane to be removed or a cane to be retained. In the example of FIG. 16A, on the basis of Table T3*c*, each of cane a to cane e is determined as a cane to be removed or a cane to be retained.

The ranking at step S246 corresponds to making a relative evaluation for the two or more canes that are the subject of processing, whereas the classification at step S244 corresponds to making an absolute evaluation for the two or more canes that are the subject of processing. The ranking at step S246 and the classification at step S244 are performed for each attribute. By performing a ranking (relative evaluation) for the two or more canes that are the subject of processing alone, it is possible to select a cane to be retained from among the two or more canes that are the subject of processing. For example, a cane of the highest rank can be selected as a fruiting cane. However, with ranking (relative evaluation) alone, it may be possible to select a cane that is most desirable among the two or more canes that are the subject of processing, but each cane cannot be evaluated whether to be in a state that qualifies as a fruiting cane or not. For example, even if none of the two or more canes that are the subject of processing qualifies as a fruiting cane, with ranking (relative evaluation) alone, a cane of the highest rank will non-discriminately be selected as a cane to be retained, and thus deteriorations in the fruit yield and quality may not be reduced or prevented. On the other hand, with classification (absolute evaluation) alone, if a plurality of canes are classified into the same class, their priority cannot be judged. This may also be detrimental from the standpoint of performing efficient pruning work. On the other hand, in the examples shown in FIGS. 15A and 15B, the aforementioned problems can be reduced or prevented because each of the two or more canes that are the subject of processing is determined as a cane to be removed or a cane to be retained based on the results of ranking in step S246 and the results of classification in step S244. For example, the fact that none of the two or more canes that are the subject of processing qualifies as a fruiting cane can be detected based on the results of classification in step S244. In such a case, all of the two or more canes that are the subject of processing can be determined as canes to be removed, for example. Moreover, information on the results of classification in step S244 can also be used as information for grasping the status of the entire fruit tree (e.g., health status, vigor, etc.), and planning and/or doing of operations other than pruning (e.g., manure spreading, irrigation, fruit thinning, etc.).

Based on the determination in step S248, the process of step S300 is performed.

After step S300, step S400 may further be included as in the example of FIG. 4B. In other words, the cut-point data generated in step S300 may be input to a controller configured or programmed to control a three-dimensional position of a cutter that cuts canes of the fruit tree (e.g., the cutting tool 24 in the cutting system 1 of FIG. 1). Thus, it is possible to use a cutter to perform cutting of canes of the fruit tree.

Figure 15C:
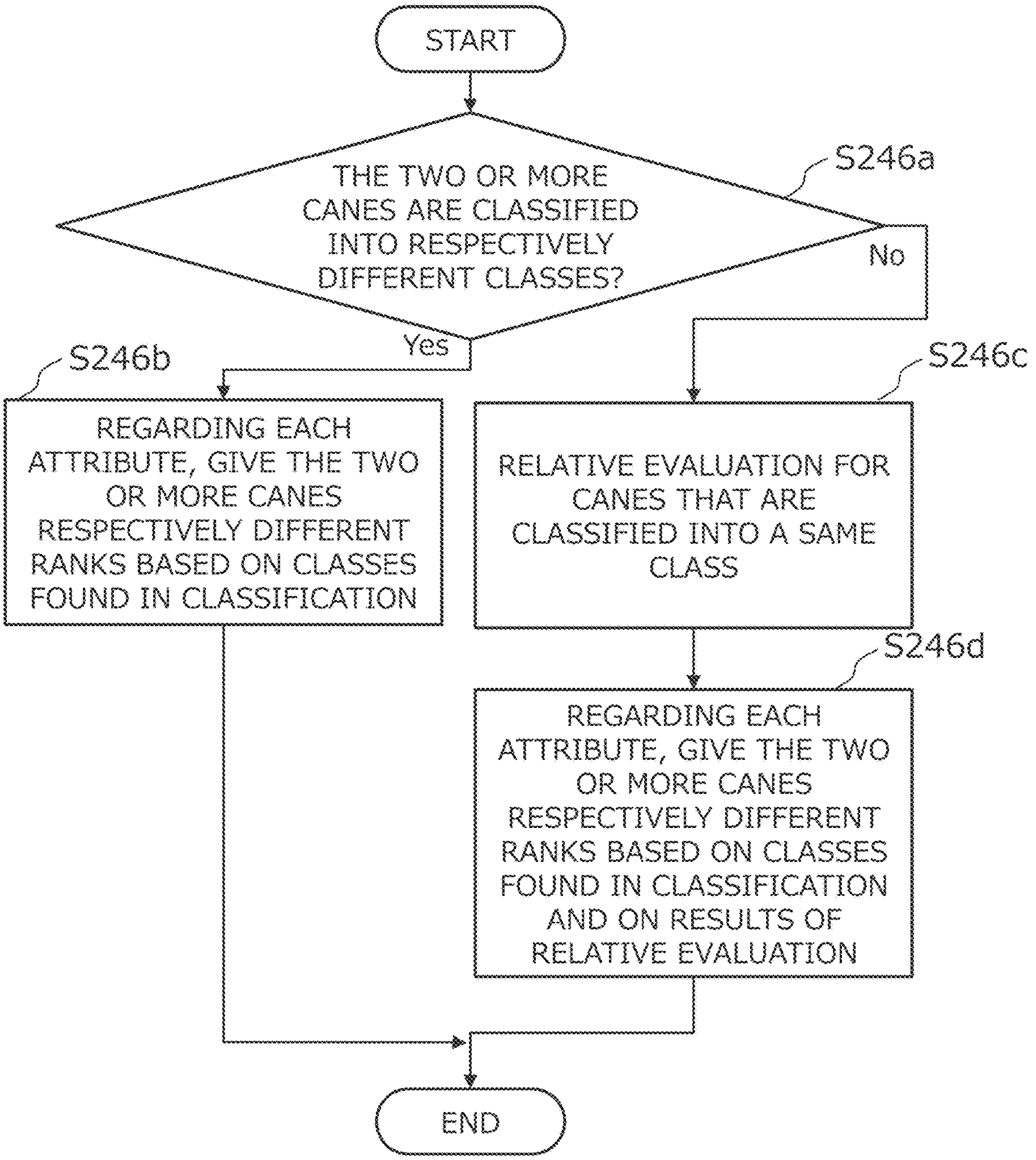
FIG. 15C is a flowchart showing an example of a process to be performed in step S246.

FIG. 15C is a flowchart showing an example of a process to be performed in step S246.

In the example of FIG. 15C, based on the results of classification in step S244, the ranking in step S246 is performed.

At step S244, regarding each of the one or more attributes, if the two or more canes that are the subject of processing are classified into respectively different classes (if Yes at step S246*a*), then at step S246*b*, the two or more canes that are the subject of processing are given respectively different ranks based on the classes determined in the classification of step S244.

At step S244, regarding each of the one or more attributes, if there are two or mores canes that are classified into the same class among the plurality of classes (if No at step S246*a*), then at step S246*c*, a relative evaluation for the canes that are classified into the same class is made.

At step S246*d*, based on the classes determined in the classification of step S244 and the results of the relative evaluation in step S246*c*, the two or more canes that are the subject of processing are given respectively different ranks.

For example, in the example of FIG. 16A, after classification of five canes a to e, a relative evaluation may be performed only for cane a, cane b, cane d, and cane e, which have been classified into the same class "Bad". Based on the results of relative evaluation and the results of classification, cane a to cane e are given respectively different ranks.

FIG. 16B is a schematic diagram for describing another example of processes to be performed in step S244 and step S246. Similarly to Table T3*a* in FIG. 16A, it is assumed that measurement values concerning the attribute x have been acquired for five canes a to e, which are the two or more canes that are the subject of processing.

Figure 15D:
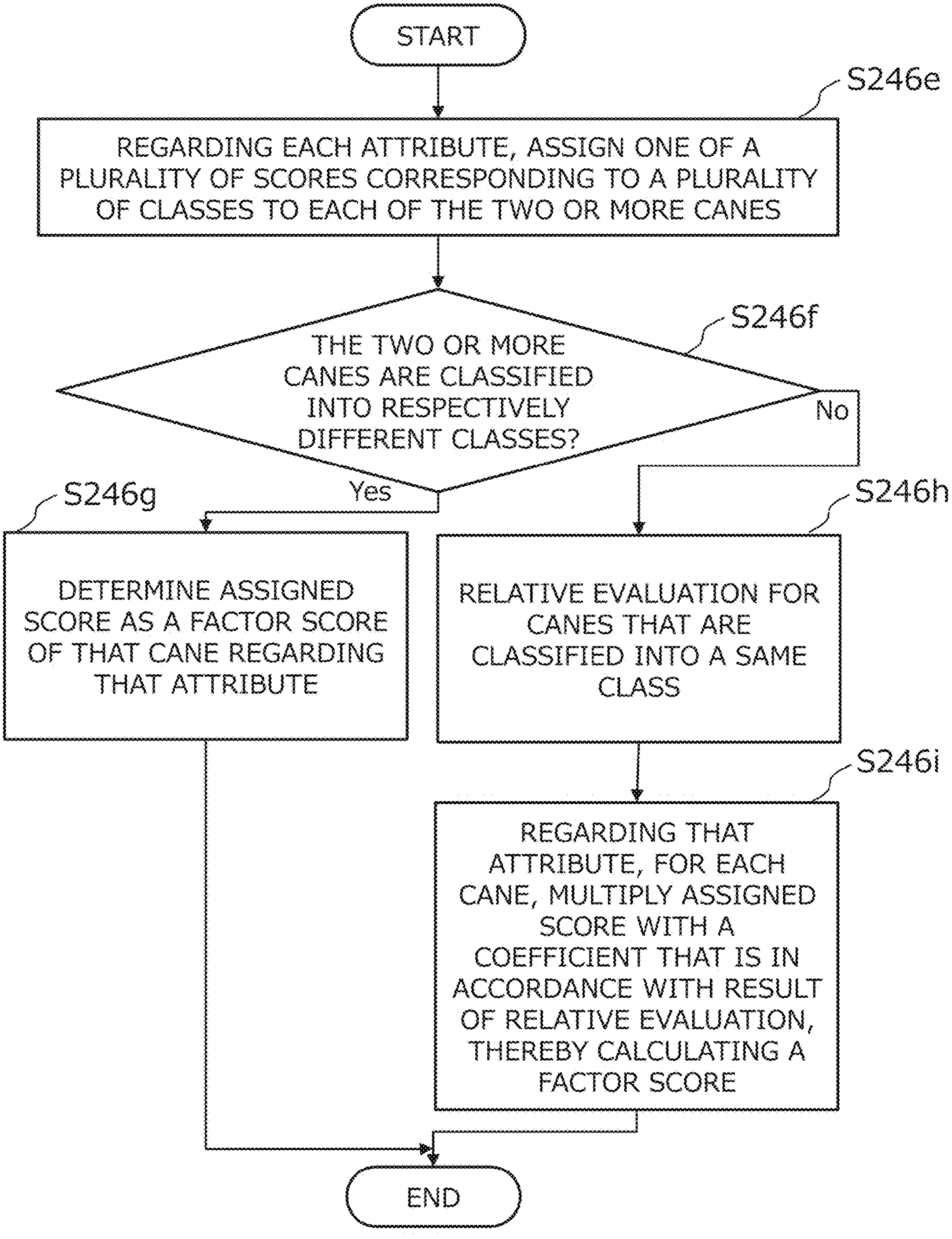
FIG. 15D is a flowchart showing another example of a process to be performed in step S246.

FIG. 15D is a flowchart showing another example of a process to be performed in step S246.

At step S246*e*, regarding each of the one or more attributes, a score corresponding to a class determined in the classification of step S244 is assigned to each of the two or more canes that are the subject of processing. Regarding each attribute, a plurality of scores corresponding to the plurality of classes are predefined. Table T3*d* in FIG. 16B shows three classes regarding the attribute x and scores corresponding to the respective classes.

Regarding each of the one or more attributes, if there are two or mores canes that are classified into the same class among the plurality of classes at step S244 (if No at step S246*f*), then at step S246*h*, a relative evaluation for canes that are classified into the same class is made. Step S246*h* may be performed similarly to step S246*c* in FIG. 15C.

At step S246*i*, the score assigned in step S246*e* is multiplied with a coefficient that is in accordance with the result of the relative evaluation in step S246*h*, thus calculating a factor score regarding each attribute, for each of the two or more canes. Table T3*e* in FIG. 16B shows an example of coefficients that are in accordance with the results of the relative evaluation in step S246*h*, whereas Table T3*f* shows, for five canes a to e, scores Sx assigned regarding the attribute x and coefficients Wr to be applied. Among any canes that are classified into the same class, a cane bearing an $n^{th}$ relative evaluation has its assigned score Sx multiplied with a coefficient Wr(n). Without being limited to the examples shown in FIG. 16B, the values of the coefficient Wr may be set so as to increase as the result of relative evaluation (rank) becomes higher. However, preferably the values are such that, even after the score Sx is multiplied with the coefficient Wr, the canes maintain the same ranking relationship with one another as indicated by their assigned scores Sx. In other words, preferably a coefficient Wr is set so that a value obtained by multiplying an assigned score Sx with the coefficient Wr is between the value of the score which is one rank higher and the value of the score which is one rank lower than that score. In the example of FIG. 16B, the coefficients Wr are preferably set so that, if an assigned score Sx is "2", the value of Wr×Sx is greater than 1 but smaller than 3. If there is only cane that is classified into the same class, then the coefficient Wr=1 for that cane (or, the score is not multiplied with a coefficient). In the example of FIG. 16B, cane c is the only cane that is classified into the class "Okay". Therefore, the coefficient Wr=1 for cane c, and the factor score Fx(c) of cane c regarding the attribute x is determined to be the score "2", which was assigned in step S246*e*.

Regarding each of the one or more attributes at step S244, if the two or more canes that are the subject of processing were classified into respectively different classes (if Yes at step S246*f*), then at step S246*g*, the score assigned in step S246*e* is regarded as a factor score of each cane regarding that attribute.

The scores regarding each attribute may be normalized so that the maximum value among the plurality of scores regarding each attribute is equal across the two or more attributes. In the example of FIG. 16B, in the calculation formula for calculating a factor score Fx(m) of a cane m regarding the attribute x, the value obtained by multiplying the assigned score Sx with the coefficient Wr is divided by 3. This corresponds to normalizing with the maximum value "3" among the scores regarding the attribute x. In particular, when using two or more attributes to make the determination as to a cane to be removed or a cane to be retained, performing such normalization allows results of evaluation regarding two or more attributes to be treated in parallel manners. Without being limited to the calculation method of the example of FIG. 16B, for example, the plurality of scores regarding each attribute may be previously-normalized values. In the example of FIG. 16B, scores associated with the three classes "Good", "Okay", and "Bad" regarding the attribute x may be "1", "⅔", and "⅓", respectively.

Figure 15E:
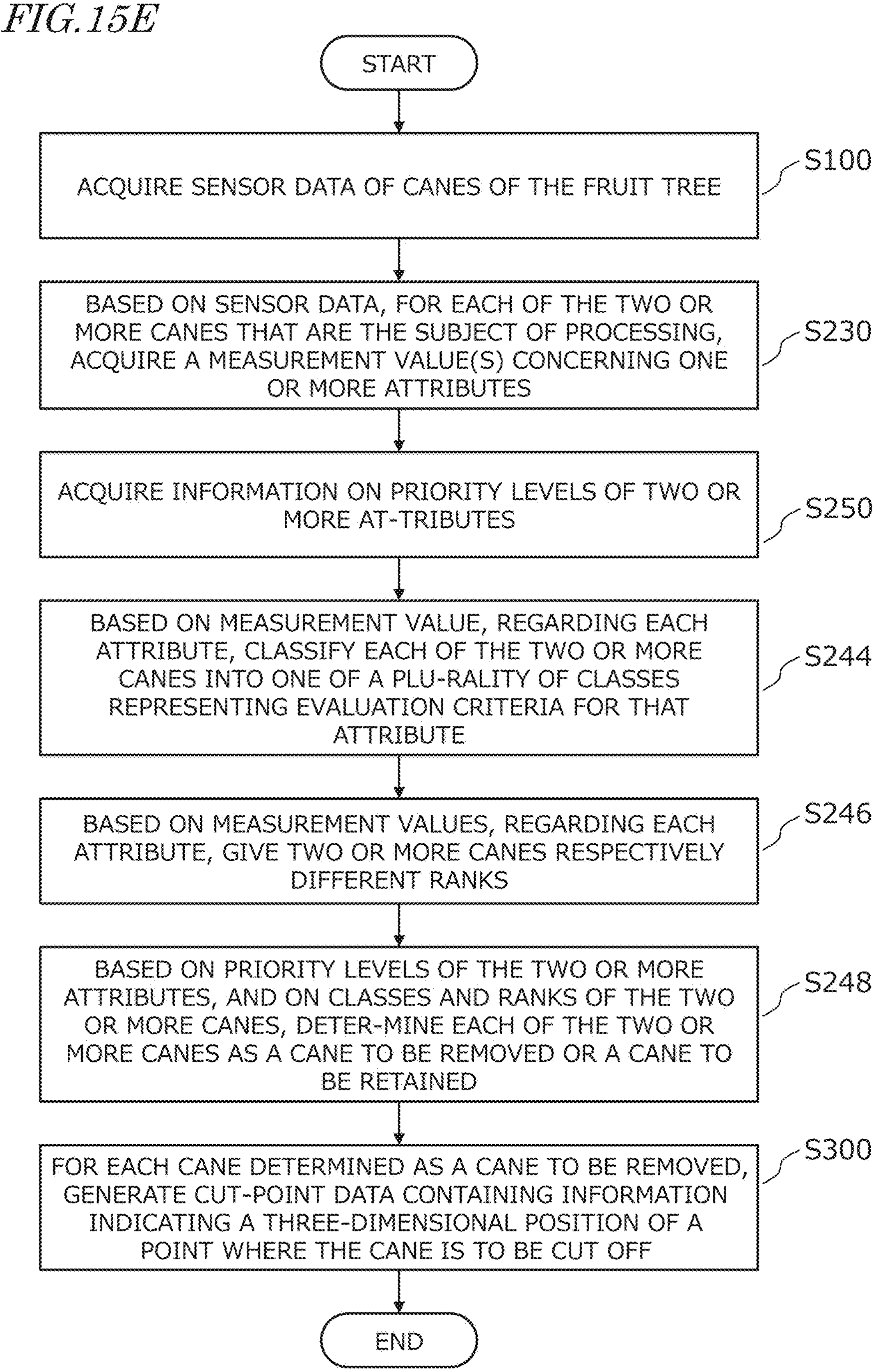
FIG. 15E is a flowchart showing an example procedure of generating cut-point data of canes of a fruit tree, according to an example embodiment of the present disclosure.

FIG. 15E is a flowchart showing an example procedure of generating cut-point data of canes of a fruit tree, according to an example embodiment of the present disclosure. The flowchart of FIG. 15E is an example variation of the flowchart of FIG. 15A, and differs from the flowchart of FIG. 15A in that it further includes step S250 (acquisition of information on priority levels of two or more attributes).

At step S250 in FIG. 15E, information on priority levels of two or more attributes is acquired. The process of step S250 is performed similarly to the process of step S250 in FIG. 13A.

At step S248, based on the priority levels of two or more attributes acquired in step S250, the classes determined in the classification of step S244, and the ranks given in step S246, each of the two or more canes that are the subject of processing is determined as a cane to be removed or a cane to be retained.

At step S248, the total score Ts may be calculated based on a factor score determined for each of the two or more canes regarding each of the two or more attributes and on the information on the priority levels acquired in step S250. The factor scores may be determined through a similar process to step S248 in FIG. 15A. By determining a factor score of each cane regarding each attribute through a method similar to what was described with reference to FIG. 16B, factor scores as in the example of FIG. 14A are determined. The calculation of the total score Ts based on the factor scores and priority levels can be performed through a similar process to step S252*b* in FIG. 13B, for example.

The flowcharts of FIGS. 15A, 15B, and 15E may be further modified in combination with the aforementioned flowcharts or processes. For example, based on the sensor data acquired in step S100, the plurality of canes of the fruit tree may further be grouped into a plurality of groups. Such a process may be performed through a similar process to step S220 in FIG. 9A. In the case of further performing a process of grouping the plurality of canes of the fruit tree into a plurality of groups, the process that was performed for the two or more canes that are the subject of processing in the examples of FIGS. 15A, 15B, and 15E is performed for the two or more canes that were grouped into the same group among the plurality of groups in step S220.

With reference to FIGS. 17A to 17C, FIGS. 18A, 18B, FIGS. 19A, 19B, FIGS. 20A, 20B, and FIGS. 21A to 21C, example types of one or more attributes to be used for the determination of a cane to be retained will be described. FIGS. 17A to 17C are diagram schematically showing example classifications of attributes. FIGS. 18A, 18B, FIGS. 19A, 19B, FIGS. 20A, 20B, and FIGS. 21A to 21C are flowcharts showing example procedures of generating cut-point data of canes of a fruit tree according to an example embodiment of the present disclosure, these being example variations of the flowchart of FIG. 12.

Figure 18A:
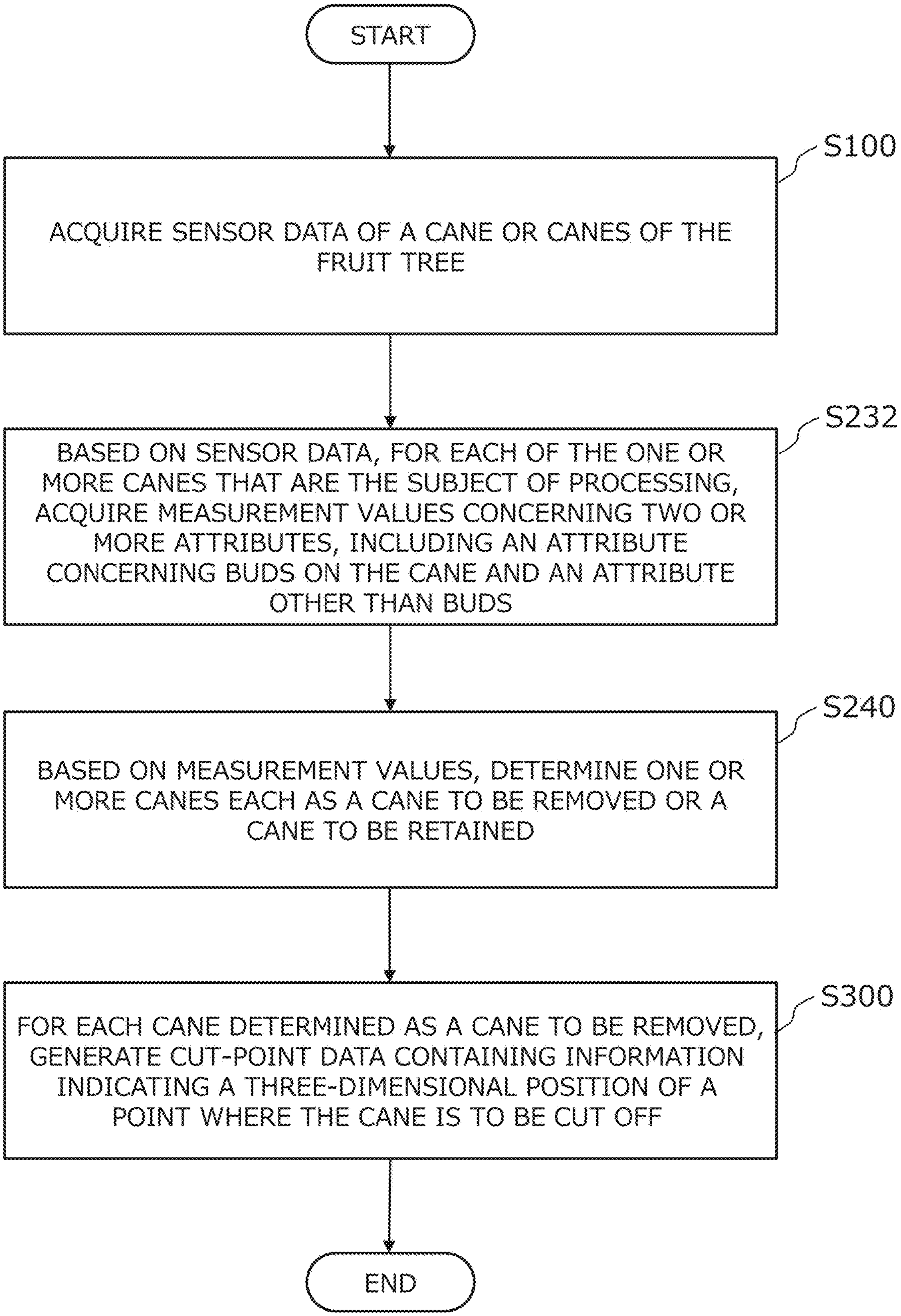
FIG. 18A is a flowchart showing an example procedure of generating cut-point data of canes of a fruit tree, according to an example embodiment of the present disclosure.

FIG. 18A is a flowchart showing an example procedure of generating cut-point data of canes of a fruit tree, according to an example embodiment of the present disclosure. The flowchart of FIG. 18A is an example variation of the flowchart of FIG. 12, and differs from the flowchart of FIG. 12 in that it includes step S232, instead of step S230 in FIG. 12. The example of FIG. 18A can be combined with any of the aforementioned flowcharts.

In the example of FIG. 18A, the procedure of generating cut-point data of canes of a fruit tree includes acquiring sensor data of one or more canes of the fruit tree by a sensor or sensors (step S100), based on the sensor data, for each of the one or more canes, acquiring measurement values concerning two or more attributes, including an attribute concerning buds on the cane and an attribute other than buds (step S232), based on the measurement values, determining each of the one or more canes as a cane to be removed or a cane to be retained (step S240), and, for each cane determined as a cane to be removed, generating cut-point data including information indicating a three-dimensional position of a point where the cane is to be cut off (step S300).

Processes other than step S232 are performed similarly to the processes in the example of FIG. 9B or FIG. 12.

At step S232, based on the sensor data acquired in step S100, for each of the one or more canes 58 that are the subject of processing, measurement values concerning two or more attributes are acquired, including an attribute concerning buds on the cane and an attribute other than buds. In the example of FIG. 17A, classification is made into attributes concerning buds on the cane and attributes other than buds. As shown in FIG. 17A, the attributes other than buds include at least one of a color of the cane, a direction in which the cane extends, a thickness of the cane, a height of the base of the cane, and a length of the cane. The attributes concerning buds on the cane include at least one of a size of buds on the cane, a direction in which buds on the cane are facing, and a length between nodes of the cane.

At step S240, based on the measurement values acquired in step S232, each of the one or more canes that are the subject of processing is determined as a cane to be removed or a cane to be retained. The method of determining canes to be removed or canes to be retained may be similar to the aforementioned example. It is performed similarly to the process of step S240 in the example of FIG. 9B, for example.

By determining each cane as a cane to be removed or a cane to be retained based on measurement values acquired concerning two or more attributes including an attribute concerning buds on the cane and an attribute other than buds, it becomes possible to select a cane that is preferable as a fruiting cane in light of an attribute concerning buds on the cane and an attribute other than buds, thus leading to an improvement in the fruit yield and quality.

Based on the determination in step S240, the process of step S300 is performed.

After step S300, step S400 may further be included as in the example of FIG. 4B. In other words, the cut-point data generated in step S300 may be input to a controller configured or programmed to control a three-dimensional position of a cutter that cuts canes of the fruit tree (e.g., the cutting tool 24 in the cutting system 1 of FIG. 1). Thus, it is possible to use a cutter to perform cutting of canes of the fruit tree.

Figure 18B:
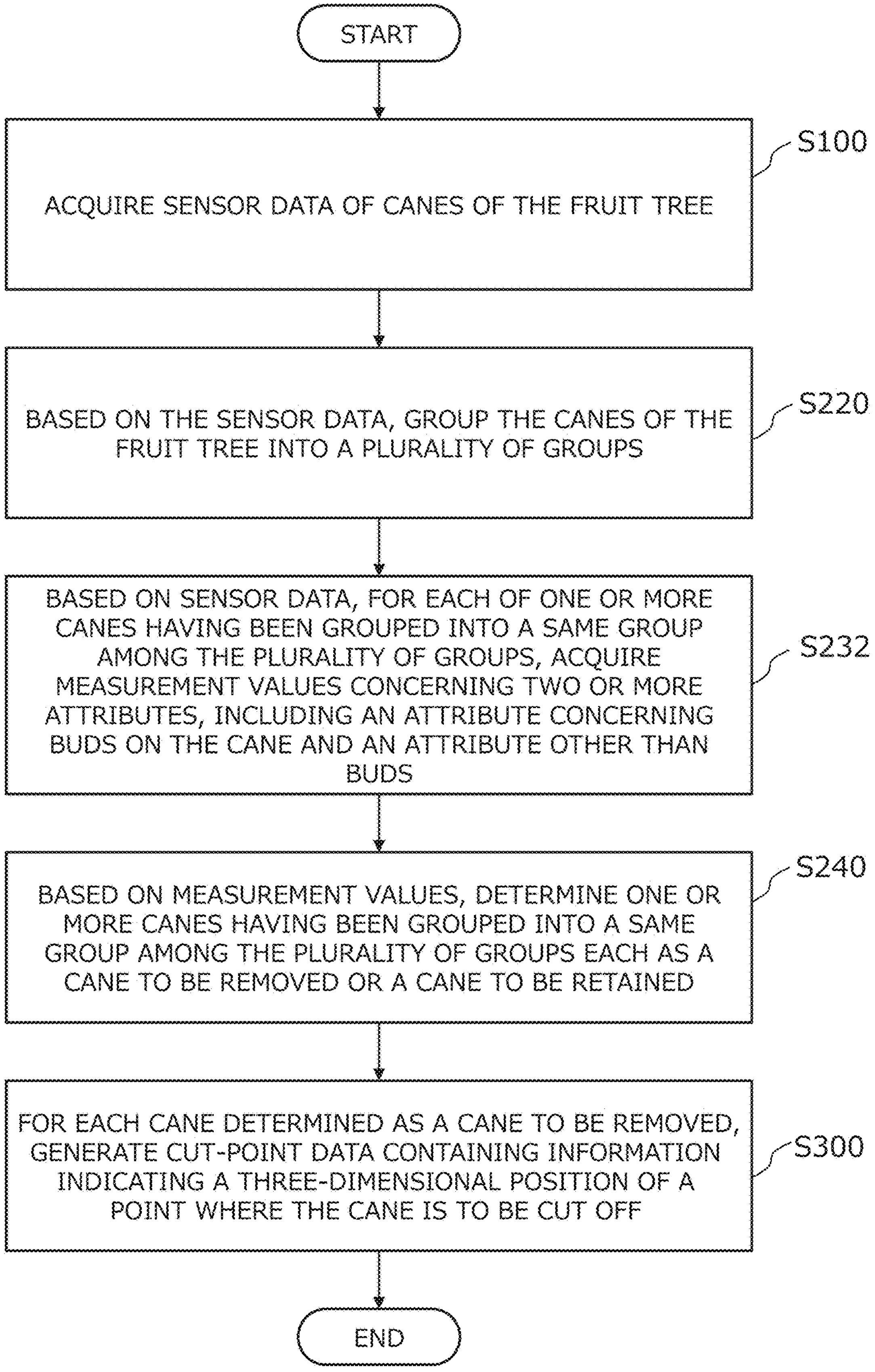
FIG. 18B is a flowchart showing an example procedure of generating cut-point data of canes of a fruit tree, according to an example embodiment of the present disclosure.

FIG. 18B is a flowchart showing an example procedure of generating cut-point data of canes of a fruit tree, according to an example embodiment of the present disclosure. The flowchart of FIG. 18B differs from the flowchart of FIG. 18A in that it further includes step S220 (grouping).

At step S220 in FIG. 18B, based on the sensor data acquired in step S100, the plurality of canes 58 of the fruit tree are grouped into a plurality of groups. The process of step S220 is performed similarly to the process of step S220 in FIG. 9A. The process in each step of FIG. 18B other than step S220 is performed similarly to the example of FIG. 21A. However, in the example of FIG. 18B, the process that is performed for one or more canes that are the subject of processing in the example of FIG. 18A is performed for one or more canes that were grouped into the same group among the plurality of groups in step S220.

The flowcharts of FIGS. 18A and 18B may be further modified in combination with the aforementioned flowcharts or processes. For example, acquiring information on priority levels of two or more attributes and determining each of the one or more canes as a cane to be removed or a cane to be retained based on the priority levels and the measurement values acquired in step S232 may be further performed. Such processes may be performed through similar processes to step S250 and step S252 in FIGS. 13A and 13B.

Figure 19A:
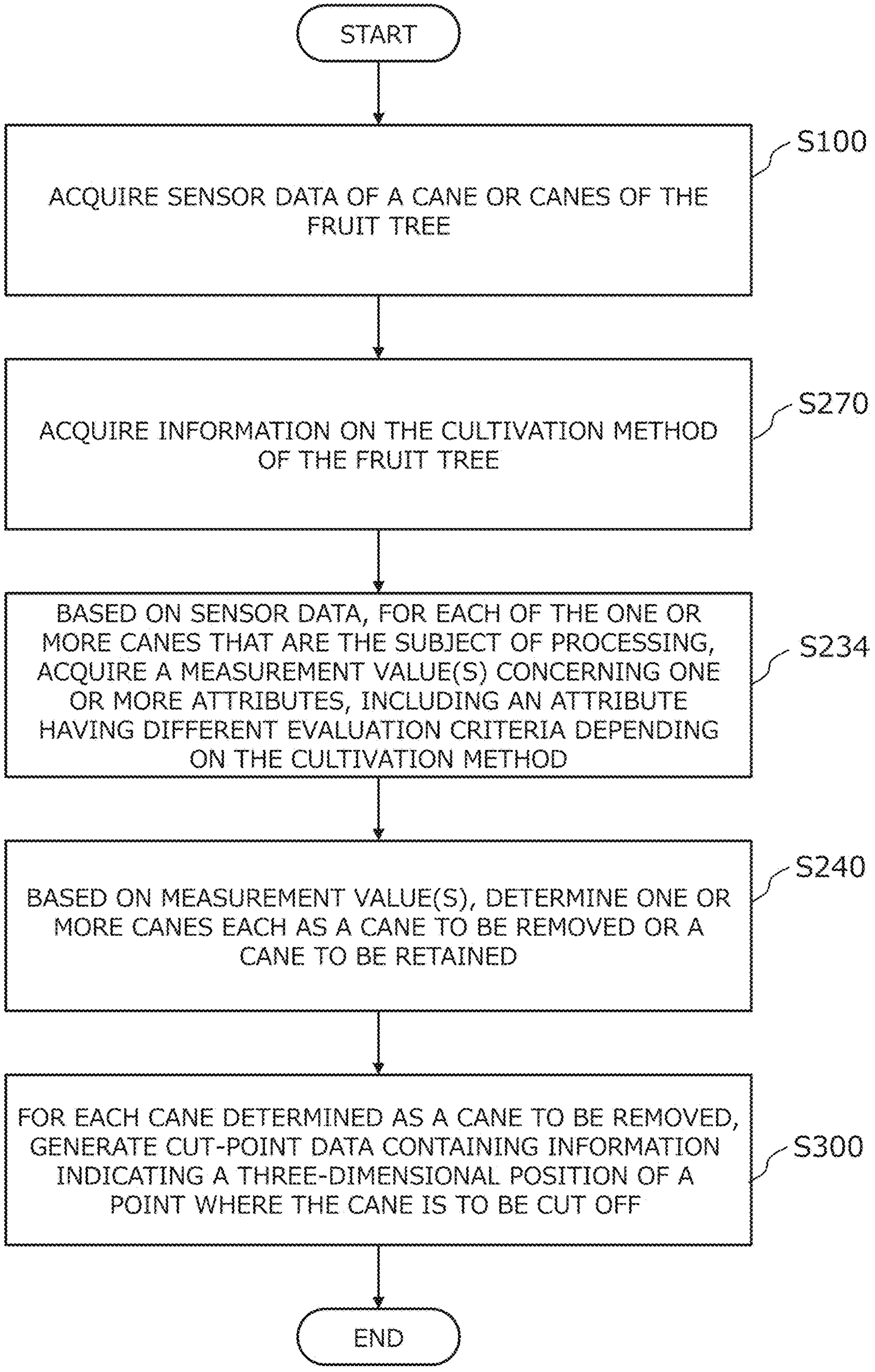
FIG. 19A is a flowchart showing an example procedure of generating cut-point data of canes of a fruit tree, according to an example embodiment of the present disclosure.

FIG. 19A is a flowchart showing an example procedure of generating cut-point data of canes of a fruit tree, according to an example embodiment of the present disclosure. The flowchart of FIG. 19A is an example variation of the flowchart of FIG. 12, and differs from the flowchart of FIG. 12 in that it includes step S270 and step S234, instead of step S230 in the example of FIG. 12. The example of FIG. 19A can be combined with any of the aforementioned flowcharts.

In the example of FIG. 19A, the procedure of generating cut-point data of canes of a fruit tree includes acquiring sensor information indicating data including a three-dimensional structure of one or more canes of the fruit tree by a sensor or sensors (step S100), acquiring information on the cultivation method of the fruit tree (step S270), based on the sensor data, for each of the one or more canes, acquiring a measurement value(s) concerning one or more attributes, including an attribute having different evaluation criteria depending on the cultivation method (step S234), based on the measurement value(s), determining each of the one or more canes as a cane to be removed or a cane to be retained (step S240), and, for each cane determined as a cane to be removed, generating cut-point data including information indicating a three-dimensional position of a point where the cane is to be cut off (step S300).

Processes other than step S270 and step S234 are performed similarly to the processes in the example of FIG. 9B or FIG. 12. Note in the example of FIG. 19A, when acquiring a measurement value(s) concerning one or more attributes including an attribute having different evaluation criteria depending on the cultivation method at step S234, sensor data including information indicating a three-dimensional structure of the canes of the fruit tree is necessary. Therefore, at step S100, sensor data including information indicating a three-dimensional structure of the canes of the fruit tree is acquired.

At step S270, information on the cultivation method of the fruit tree is acquired. Information on the cultivation method of the fruit tree includes, information (e.g., type) on at least one of the shape of a trellis system of the fruit tree, the pruning method for the fruit tree, and the training method for the fruit tree, for example. The information on the cultivation method of the fruit tree may include information on the field design. In a case where the fruit tree is a grape vine, the information on the cultivation method of the grape vine may include information on the vineyard design. The field design and the vineyard design may be determined based on a factor including at least one of shape of the trellis system, the pruning method, and the training method. The information on the cultivation method of the fruit tree may be acquired based on a user input, or acquired based on sensor data of the fruit tree and/or the trellis system. For example, the information on the cultivation method of the fruit tree may be acquired based on image data of the fruit tree acquired by an imager (camera 20). It may be acquired based on sensor data including information indicating a three-dimensional structure of the fruit tree.

At step S234, based on the sensor data acquired in step S100, for each of the one or more canes 58 that are the subject of processing, a measurement value(s) concerning one or more attributes including an attribute having different evaluation criteria depending on the cultivation method is acquired. In the example of FIG. 17B, classification is made into attributes having different evaluation criteria depending on the cultivation method of the fruit tree and attributes having unchanging evaluation criteria irrespective of the cultivation method of the fruit tree. In a case where the fruit tree is a grape vine, an attribute having different evaluation criteria depending on the cultivation method of the fruit tree is an attribute having different evaluation criteria depending on the information on the vineyard design of the grape vine, whereas an attribute having unchanging evaluation criteria irrespective of the cultivation method of the fruit tree is an attribute having unchanging evaluation criteria irrespective of the information on the vineyard design. As shown in FIG. 17B, attributes having different evaluation criteria depending on the cultivation method of the fruit tree include at least one of a direction in which the cane extends, a height of the base of the cane, a direction in which buds on the cane are facing, a length of the cane, and a length between nodes of the cane, for example.

The one or more attributes may be two or more attributes including an attribute having different evaluation criteria depending on the cultivation method and an attribute having unchanging evaluation criteria irrespective of the cultivation method. As shown in FIG. 17B, attributes having unchanging evaluation criteria irrespective of the cultivation method of the fruit tree include at least one of a color of the cane, a thickness of the cane, and a size of buds on the cane, for example.

At step S240, based on the measurement value(s) acquired in step S234, each of the one or more canes that are the subject of processing is determined as a cane to be removed or a cane to be retained. The method of determining canes to be removed or canes to be retained may be similar to the aforementioned example. By performing similar processes to the processes of, e.g., step S240*k* to step S240*q* shown in FIG. 11B, for each of the one or more canes that are the subject of processing, regarding each of the one or more attributes, a factor score may be determined based on the measurement value(s) acquired in step S234, and canes to be retained may be determined based on the factor score. As described earlier, the factor score of each cane regarding each attribute may be determined so that the factor score becomes higher as the cane has a more preferable state as a fruiting cane regarding that attribute. However, as for attributes having different evaluation criteria depending on the cultivation method, the preferable state of a fruiting cane changes depending on the cultivation method of the fruit tree. Therefore, a factor score regarding an attribute having different evaluation criteria depending on the cultivation method of the fruit tree is determined so as to differ depending on the cultivation method of the fruit tree. As for attributes having unchanging evaluation criteria irrespective of the cultivation method, the preferable state of a fruiting cane does not change depending on the cultivation method of the fruit tree, and therefore a factor score regarding any such attribute is determined so as not to differ depending on the cultivation method of the fruit tree.

Based on the determination in step S240, the process of step S300 is performed.

After step S300, step S400 may further be included as in the example of FIG. 4B. In other words, the cut-point data generated in step S300 may be input to a controller configured or programmed to control a three-dimensional position of a cutter that cuts canes of the fruit tree (e.g., the cutting tool 24 in the cutting system 1 of FIG. 1). Thus, it is possible to use a cutter to perform cutting of canes of the fruit tree.

Figure 19B:
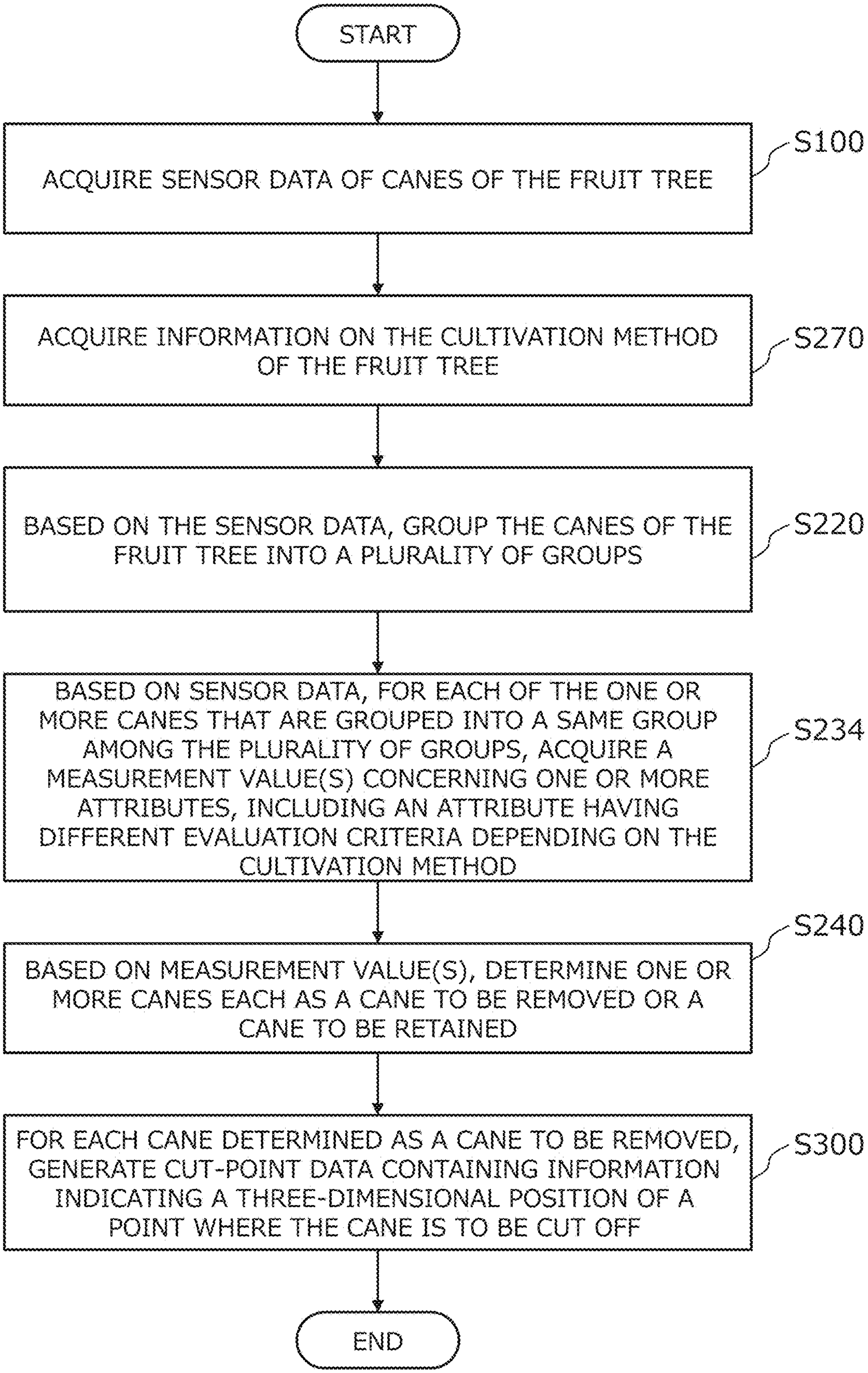
FIG. 19B is a flowchart showing an example procedure of generating cut-point data of canes of a fruit tree, according to an example embodiment of the present disclosure.

FIG. 19B is a flowchart showing an example procedure of generating cut-point data of canes of a fruit tree, according to an example embodiment of the present disclosure. The flowchart of FIG. 19B differs from the flowchart of FIG. 19A in that it further includes step S220 (grouping).

At step S220 in FIG. 19B, based on the sensor data acquired in step S100, the plurality of canes 58 of the fruit tree are grouped into a plurality of groups. The process of step S220 is performed similarly to the process of step S220 in FIG. 9A. The process in each step of FIG. 19B other than step S220 is performed similarly to the example of FIG. 19A. However, in the example of FIG. 19B, the process that is performed for one or more canes that are the subject of processing in the example of FIG. 19A is performed for one or more canes that were grouped into the same group among the plurality of groups in step S220.

The flowcharts of FIGS. 19A and 19B may be further modified in combination with the aforementioned flowcharts or processes. For example, acquiring information on priority levels of two or more attributes and determining each of the one or more canes as a cane to be removed or a cane to be retained based on the priority levels and the measurement values acquired in step S234 may be further performed. Such processes may be performed through similar processes to step S250 and step S252 in FIGS. 13A and 13B.

Figure 20A:
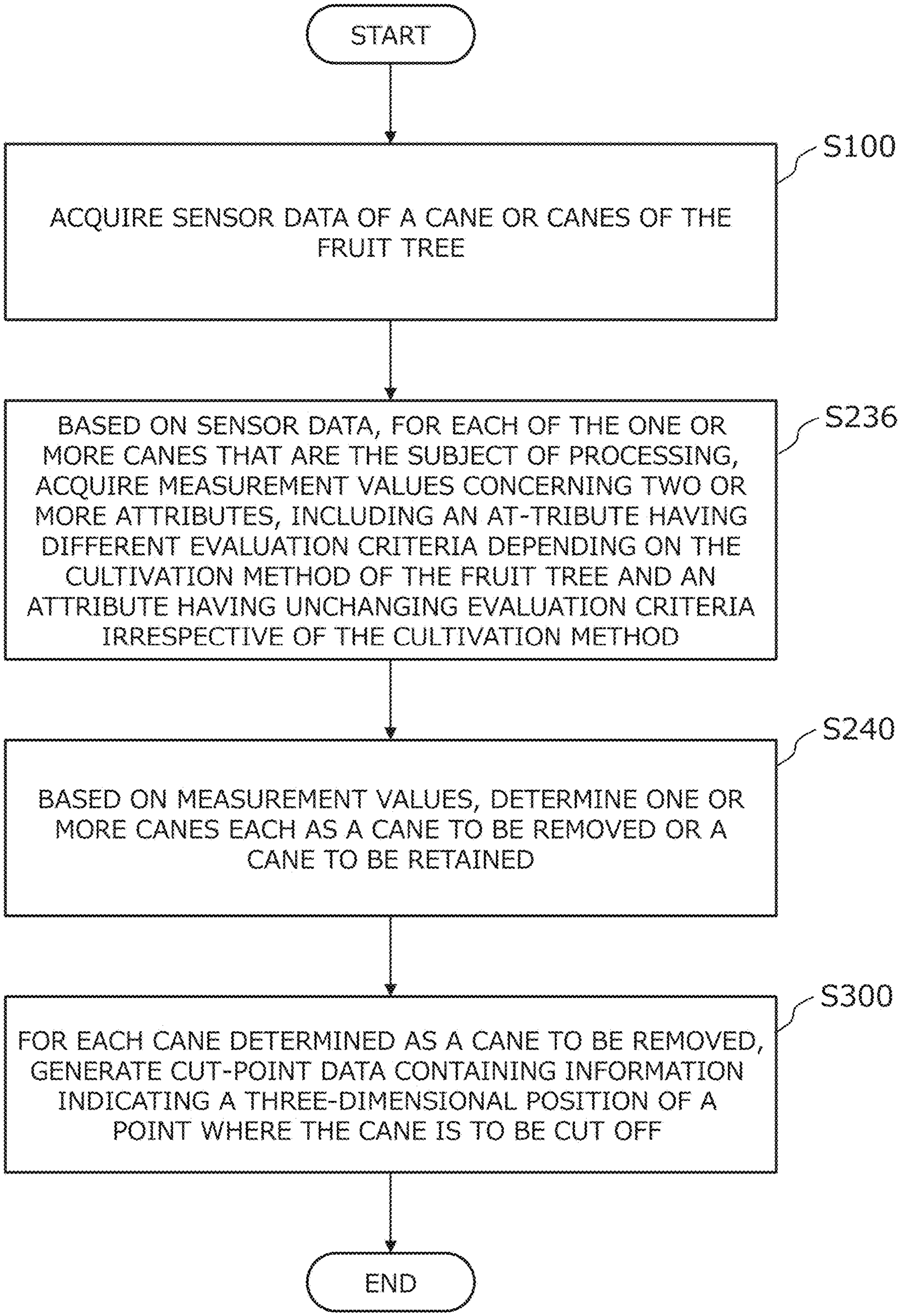
FIG. 20A is a flowchart showing an example procedure of generating cut-point data of canes of a fruit tree, according to an example embodiment of the present disclosure.

FIG. 20A is a flowchart showing an example procedure of generating cut-point data of canes of a fruit tree, according to an example embodiment of the present disclosure. The flowchart of FIG. 20A is an example variation of the flowchart of FIG. 12, and differs from the flowchart of FIG. 12 in that it includes step S236, instead of step S230 in the example of FIG. 12. The example of FIG. 20A can be combined with any of the aforementioned flowcharts.

In the example of FIG. 20A, the procedure of generating cut-point data of canes of a fruit tree includes acquiring sensor data including information indicating a three-dimensional structure of one or more canes of the fruit tree by a sensor or sensors (step S100), based on the sensor data, for each of the one or more canes, acquiring measurement values concerning two or more attributes, including an attribute having different evaluation criteria depending on the cultivation method of the fruit tree and an attribute having unchanging evaluation criteria irrespective of the cultivation method of the fruit tree (step S236), based on the measurement values, determining each of the one or more canes as a cane to be removed or a cane to be retained (step S240), and, for each cane determined as a cane to be removed, generating cut-point data including information indicating a three-dimensional position of a point where the cane is to be cut off (step S300).

Processes other than step S236 are performed similarly to the processes in the example of FIG. 9B or FIG. 12. Note in the example of FIG. 20A that, when acquiring measurement values concerning two or more attributes including an attribute having different evaluation criteria depending on the cultivation method of the fruit tree and an attribute having unchanging evaluation criteria irrespective of the cultivation method of the fruit tree at step S236, sensor data including information indicating a three-dimensional structure of the canes of the fruit tree is necessary. Therefore, at step S100, sensor data including information indicating a three-dimensional structure of the canes of the fruit tree is acquired.

At step S236, based on the sensor data acquired in step S100, for each of the one or more canes 58 that are the subject of processing, measurement values concerning two or more attributes are acquired, including an attribute having different evaluation criteria depending on the cultivation method of the fruit tree and an attribute having unchanging evaluation criteria irrespective of the cultivation method of the fruit tree. As shown in FIG. 17B, attributes having different evaluation criteria depending on the cultivation method of the fruit tree include at least one of a direction in which the cane extends, a height of the base of the cane, a direction in which buds on the cane are facing, a length of the cane, and a length between nodes of the cane, for example. As shown in FIG. 17B, attributes having unchanging evaluation criteria irrespective of the cultivation method of the fruit tree include at least one of a color of the cane, a thickness of the cane, and a size of buds on the cane, for example.

At step S240, based on the measurement values acquired in step S236, each of the one or more canes that are the subject of processing is determined as a cane to be removed or a cane to be retained. The method of determining canes to be removed or canes to be retained may be similar to the aforementioned example. By performing similar processes to the processes of, e.g., step S240*k* to step S240*q* shown in FIG. 11B, for each of the one or more canes that are the subject of processing, regarding each of the one or more attributes, a factor score may be determined based on the measurement value(s) acquired in step S234, and canes to be retained may be determined based on the factor score. As described earlier, the factor score of each cane regarding each attribute may be determined so that the factor score becomes higher as the cane has a more preferable state as a fruiting cane regarding that attribute. However, as for attributes having different evaluation criteria depending on the cultivation method, the preferable state of a fruiting cane changes depending on the cultivation method of the fruit tree. Therefore, a factor score regarding an attribute having different evaluation criteria depending on the cultivation method of the fruit tree is determined so as to differ depending on the cultivation method of the fruit tree. As for attributes having unchanging evaluation criteria irrespective of the cultivation method, the preferable state of a fruiting cane does not change depending on the cultivation method of the fruit tree, and therefore a factor score regarding any such attribute is determined so as not to differ depending on the cultivation method of the fruit tree.

Based on the determination in step S240, the process of step S300 is performed.

After step S300, step S400 may further be included as in the example of FIG. 4B. In other words, the cut-point data generated in step S300 may be input to a controller configured or programmed to control a three-dimensional position of a cutter that cuts canes of the fruit tree (e.g., the cutting tool 24 in the cutting system 1 of FIG. 1). Thus, it is possible to use a cutter to perform cutting of canes of the fruit tree.

Acquiring information on the cultivation method of the fruit tree may be further included. Acquisition of information on the cultivation method of the fruit tree may be performed through a similar process to step S270 in FIG. 19A.

Figure 20B:
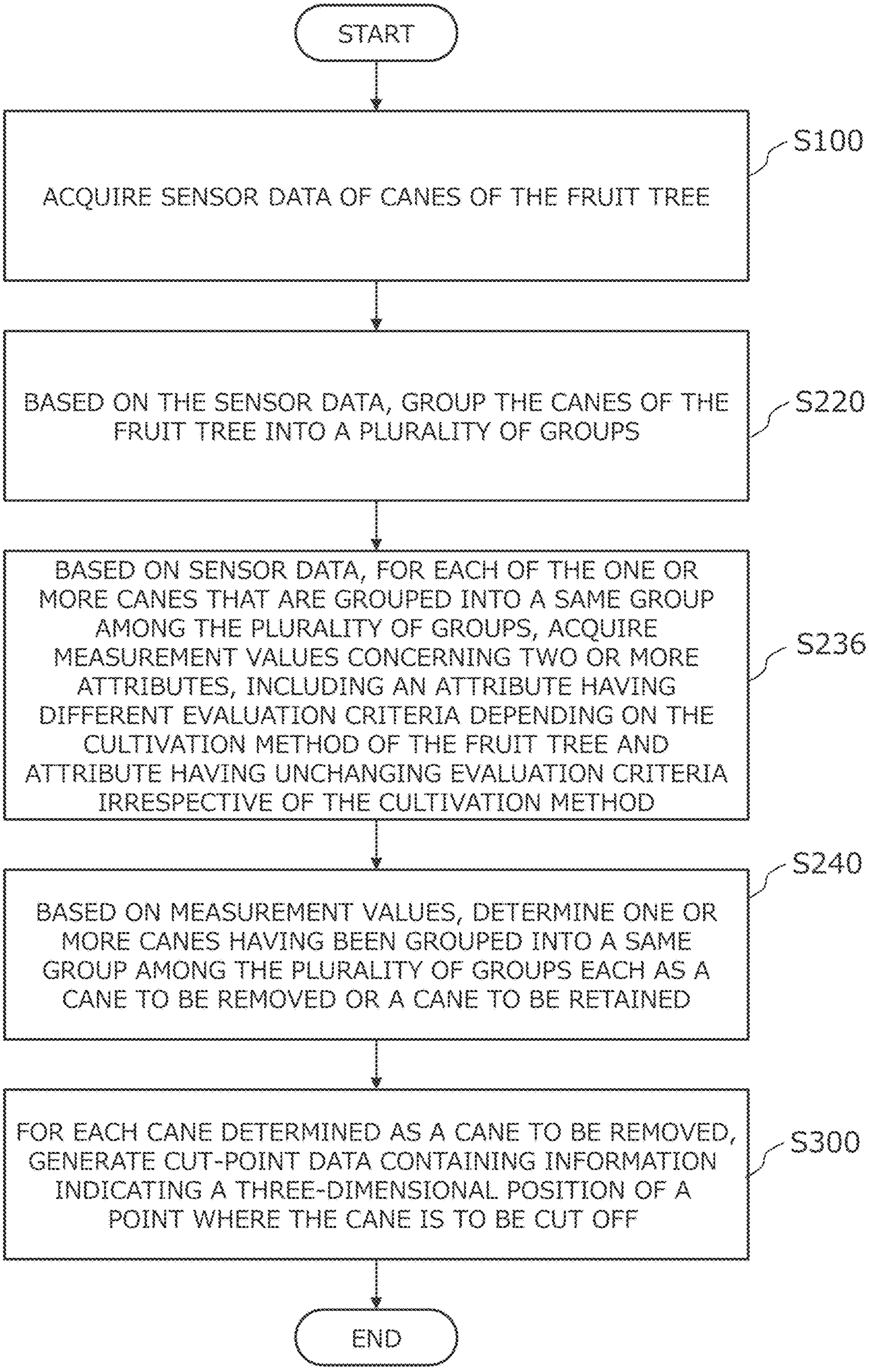
FIG. 20B is a flowchart showing an example procedure of generating cut-point data of canes of a fruit tree, according to an example embodiment of the present disclosure.

FIG. 20B is a flowchart showing an example procedure of generating cut-point data of canes of a fruit tree, according to an example embodiment of the present disclosure. The flowchart of FIG. 20B differs from the flowchart of FIG. 20A in that it further includes step S220 (grouping).

At step S220 in FIG. 20B, based on the sensor data acquired in step S100, the plurality of canes 58 of the fruit tree are grouped into a plurality of groups. The process of step S220 is performed similarly to the process of step S220 in FIG. 9A. The process in each step of FIG. 20B other than step S220 is performed similarly to the example of FIG. 20A. However, in the example of FIG. 20B, the process that is performed for one or more canes that are the subject of processing in the example of FIG. 20A is performed for one or more canes that were grouped into the same group among the plurality of groups in step S220.

The flowcharts of FIGS. 20A and 20B may be further modified in combination with the aforementioned flowcharts or processes. For example, acquiring information on priority levels of two or more attributes and determining each of the one or more canes as a cane to be removed or a cane to be retained based on the priority levels and the measurement values acquired in step S236 may be further performed. Such processes may be performed through similar processes to step S250 and step S252 in FIGS. 13A and 13B.

Figure 21A:
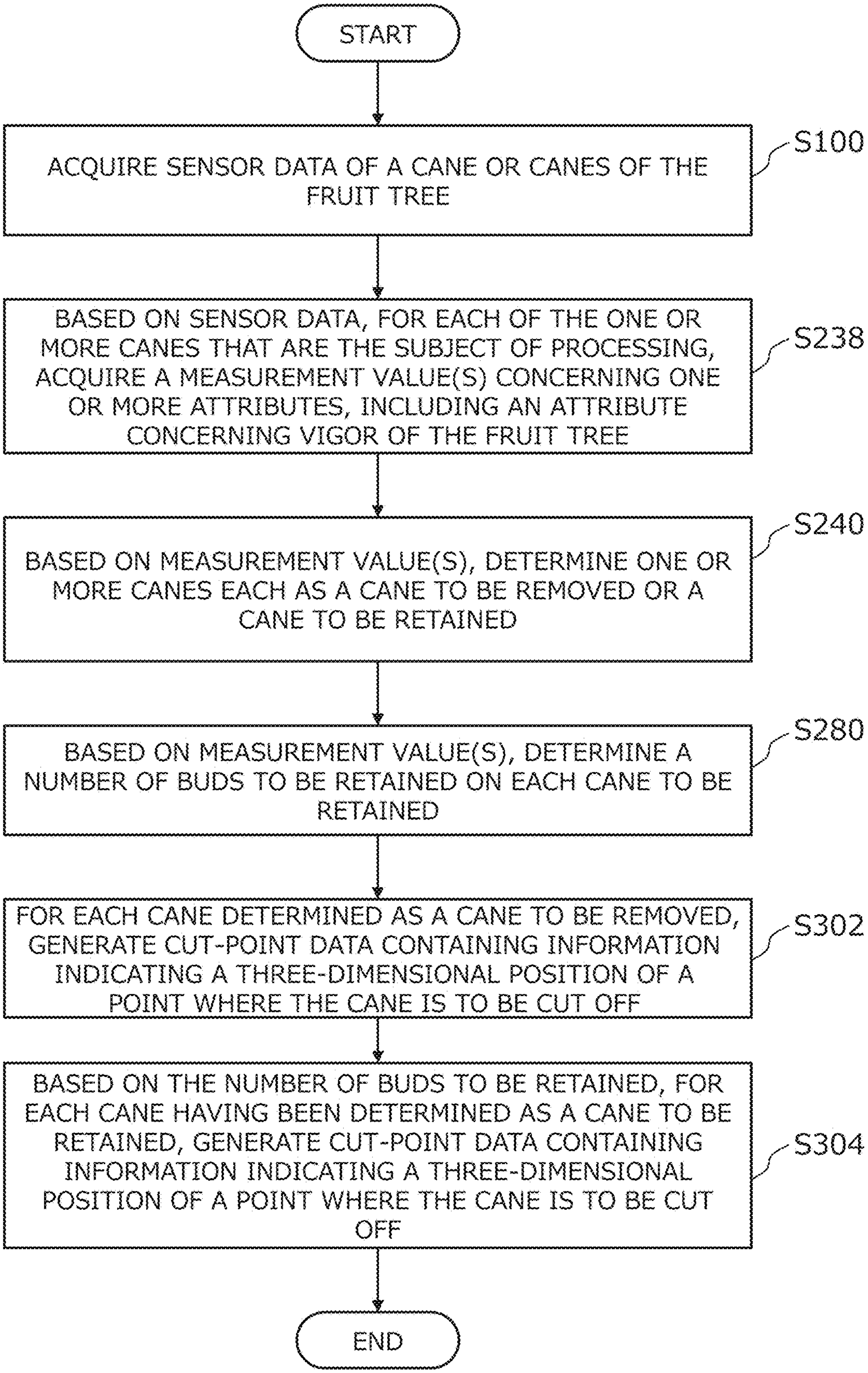
FIG. 21A is a flowchart showing an example procedure of generating cut-point data of canes of a fruit tree, according to an example embodiment of the present disclosure.

FIG. 21A is a flowchart showing an example procedure of generating cut-point data of canes of a fruit tree, according to an example embodiment of the present disclosure. The flowchart of FIG. 21A is an example variation of the flowchart of FIG. 12, and differs from the flowchart of FIG. 12 mainly in that it includes step S238 instead of step S230 in the example of FIG. 12, and that it further includes step S280. The example of FIG. 21A can be combined with any of the aforementioned flowcharts.

In the example of FIG. 21A, the procedure of generating cut-point data of canes of a fruit tree includes acquiring sensor data of one or more canes of the fruit tree by a sensor or sensors (step S100), based on the sensor data, for each of the one or more canes, acquiring a measurement value(s) concerning one or more attributes, including an attribute concerning vigor of the fruit tree (step S238), based on the measurement value(s), determining each of the one or more canes as a cane to be removed or a cane to be retained (step S240), based on the measurement value(s), determining a number of buds to be retained on each cane having been determined as a cane to be retained (step S280); for each cane determined as a cane to be removed, generating cut-point data including information indicating a three-dimensional position of a point where the cane is to be cut off (step S302), and, based on the number of buds to be retained, generating cut-point data for each cane having been determined as a cane to be retained (step S304).

The process of step S100 is performed similarly to the process in the example of FIG. 4A.

At step S238, based on the sensor data acquired in step S100, for each of the one or more canes 58 that are the subject of processing, a measurement value(s) concerning or more attributes is acquired, including an attribute concerning vigor of the fruit tree. In the example of FIG. 17C, classification is made into attributes concerning vigor of the fruit tree and other attributes. As shown in FIG. 17C, attributes concerning vigor of the fruit tree include a thickness of the cane, a size of buds on the cane, and a length between nodes of the cane, for example. For example, when the thickness of the cane is thinner than a predetermined value or when the size of buds is smaller than a predetermined value, the vigor may be too weak; and when the thickness of the cane is thicker than a predetermined value or when the size of buds is larger than a predetermined value, the vigor may be too strong. When the length between nodes of the cane (i.e., the distance between adjacent buds) is longer than a predetermined value, the vigor may be too strong because of there being few buds per unit length; and when the length between nodes of the cane is shorter than a predetermined value, the vigor may be too weak because of there being many buds per unit length. When the vigor is strong, the fruit yield may increase; and when the vigor is too weak, the fruit yield may decrease. Note that "vigor" usually refers to the growth state or health status of the entire fruit tree, but may in some cases refer to the growth state or health status of a particular cane of the fruit tree. In a fruit tree, a particular cane may have an excessively strong or weak vigor relative to other portions. As will be described below, by generating cut-point data while varying the number of buds to be retained in accordance with the vigor of the cane to be retained, a decrease in the fruit yield and quality can be reduced or prevented. Examples of attributes concerning vigor of the fruit tree are not limited to the attributes listed in FIG. 17C. Like these examples, other attributes concerning vigor of the fruit tree are also possible.

At step S240, based on the measurement value(s) acquired in step S238, each of the one or more canes that are the subject of processing is determined as a cane to be removed or a cane to be retained. The method of determining canes to be removed or canes to be retained may be similar to the aforementioned example. By performing similar processes to the processes of, e.g., step S240*k* to step S240*q* shown in FIG. 11B, for each of the one or more canes that are the subject of processing, regarding each of the one or more attributes, a factor score may be determined based on the measurement value(s) acquired in step S234, and canes to be retained may be determined based on the factor score.

At step S280, based on the measurement value(s) acquired in step S238, a number of buds to be retained on each cane having been determined as a cane to be retained in step S240 is determined.

Figure 21B:
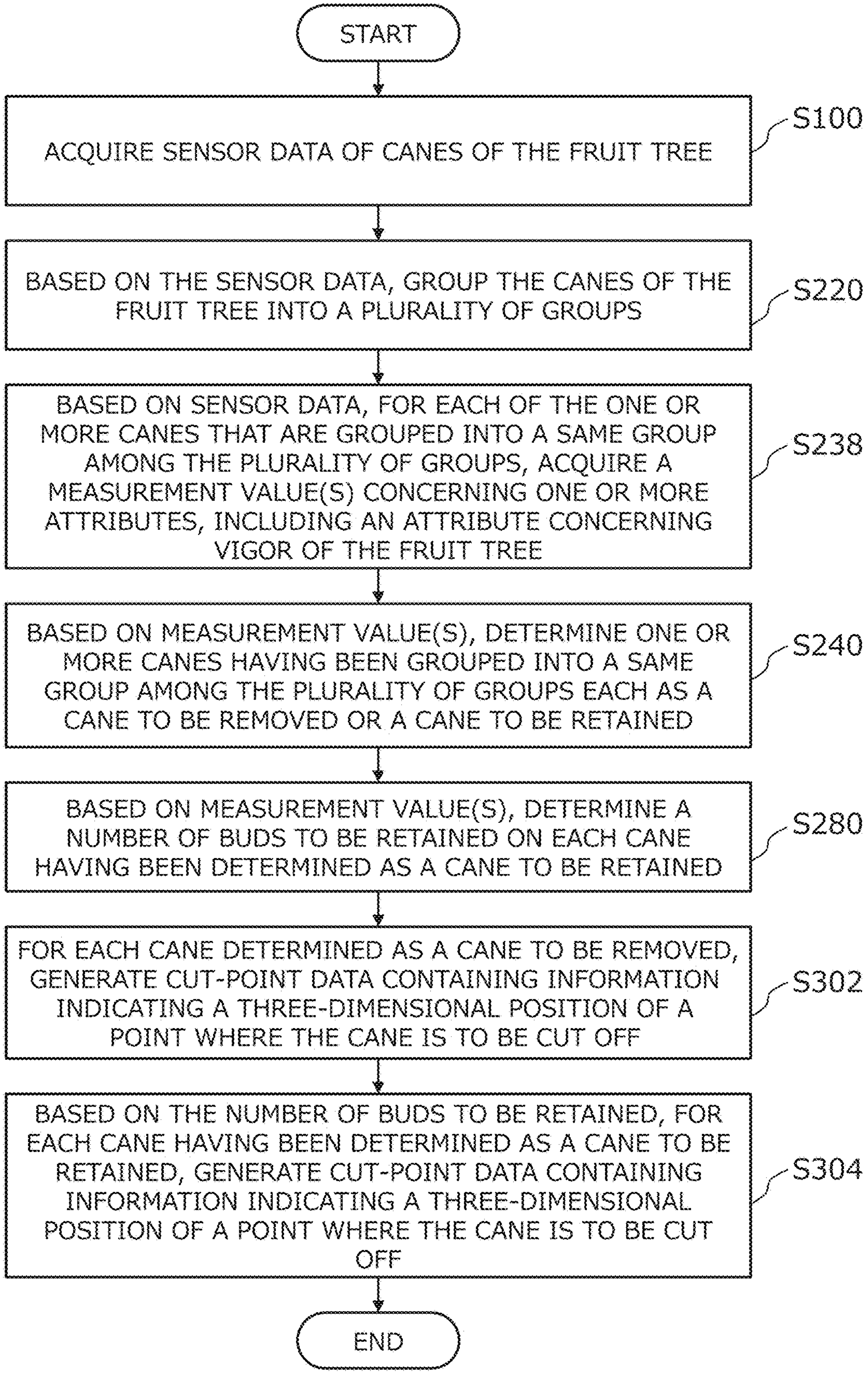
FIG. 21B is a flowchart showing an example procedure of generating cut-point data of canes of a fruit tree, according to an example embodiment of the present disclosure.
Figure 21C:
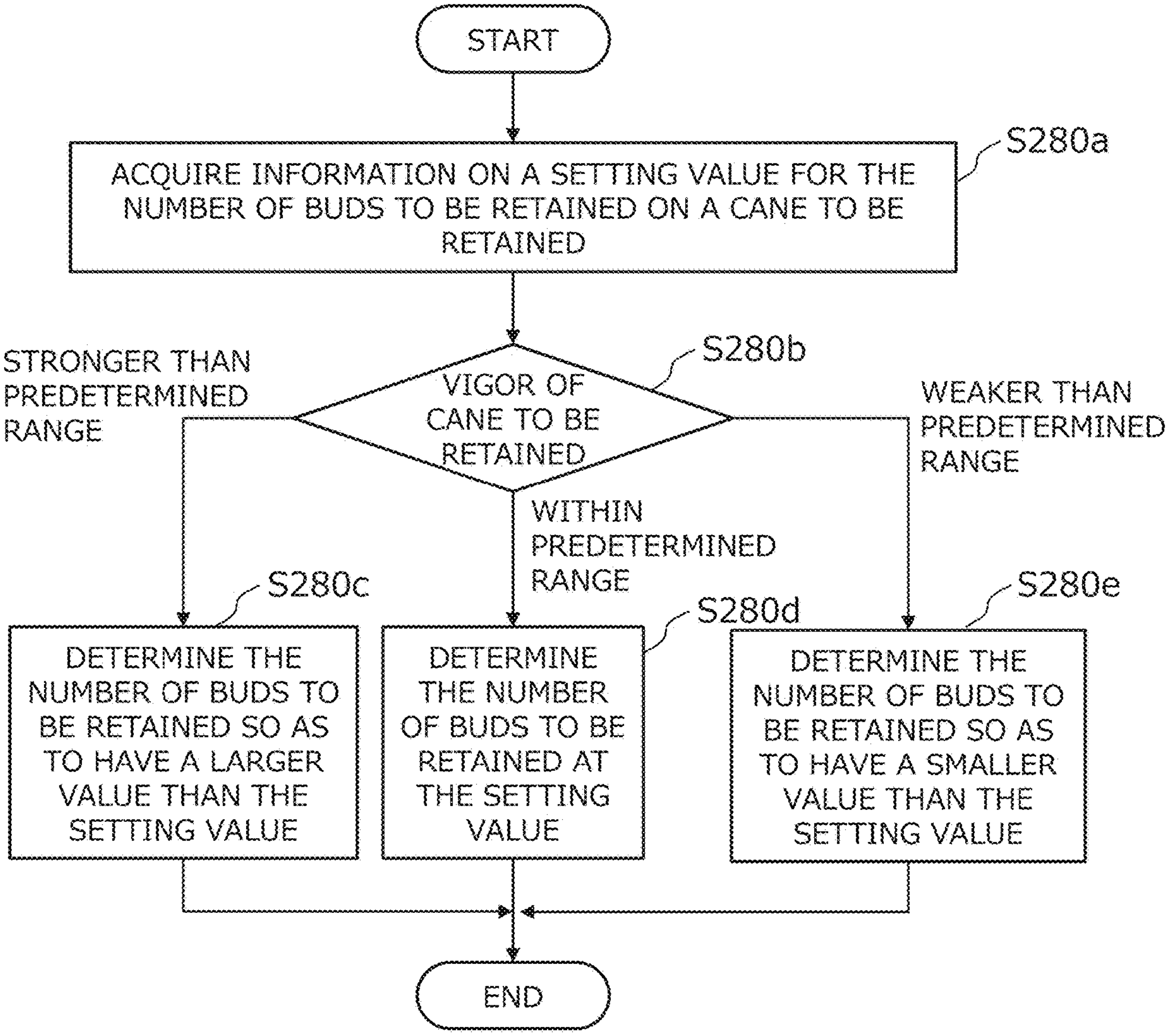
FIG. 21C is a flowchart showing an example procedure of generating cut-point data of canes of a fruit tree, according to an example embodiment of the present disclosure.

FIG. 21C is a flowchart showing a specific example of a process to be performed at step S280.

At step S280*a*, information on a setting value for the number of buds to be retained on a cane to be retained is acquired based on a user input, for example.

At step S280*b*, based on the measurement value(s) acquired in step S238, strength of the vigor of each cane determined as a cane to be retained in step S240 is judged. For example, when the thickness of the cane is thinner than a predetermined value or when the size of buds is smaller than a predetermined value, it is judged that the vigor is weaker than a predetermined range. When the thickness of the cane is thicker than a predetermined value or when the size of buds is larger than a predetermined value, it is judged that the vigor is stronger than a predetermined range. For example, when the thickness of the cane is within a predetermined range or when the size of buds is within a predetermined range, it is judged that the vigor is within the predetermined range.

At step S280*b*, if it is judged that the vigor is too strong, control proceeds to step S280*c*. At step S280*c*, the number of buds to be retained is determined so as to have a larger value than the setting value acquired in step S280*a*.

At step S280*b*, if it is judged that the vigor is too weak, control proceeds to step S280*e*. At step S280*e*, the number of buds to be retained is determined so as to have a smaller value than the setting value acquired in step S280*a*.

At step S280*b*, if it is judged that the vigor is within the predetermined range, control proceeds to step S280*d*. At step S280*d*, the number of buds to be retained is determined at the setting value acquired in step S280*a*.

If the vigor of the fruiting cane is weaker than the predetermined range, the fruit yield and quality may deteriorate. Therefore, the cut-point data is generated so that the number of buds to be retained is smaller than the setting value (e.g., a user-input value), such that a decrease in the fruit yield and quality can be reduced or prevented. If the vigor of the fruiting cane is stronger than the predetermined range, the cut-point data is generated so that the number of buds to be retained is greater than the setting value, such that a greater yield can be expected without allowing the quality to deteriorate. Thus, by generating cut-point data in accordance with the vigor of the fruit tree, a decrease in the fruit yield and quality can be reduced or prevented.

Based on the determination in step S240 and the determination in step S280, the processes of step S302 and step S304 are performed. The order of the processes of step S302 and step S304 may be arbitrary, and they may be performed concurrently (in parallel).

After step S302 and step S304, step S400 may be further included as in the example of FIG. 4B. In other words, the cut-point data generated in step S300 may be input to a controller configured or programmed to control a three-dimensional position of a cutter that cuts canes of the fruit tree (e.g., the cutting tool 24 in the cutting system 1 of FIG. 1). Thus, it is possible to use a cutter to perform cutting of canes of the fruit tree.

FIG. 21B is a flowchart showing an example procedure of generating cut-point data of canes of a fruit tree, according to an example embodiment of the present disclosure. The flowchart of FIG. 21B differs from the flowchart of FIG. 21A in that it further includes step S220 (grouping).

At step S220 in FIG. 21B, based on the sensor data acquired in step S100, the plurality of canes 58 of the fruit tree are grouped into a plurality of groups. The process of step S220 is performed similarly to the process of step S220 in FIG. 9A. The process in each step of FIG. 21B other than step S220 is performed similarly to the example of FIG. 21A. However, in the example of FIG. 21B, the process that is performed for one or more canes that are the subject of processing in the example of FIG. 21A is performed for one or more canes that were grouped into the same group among the plurality of groups in step S220.

The flowcharts of FIGS. 21A and 21B may be further modified in combination with the aforementioned flowcharts or processes. For example, acquiring information on priority levels of two or more attributes and determining each of the one or more canes as a cane to be removed or a cane to be retained based on the priority levels and the measurement values acquired in step S238 may be further performed. Such processes may be performed through similar processes to step S250 and step S252 in FIGS. 13A and 13B.

Figure 22A:
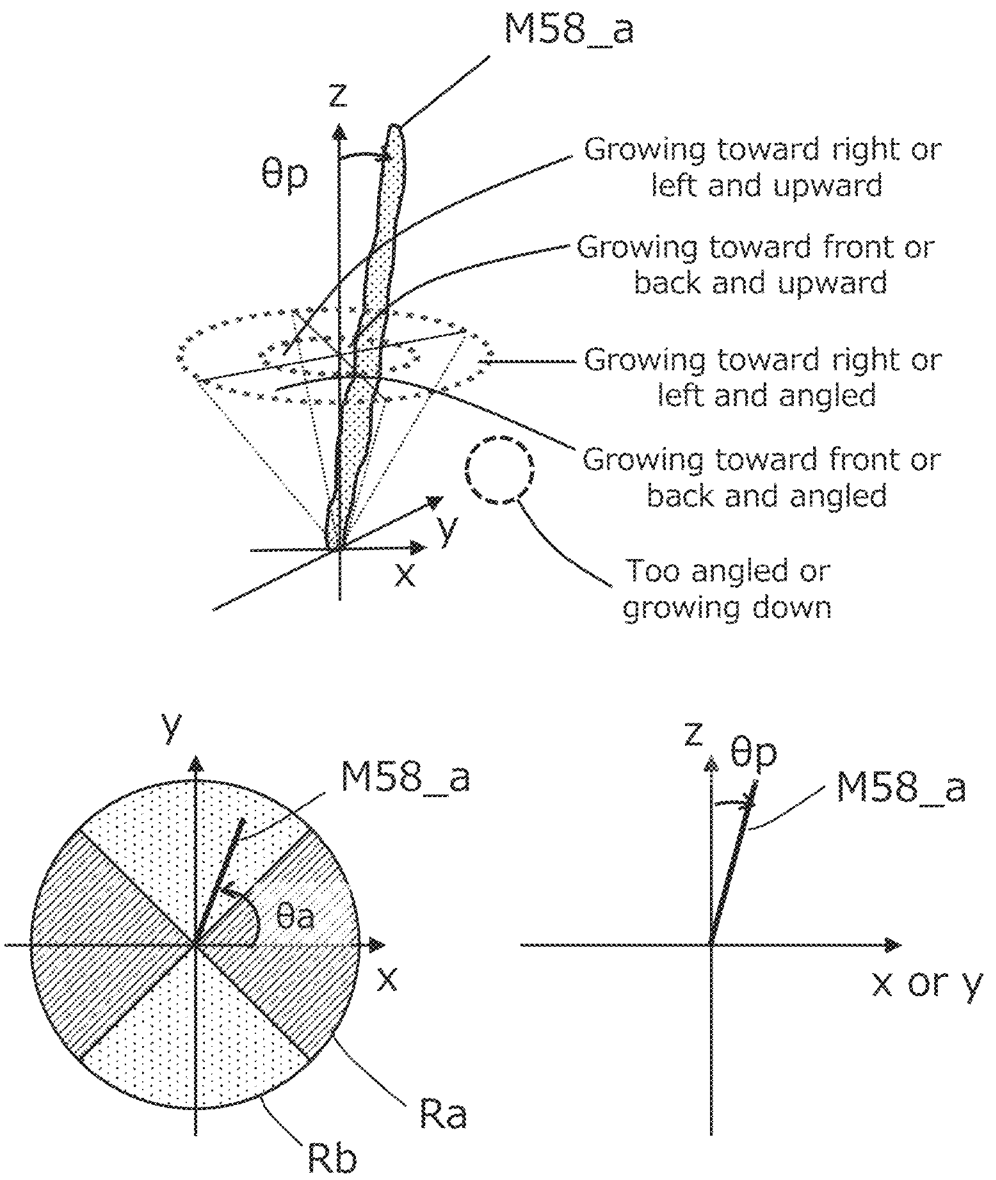
FIG. 22A is a schematic diagram for describing the acquisition of a measurement value or an image that is used for acquiring a measurement value concerning a direction in which a cane extends.

With reference to FIGS. 22A to 22N, specific examples of evaluation criteria for each attribute illustrated above will be described. FIGS. 22A, 22C, 22E, 22G, 22I, 22K, and 22M each show a schematic diagram for describing the acquisition of a measurement value or an image that is used for acquiring a measurement value concerning the respective attribute. FIGS. 22B, 22D, 22F, 22H, 22J, 22L, and 22N each show a table illustrating examples of a plurality of classes, an evaluation criterion for each of the plurality of classes, and a score corresponding to each of the plurality of classes, regarding the respective attribute. A factor score of each cane regarding each attribute may be determined based on these tables. For example, based on these tables, by the method described with reference to FIG. 16B, a factor score of each cane regarding each attribute can be calculated.

For each of the one or more canes that are the subject of processing, a measurement value concerning the color of the cane is acquired by using a segmented image as shown in FIG. 10A, for example. Based on the measurement value concerning the color of the cane, a factor score regarding the color of the cane may be determined. The factor score regarding the color of the cane is determined so as to be higher as the color of the cane is closer to brown, for example. If the outer color of the cane is brown, the cane is dry and therefore suitable for pruning. On the other hand, for example, a green cane is often not ready for pruning and therefore not suitable for pruning. For example, if the factor score regarding the color of the cane is lower than a predetermined value, it may be detected as an unpromising cane that is not suited for selection as a cane to be retained. If the factor score regarding the color of the cane is lower than the predetermined value, the user may be notified that an unpromising cane exists.

Figures 22C, 22D:
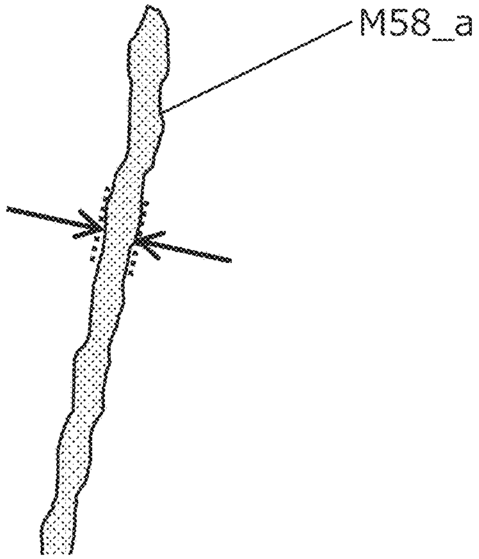
FIG. 22C is a schematic diagram for describing the acquisition of a measurement value or an image that is used for acquiring a measurement value concerning a thickness of a cane.
FIG. 22D is a diagram showing a table illustrating examples of a plurality of classes, an evaluation criterion for each of the plurality of classes, and a score corresponding to each of the plurality of classes, regarding a thickness of a cane.
Figures 22G, 22H:
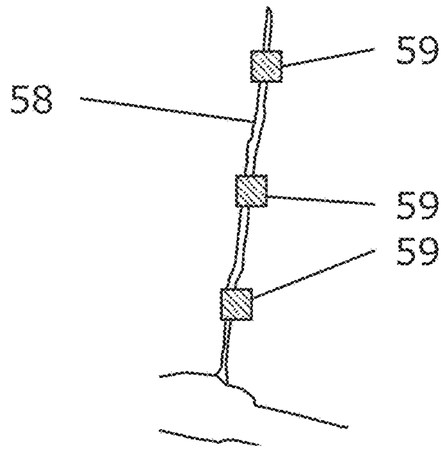
FIG. 22G is a schematic diagram for describing the acquisition of a measurement value or an image that is used for acquiring a measurement value concerning a size of buds on a cane.
FIG. 22H is a diagram showing a table illustrating examples of a plurality of classes, an evaluation criterion for each of the plurality of classes, and a score corresponding to each of the plurality of classes, regarding a size of buds on a cane.
Figures 22I, 22J:
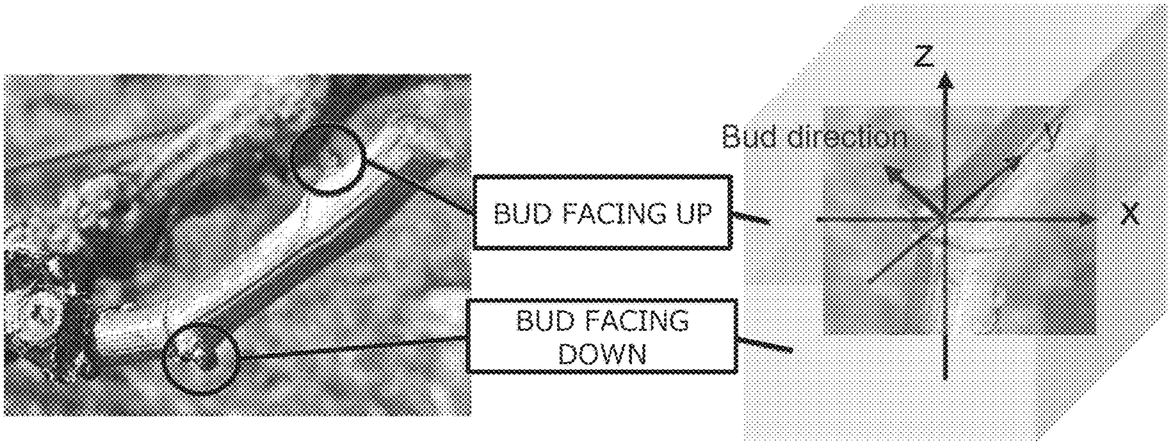
FIG. 22I is a schematic diagram for describing the acquisition of a measurement value or an image that is used for acquiring a measurement value concerning a direction in which buds on a cane are facing.
FIG. 22J is a diagram showing a table illustrating examples of a plurality of classes, an evaluation criterion for each of the plurality of classes, and a score corresponding to each of the plurality of classes, regarding a direction in which buds on a cane are facing.
Figures 22K, 22L:
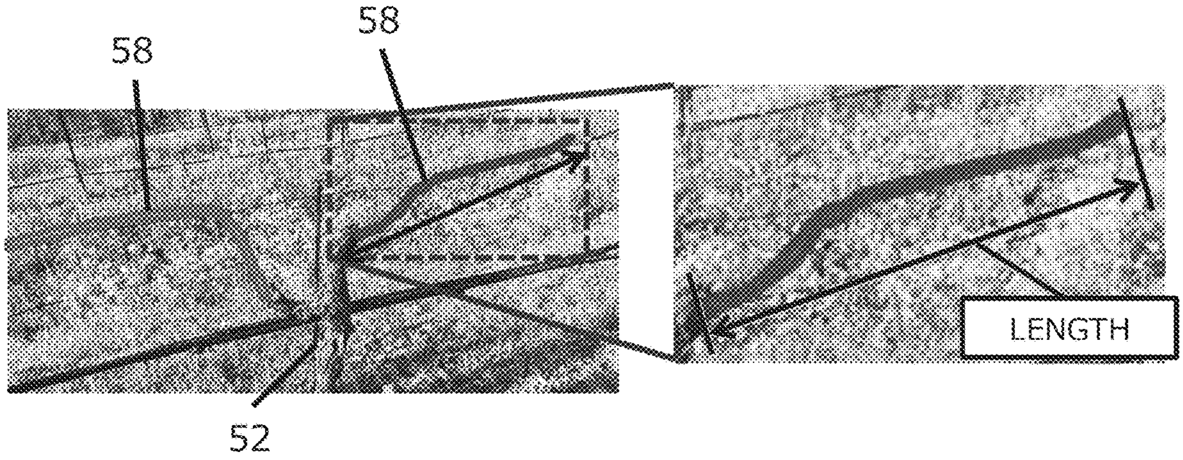
FIG. 22K is a schematic diagram for describing the acquisition of a measurement value or an image that is used for acquiring a measurement value concerning a length of a cane.
FIG. 22L is a diagram showing a table illustrating examples of a plurality of classes, an evaluation criterion for each of the plurality of classes, and a score corresponding to each of the plurality of classes, regarding a length of a cane.
Figure 22O:
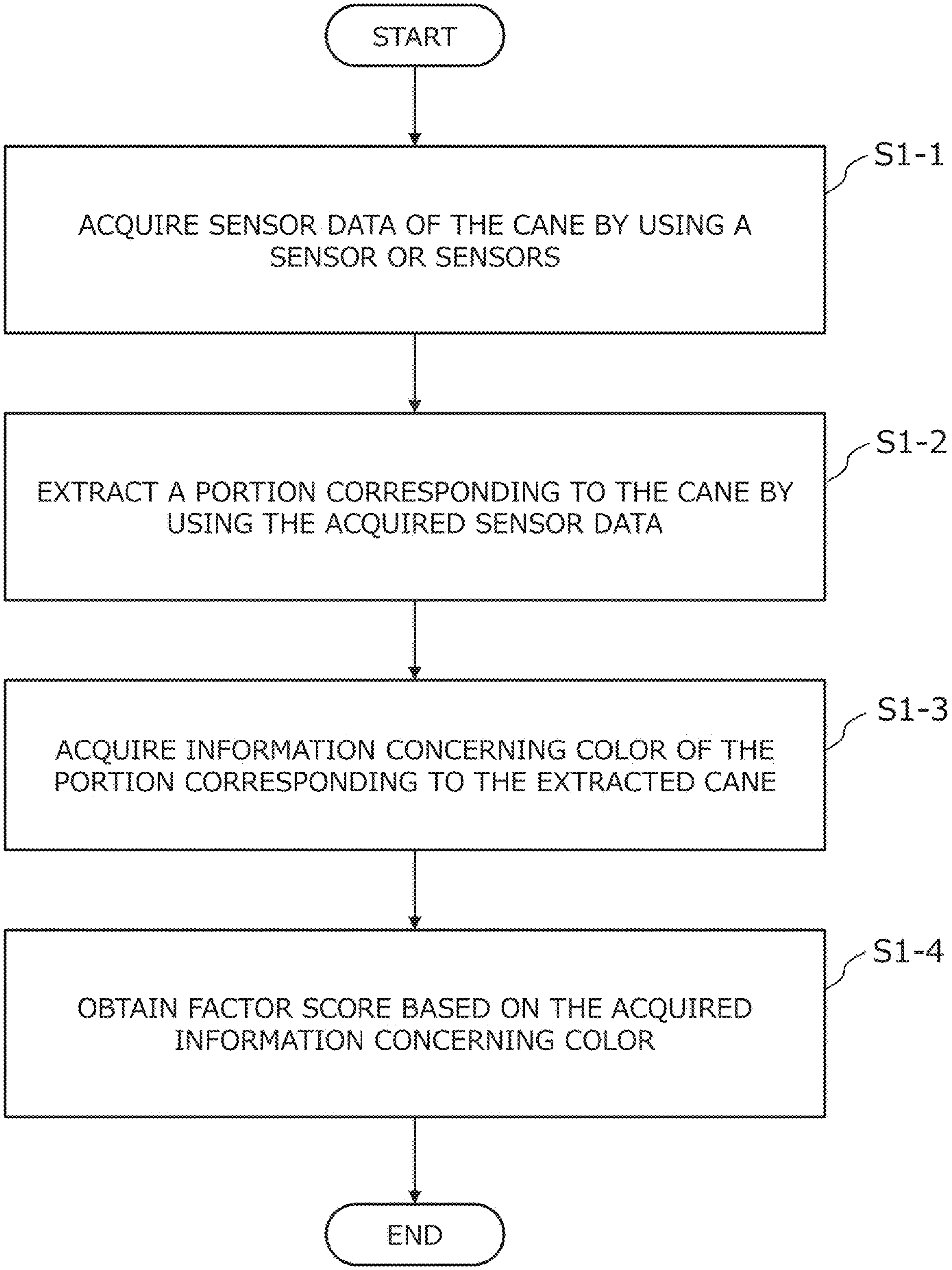
FIG. 22O is a flowchart showing an example procedure of determining a factor score regarding a color of a cane.

For each of the one or more canes that are the subject of processing, the factor score regarding the color of the cane is determined through the processes of the following steps as shown in FIG. 22O, for example. FIG. 22O is a flowchart showing an example procedure of determining the factor score regarding the color of the cane.

step S1-1: By using a sensor or sensors (e.g., a camera(s)), sensor data of the cane (e.g., an image including the cane) is acquired.

step S1-2: By using the acquired sensor data, a portion corresponding to the cane is extracted. For example, the acquired image is subjected to a segmentation (e.g., instance segmentation) using AI.

step S1-3: Information concerning the color of the portion corresponding to the extracted cane (e.g., RGB values, HSL values, and their statistics) is acquired.

step S1-4: A factor score is obtained based on the acquired information concerning color. For example, a table representing a relationship between information concerning color and factor scores may be stored in a storage device, and a factor score may be obtained by referring to the table.

For each of the one or more canes that are the subject of processing, a measurement value concerning the direction in which the cane extends is acquired by using a segmented image as shown in FIG. 10A, for example. FIG. 22A is a segmented image including a portion of a fruit tree (cane). For each cane, an angle of tilt θp of that cane with respect to an opposite direction of the direction of gravity (the +z direction in the figure) and an azimuth angle θa of that cane in a horizontal plane that is orthogonal to the direction of gravity (the xy plane in the figure) are calculated. The calculation of the angle of tilt θp and the azimuth angle θa is preferably performed by using a portion that is close to the base of the cane (i.e., a portion of the cane that is close to the spur). Based on the angle of tilt θp and the azimuth angle θa, a factor score regarding the direction in which the cane extends can be determined. When the shape of the trellis system of the fruit tree is VSP (vertical shoot position), the angle of tilt θp is preferably small. As for the azimuth angle θa, a tilt along the right-left direction (the ±x direction in the figure) may in some cases be more preferable than a tilt along the front-rear direction (the ±y direction in the figure). For example, a cane that is going to be cut may be located ahead (in the +y direction in the figure) of a cutter that cuts canes of the fruit tree. If the xy plane were a clock face, with the +x direction being the 3 o'clock direction and the +y direction being the 0 o'clock direction, and if one were to express the azimuth angle θa by defining the 3 o'clock direction as 0° and the counterclockwise direction as positive, it would be more preferable for the azimuth angle θa to be in a first range Ra including 0° and 180° (e.g., 0° to 45°, 135° to 225°, and 315° to 360°) than in a second range Rb including 90° and 270° (e.g., 45° to 135°, and 2255° to 315°).

Figure 22P:
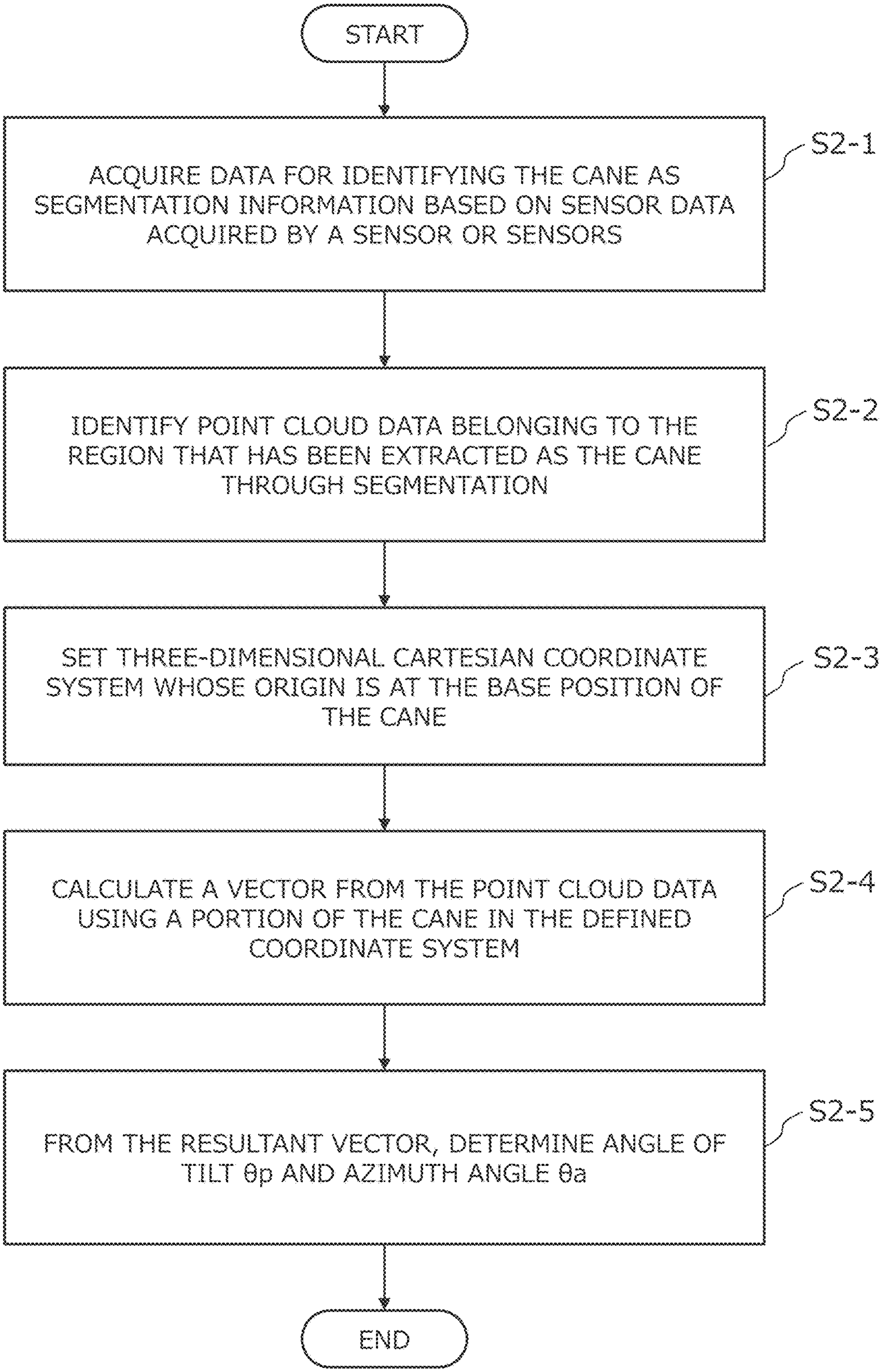
FIG. 22P is a flowchart showing an example procedure of calculating an angle of tilt θp and an azimuth angle θa of each cane.

The angle of tilt θp and the azimuth angle θa of each cane are calculated through the processes of the following steps as shown in FIG. 22P, for example. FIG. 22P is a flowchart showing an example procedure of calculating the angle of tilt θp and the azimuth angle θa of each cane.

step S2-1: With a sensor or sensors, sensor data including information indicating a three-dimensional structure of a cane is acquired, and the sensor data is subjected to segmentation in order to acquire data for identifying the cane as segmentation information. Acquisition of the sensor data may be achieved by acquiring point cloud data of the cane with a LiDAR sensor, or acquiring an image of the cane with an imager (camera), for example. Acquisition of the segmentation information may be achieved by acquiring information obtained through segmentation of two-dimensional image data, or acquiring information obtained through segmentation of point cloud data. In a case where a two-dimensional image is used in addition to point cloud data, a step of matching the coordinate system of the two-dimensional image and the coordinate system of the point cloud data is further performed.

step S2-2: Point cloud data belonging to the region that has been extracted as the cane through segmentation is identified.

step S2-3: A three-dimensional Cartesian coordinate system is set whose origin is at the base position of the cane. It is assumed that the +z axis direction is in the opposite direction (i.e., vertically upward) of the direction of gravity. In the case of spur pruning, for example, a boundary (connection point) between a cane and a spur or a cordon is identified by using segmentation information, and the connection point between the cane and the spur or cordon is defined as the base position of the cane. In the case of cane pruning, a boundary (connection point) between a cane and a head is identified by using segmentation information, and the connection point between the cane and the head is defined as the base position of the cane.

step S2-4: In the coordinate system defined at step S2-3, a portion in a range of, e.g., about 50 cm to about 60 cm from the base of the cane is used to calculate a vector from the point cloud data. Although the vector can be calculated by using the entire cane, it is preferable to use a range near the base of the cane. For example, by using singular value decomposition (SVD), the structure of a local portion (range near the base) of the cane may be extracted from point cloud data, and this portion may be used in calculating the vector.

step S2-5: From the resultant vector, the angle of tilt Op and the azimuth angle θa are determined.

FIG. 22B shows Table Tb1 and Table Tb2, as examples of a plurality of classes concerning the direction in which the cane extends, scores corresponding to the respective classes, and evaluation criteria for the respective classes. In a case where the shape of the trellis system of the fruit tree is VSP, for example, the factor score regarding the direction in which the cane extends is determined so that the factor score is higher as the angle of tilt θp is smaller. For example, in a case where the shape of the trellis system of the fruit tree is VSP, the factor score may be determined so as to be in descending order of if the angle of tilt θp is smaller than a predetermined range, if the angle of tilt θp is within the predetermined range, and if the angle of tilt θp is larger than the predetermined range. Alternatively, in a case where the shape of the trellis system of the fruit tree is VSP, the factor score may be determined so as to be in descending order of, if the angle of tilt θp is smaller than a predetermined range and the azimuth angle θa is within the first range Ra including 0° and 180°, if the angle of tilt θp is smaller than the predetermined range and the azimuth angle θa is within the second range Rb including 90° and 270°, if the angle of tilt Op is within the predetermined range and the azimuth angle θa is within the first range Ra including 0° and 180°, if the angle of tilt θp is within the predetermined range and the azimuth angle θa is within the second range Rb including 90° and 270°, and if the angle of tilt θp is larger than the predetermined range.

Note that, for example, the trunk of the fruit tree may be tilted with respect to an opposite direction of the direction of gravity (the +z direction in the figure). Even in such a case, the factor score regarding the direction in which the cane extends may be determined based on the angle of tilt θp of that cane with respect to an opposite direction of the direction of gravity and the azimuth angle θa of that cane in a horizontal plane that is orthogonal to the direction of gravity.

In cases where the shape of the trellis system of the fruit tree is not VSP, the factor score regarding the direction in which the cane extends can be determined based on evaluation criteria that are different from the exemplified evaluation criteria.

For each of the one or more canes that are the subject of processing, a measurement value concerning the thickness of the cane is acquired by using a segmented image as shown in FIG. 10A, for example. FIG. 22C is an image showing enlarged a portion of a segmented image, including a cane mask M58_*a*. By using such a cane mask included in a segmented image, for example, a measurement value of the thickness of each cane is acquired. The measurement value concerning the thickness of the cane is obtained by calculating, for every predetermined distance from the base of the cane, a length along a direction that is orthogonal to the direction in which the cane extends, and calculating a mean value, for example. The calculation of a length along a direction that is orthogonal to the direction in which the cane extends may be performed by using a portion of the cane other than the portion having buds, i.e., by using a portion of the cane not having any buds.

Based on the measurement value concerning the thickness of the cane, a factor score regarding the thickness of the cane can be determined. FIG. 22D shows examples of a plurality of classes concerning the thickness of the cane, scores corresponding to the respective classes, and example evaluation criteria for the respective classes. The factor score regarding the thickness of the cane is determined so as to be in descending order of: if the thickness of the cane (e.g., the aforementioned mean value) is within a predetermined range. If the thickness of the cane (e.g., the aforementioned mean value) is larger than the predetermined range; and if the thickness of the cane (e.g., the aforementioned mean value) is smaller than the predetermined range, for example.

For each of the one or more canes that are the subject of processing, a measurement value concerning the height of the base of the cane is acquired by using a segmented image as shown in FIG. 10A, for example. FIG. 22E is an image showing enlarged a portion of a segmented image, including a cane mask M58_*a*, a spur mask M56_*a* to extract a spur from which a cane corresponding to the cane mask M58_*a* is growing, and a cordon mask M54_*a*. When the pruning method for the fruit tree is spur pruning, a measurement value of the height of the base position of the cane from the cordon is acquired by using such a segmented image, for example. For instance, a distance Lt between a position P1 of the base (i.e., a site of contact with the spur mask M56_*a*) of the cane mask M58_*a* and a center line Lt of the cordon mask M54_*a* is calculated. At this time, similarly to the case of performing a grouping process as has been described with reference to FIG. 10A, each cane 58 may be associated with its corresponding spur 56, based on the segmented image. When the pruning method for the fruit tree is cane pruning, a measurement value of the height of the base position of the cane from the head is acquired by using a segmented image, for example.

Based on the measurement value concerning the height of the base of the cane, a factor score regarding of the height of the base of the cane can be determined. FIG. 22F shows examples of a plurality of classes concerning the height of the base of the cane, scores corresponding to the respective classes, and example evaluation criteria for the respective classes. When the shape of the trellis system of the fruit tree is VSP (vertical shoot position) and the pruning method for the fruit tree is spur pruning or cane pruning, for example, the factor score regarding the height of the base of the cane is determined so as to be in descending order of, if the height of the base of the cane is within a predetermined range, the height of the base of the cane is lower than the predetermined range, and if the height of the base of the cane is higher than the predetermined range. The reason is that, when the shape of the trellis system of the fruit tree is VSP, it is preferable to bear fruits within a predetermined range from the cordon or head (e.g., in a region of about 10 cm from the cordon). As described above, in the case of spur pruning, the height of the base of the cane is evaluated in terms of height of the base position of the cane from the cordon. In the case of cane pruning, it is evaluated in terms of height of the base position of the cane from the head. In cases where the shape of the trellis system of the fruit tree is not VSP, the factor score regarding the height of the base of the cane can be determined based on evaluation criteria that are different from the exemplified evaluation criteria.

For each of the one or more canes that are the subject of processing, a measurement value concerning the size of buds on the cane is acquired by using a segmented image as shown in FIG. 10A, for example. The size of buds on the cane measurement value concerning is obtained by calculating a mean value of sizes of a predetermined number of buds among the buds on that cane, for example. The predetermined number may be a setting value for the number of buds to be retained on a cane to be retained, for example. Before acquiring a measurement value concerning the size of buds on the cane, information on a setting value for the number of buds to be retained on a cane to be retained is acquired based on a user input, for example. FIG. 22G shows an image depicting a portion of a fruit tree (cane). From the closest bud to the base of the cane (i.e., the closest bud to spur or cordon), sizes of a predetermined number (e.g., two) of buds are determined and their mean value is calculated. The measurement value of a size of a bud is obtained by calculating an area of a region of the bud mask to extract the bud in the segmented image, for example.

Based on the measurement value concerning the size of buds on the cane, a factor score regarding the size of buds on the cane can be determined. FIG. 22H shows examples of a plurality of classes concerning the size of buds on the cane, scores corresponding to the respective classes, and example evaluation criteria for the respective classes. The factor score regarding the size of buds on the cane is determined so as to be in descending order of, if the size of buds on the cane (e.g., the aforementioned mean value) is within a predetermined range, if the size of buds on the cane (e.g., the aforementioned mean value) is larger than the predetermined range, and if the size of buds on the cane (e.g., the aforementioned mean value) is smaller than the predetermined range, for example.

For each of the one or more canes that are the subject of processing, a measurement value concerning the direction in which buds on the cane are facing is acquired by using a segmented image as shown in FIG. 10A, for example. The measurement value concerning the direction in which buds on the cane are facing is obtained by, among buds on that cane, calculating a mean value of the directions in which a predetermined number of buds are facing, for example. The predetermined number may be a setting value for the number of buds to be retained on a cane to be retained, for example. Before acquiring a measurement value concerning the size of buds on the cane, information on a setting value for the number of buds to be retained on a cane to be retained is acquired based on a user input, for example. FIG. 22I shows an image depicting a portion of a fruit tree (cane). From the closest bud to the base of the cane, directions in which a predetermined number (e.g., two) of buds are facing are determined and their mean value is calculated. As the measurement value of a direction in which a bud is facing, an angle of tilt of the bud with respect to a direction (the ±z direction in the figure) that is orthogonal to the horizontal plane (the xy plane in the figure) is determined, for example. As an example variation, among all buds on the cane, a ratio of the number of buds whose angles of tilt are in directions of values equal to or greater than a predetermined value regarding the z direction may be defined as the measurement value.

Based on the measurement value concerning the direction in which buds on the cane are facing, a factor score regarding the direction in which buds on the cane are facing can be determined. FIG. 22J shows examples of a plurality of classes concerning the direction in which buds on the cane are facing, scores corresponding to the respective classes, and example evaluation criteria for the respective classes. When the shape of the trellis system of the fruit tree is VSP (vertical shoot position), for example, the factor score regarding the direction in which buds on the cane are facing is determined so as to be in descending order of: if the direction in which buds on the cane are facing (e.g., the aforementioned mean value) is upward from the horizontal plane; and if the direction in which buds on the cane are facing (e.g., the aforementioned mean value) is downward from the horizontal plane. Note that the pruning method for the fruit tree may be either one of spur pruning or cane pruning. The reason is that VSP is configured so that shoots (or canes) extend upward along the vertical direction from the buds. In cases where the shape of the trellis system of the fruit tree is not VSP, the factor score regarding the direction in which buds on the cane are facing can be determined based on evaluation criteria that are different from the exemplified evaluation criteria.

Figure 22Q:
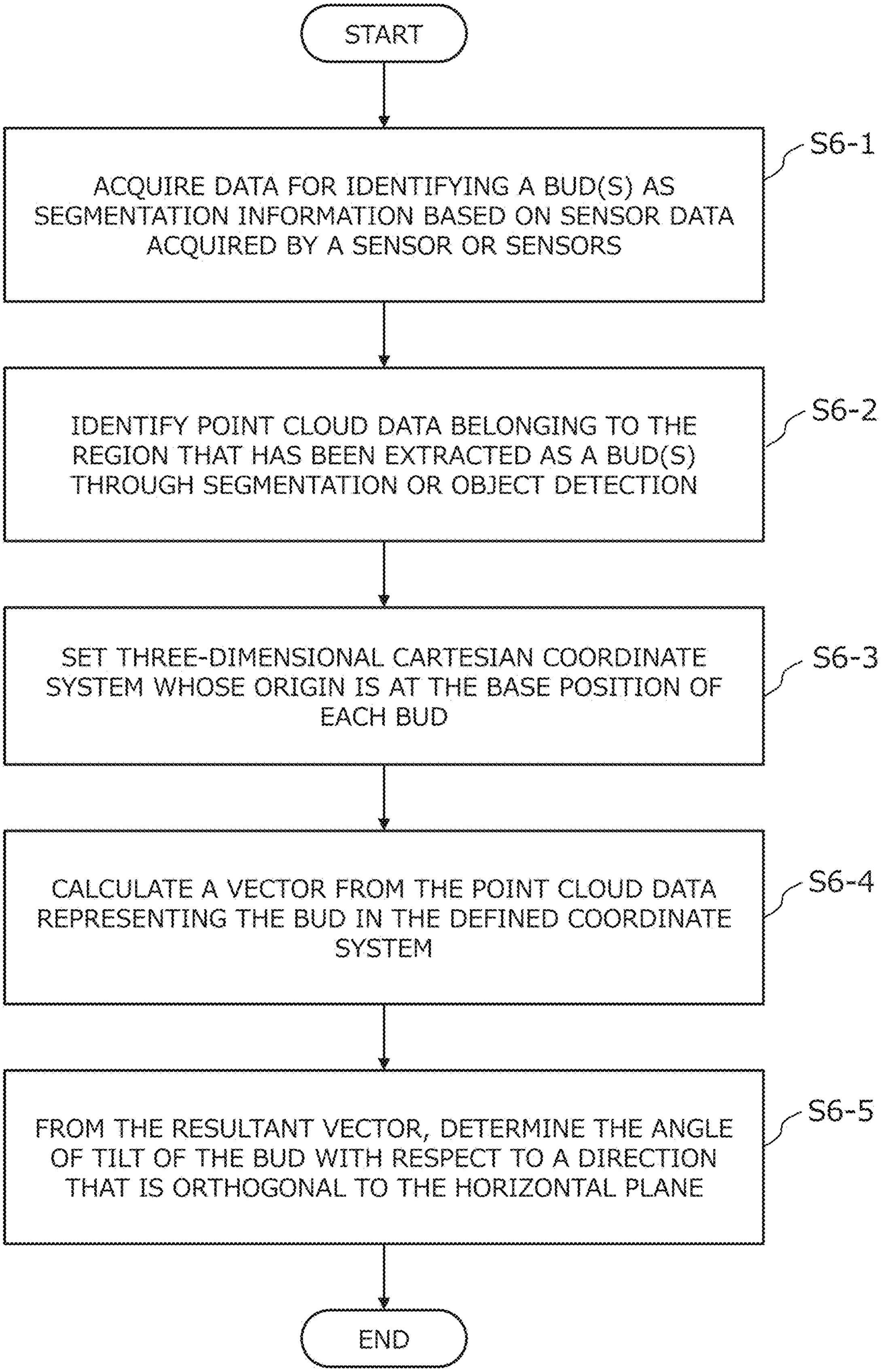
FIG. 22Q is a flowchart showing an example procedure of calculating an angle of tilt of a bud with respect to a direction that is orthogonal to the horizontal plane.

The angle of tilt of a bud with respect to a direction (the ±z direction in the figure) that is orthogonal to the horizontal plane (the xy plane in the figure) is calculated through the processes of the following steps as shown in FIG. 22Q, for example. FIG. 22Q is a flowchart showing an example procedure of calculating the angle of tilt of a bud with respect to a direction that is orthogonal to the horizontal plane.

step S6-1: With a sensor or sensors, sensor data including information indicating a three-dimensional structure of the cane is acquired, and the sensor data is subjected to segmentation or object detection in order to acquire data for identifying a bud(s) as segmentation information. Acquisition of the sensor data may be achieved by acquiring point cloud data of the cane with a LiDAR sensor, for example. An image of the cane may be further acquired with an imager (camera). Acquisition of the segmentation information may be achieved by acquiring information obtained through segmentation of two-dimensional image data, or acquiring information obtained through segmentation of point cloud data. In a case where a two-dimensional image is used in addition to point cloud data, a step of matching the coordinate system of the two-dimensional image and the coordinate system of the point cloud data is further performed.

step S6-2: Point cloud data belonging to the region that has been classified as a bud(s) through segmentation or object detection is identified.

step S6-3: A three-dimensional Cartesian coordinate system is set whose origin is at the base position of each bud. It is assumed that the +z axis direction is in the opposite direction (i.e., vertically upward) of the direction of gravity. By identifying a boundary (connection point) between the bud and the cane by using segmentation information, the connection point between the bud and the cane is defined as the base position of the bud.

step S6-4: In the coordinate system defined at step S6-3, a vector is calculated from the point cloud data representing the bud.

step S6-5: From the resultant vector, the angle of tilt of the bud with respect to a direction that is orthogonal to the horizontal plane is determined.

For each of the one or more canes that are the subject of processing, a measurement value concerning the length of the cane is acquired by using a segmented image as shown in FIG. 10A, for example. FIG. 22K shows an image depicting a portion of a fruit tree (cane). The length of the cane is defined as the length from the base of the cane (e.g., a boundary (connection point) between a cane and a spur or cordon in the case of spur pruning; and a boundary (connection point) between a cane and a head in the case of cane pruning, for example) to the final end (the farthest end from the base) of the cane. When the final end of the cane is not included in the image (i.e., being outside the angle of view), the farthest point from the base of the cane within the image is defined as the final end of the cane. As for the length of the cane, without being limited to a straight-line distance between two points, the length of a curve along the length direction of the cane can also be used.

Based on the measurement value concerning the length of the cane, a factor score regarding of the length of the cane can be determined. FIG. 22L shows examples of a plurality of classes concerning the length of the cane, scores corresponding to the respective classes, and example evaluation criteria for the respective classes. In the case of cane pruning, for example, the factor score regarding the length of the cane is determined so as to be in descending order of, if the length of the cane is within a predetermined range, if the length of the cane is longer than the predetermined range, and if the length of the cane is shorter than the predetermined range. As a threshold, for example, a half distance of the distance between the trunks of fruit trees can be used. As used in the evaluation criteria in FIG. 22L, the "predetermined range" includes a half distance of the distance between the trunks of adjacent fruit trees. Information on the length of a distance between trunks of adjacent fruit trees may be acquired based on sensor data of two or more adjacent fruit trees (e.g., sensor data including information indicating a three-dimensional structure of the fruit trees), or acquired based on a user input.

In the case of cane pruning, basically cut-point data is not generated for canes to be retained. However, when the length of each cane determined as a cane to be retained is longer than a predetermined range (e.g., when classified as class "2" in the example of FIG. 22L), cut-point data for the cane to be retained may be generated so that it becomes equal to or shorter than the predetermined range.

In the case of spur pruning, the factor score regarding the length of the cane can be determined based on evaluation criteria that are different from the exemplified evaluation criteria.

For each of the one or more canes that are the subject of processing, a measurement value concerning the length between nodes of the cane is acquired by using a segmented image as shown in FIG. 10A, for example. FIG. 22M shows an image depicting a portion of a fruit tree (cane). As shown in FIG. 22M, it is obtained by, among buds on the cane, calculating a mean value of distances between adjacent buds. As described earlier, similarly to the example of FIG. 10A, buds on a cane may be extracted through instance segmentation, or buds may be detected through object detection. For example, by using the center points of the extracted or detected buds as reference coordinates of the buds, a distance between adjacent buds can be determined.

Based on the measurement value concerning the distance between adjacent buds, a factor score regarding the length between nodes of the cane can be determined. FIG. 22N shows examples of a plurality of classes concerning the length between nodes of the cane, scores corresponding to the respective classes, and example evaluation criteria for the respective classes. In the case of cane pruning, for example, the factor score regarding the length between nodes of the cane is determined so as to be in descending order of, if the distance between adjacent buds on that cane (e.g., the aforementioned mean value) is within a predetermined range, if the distance between adjacent buds on that cane (e.g., the aforementioned mean value) is longer than the predetermined range, and if the distance between adjacent buds on that cane (e.g., the aforementioned mean value) is shorter than the predetermined range. In the case of spur pruning, the factor score regarding the length between nodes of the cane can be determined based on evaluation criteria that are different from the exemplified evaluation criteria.

Figure 22R:
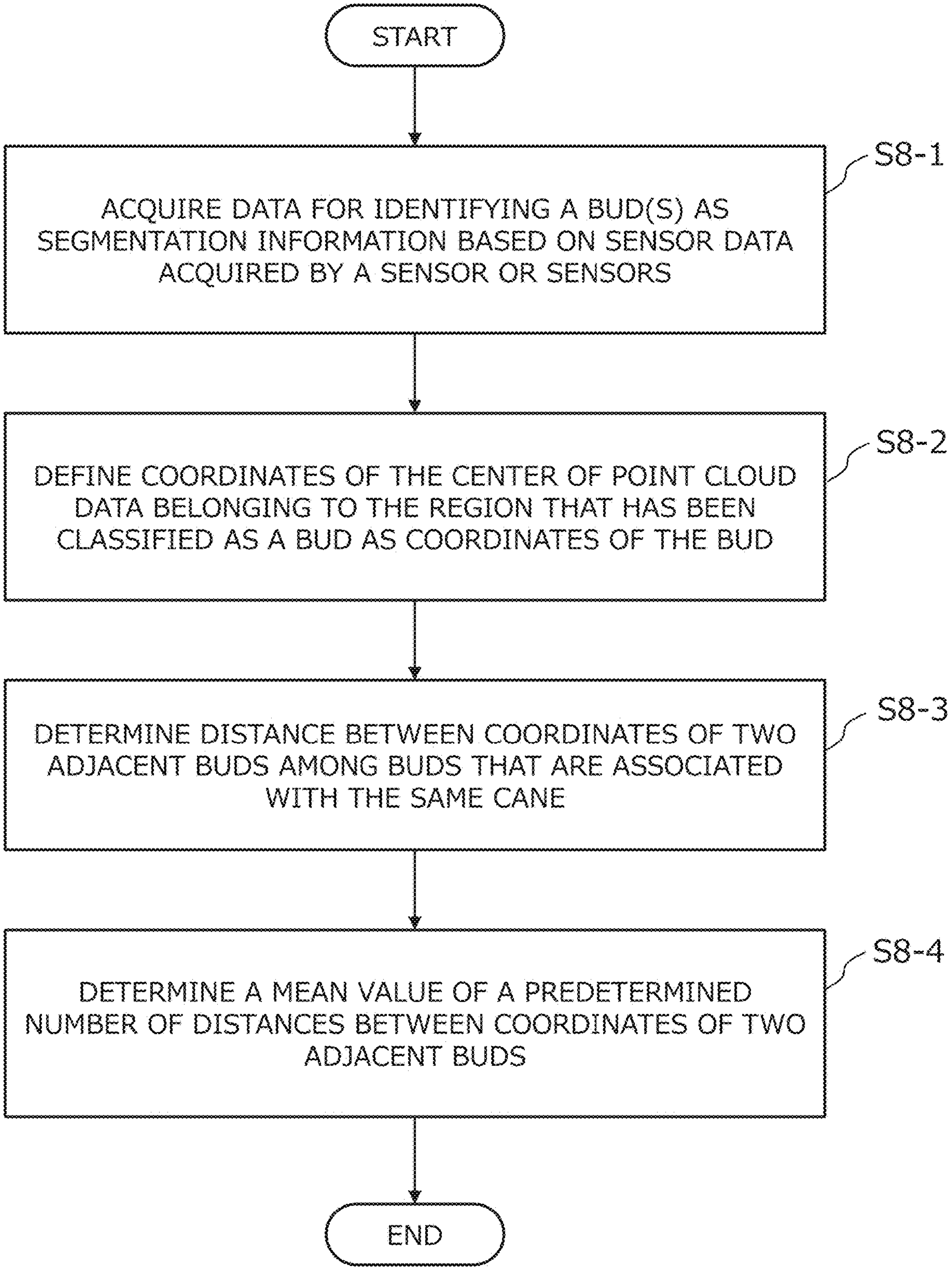
FIG. 22R is a flowchart showing an example procedure of determining a mean value of distances between coordinates of two adjacent buds.

For each of the one or more canes that are the subject of processing, the factor score regarding the length between nodes of the cane is determined through the processes of the following steps as shown in FIG. 22R, for example. FIG. 22R is a flowchart showing an example procedure of determining a mean value of distances between coordinates of two adjacent buds.

step S8-1: With a sensor or sensors, sensor data including information indicating a three-dimensional structure of the cane is acquired, and the sensor data is subjected to segmentation or object detection in order to acquire data for identifying a bud(s) as segmentation information. Acquisition of the sensor data may be achieved by acquiring point cloud data of the cane with a LiDAR sensor, for example. An image of the cane may be further acquired with an imager (camera). Acquisition of the segmentation information may be achieved by acquiring information obtained through segmentation of two-dimensional image data, or acquiring information obtained through segmentation of point cloud data. In a case where a two-dimensional image is used in addition to point cloud data, a step of matching the coordinate system of the two-dimensional image and the coordinate system of the point cloud data is further performed.

step S8-2: The coordinates of the center of point cloud data belonging to the region that has been classified as a bud through segmentation or object detection are defined as the coordinates of the bud.

step S8-3: Among buds that are associated with the same cane, a straight-line distance between the coordinates of two adjacent buds is determined. As an example variation, among buds associated with the same cane, rather than a straight-line distance between the coordinates of two adjacent buds, a curved distance (i.e., a distance along the direction in which the cane extends) may be determined and used.

step S8-4: A mean value of a predetermined number of distances between the coordinates of two adjacent buds as obtained at step S8-3 is determined.

Figure 23:
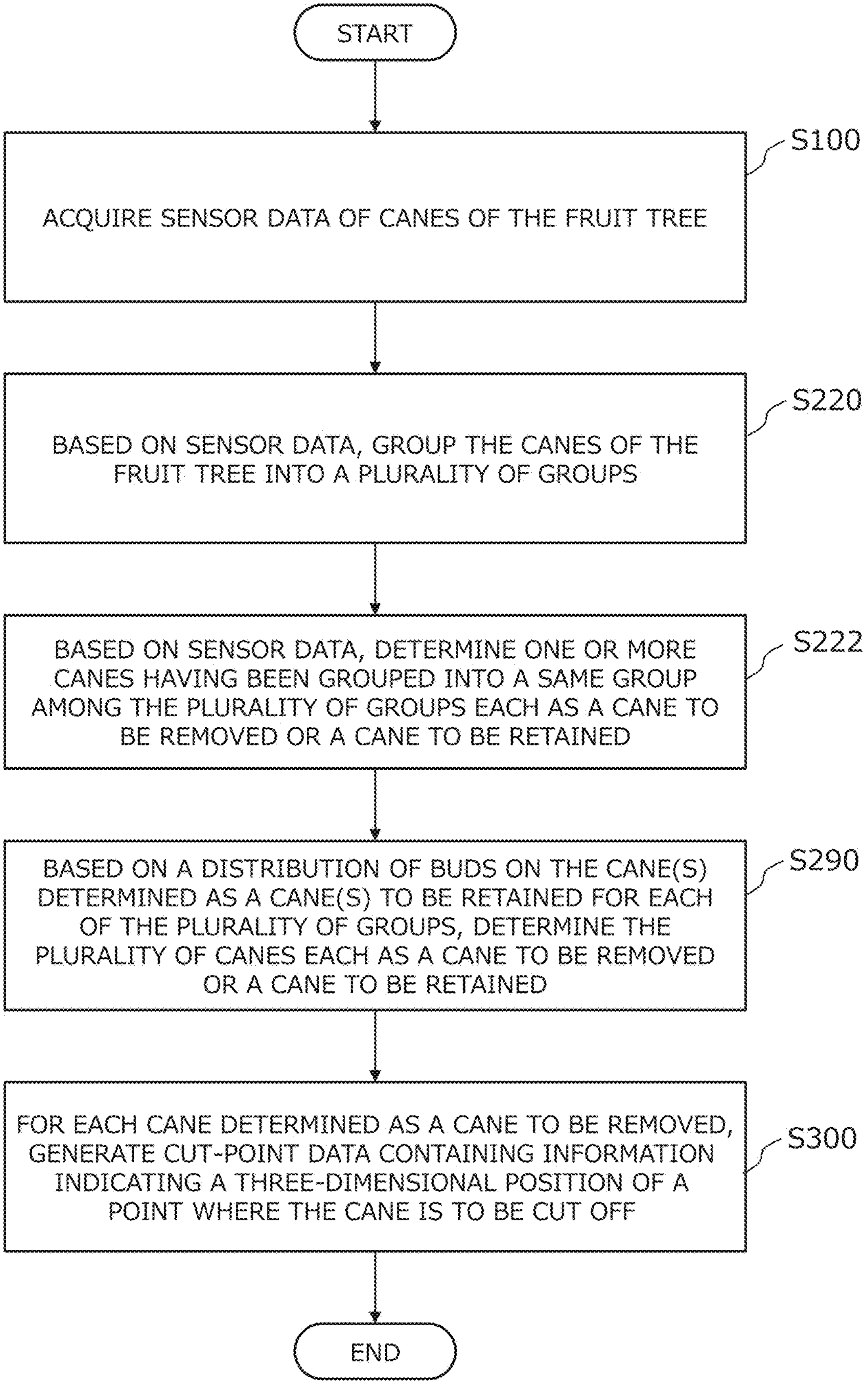
FIG. 23 is a flowchart showing an example procedure of generating cut-point data of canes of a fruit tree, according to an example embodiment of the present disclosure.

FIG. 23 is a flowchart showing an example procedure of generating cut-point data of canes of a fruit tree, according to an example embodiment of the present disclosure. The flowchart of FIG. 23 differs from the flowchart of FIG. 9A in that it further includes step S290. The example of FIG. 23 can be combined with any of the aforementioned flowcharts.

In the example of FIG. 23, the procedure of generating cut-point data of canes of a fruit tree includes acquiring sensor data of a plurality of canes of the fruit tree by a sensor or sensors (step S100), grouping the plurality of canes into a plurality of groups based on the sensor data (step S220), based on the sensor data, determining one or more canes having been grouped into a same group among the plurality of groups each as a cane to be removed or a cane to be retained (step S222), based on a distribution of buds on the cane(s) determined as a cane(s) to be retained for each of the plurality of groups, determining each of the plurality of canes as a cane to be removed or a cane to be retained (step S290), and, for each cane determined as a cane to be removed, generating cut-point data including information indicating a three-dimensional position of a point where the cane is to be cut off (step S300).

In the example of FIG. 23, after the determination as to a cane to be removed or a cane to be retained is made for each group, based on the distribution of buds on the cane(s) determined as a cane(s) to be retained (i.e., the distribution of buds on the entire fruit tree), each of the plurality of canes of the fruit tree is again subjected to a determination as to a cane to be removed or a cane to be retained. After the determination as to a cane to be removed or a cane to be retained is made for each group, a modification can be made so that the distribution of buds on the entire fruit tree becomes more uniform. Therefore, further improvements in the fruit yield and quality can be attained. Note that the example of FIG. 23 is applicable in the case of spur pruning.

Figure 24:
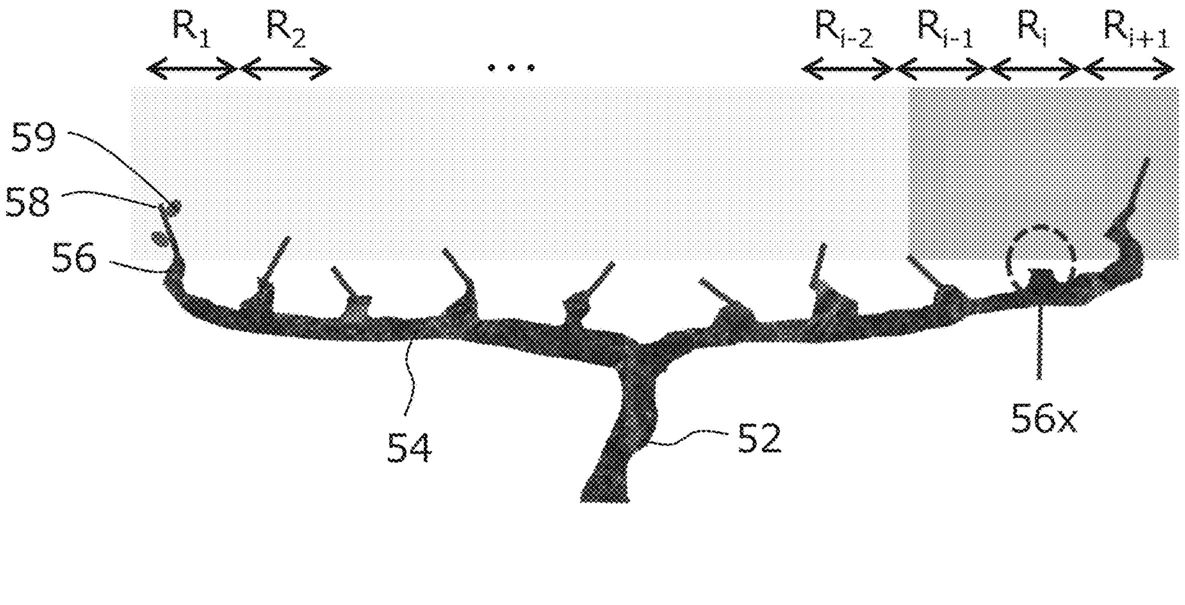
FIG. 24 is a schematic diagram for describing the processes in the flowchart of FIG. 23.

With reference also to FIG. 24, processes to be performed in the flowchart of FIG. 23 will be described. FIG. 24 is a schematic diagram for describing the processes in the flowchart of FIG. 23. FIG. 24 is a state of an imaginary fruit tree when pruning has been performed based on the determination in step S220. For simplicity, buds 59 are only illustrated for less than all canes 58.

The process of step S100 is performed similarly to the process in the example of FIG. 4A.

At step S220, based on the sensor data acquired in step S100, the plurality of canes 58 of the fruit tree are grouped into a plurality of groups. The process of step S220 is performed similarly to the process in the example of FIG. 9A.

Grouping of the plurality of canes 58 may be performed based on the respective base positions of the plurality of canes 58. For example, the plurality of groups respectively correspond to plurality of spurs 56 of the cordon 54 supporting the plurality of canes 58 of the fruit tree. Among the plurality of canes 58 of the fruit tree, any canes 58 growing from the same spur 56 may be grouped into the same group. Among the plurality of canes 58 of the fruit tree, any canes 58 growing from within a region spanning a predetermined range may be grouped into the same group. Alternatively, the plurality of groups may correspond to a plurality of regions R1, R2, etc., of the cordon 54 supporting the plurality of canes 58 of the fruit tree, these regions being arranged along the direction in which the cordon 54 extends (the right-left direction in the figure). Among the plurality of canes 58 of the fruit tree, any canes growing from the same region among the plurality of regions may be grouped into the same group.

At step S222, based on the sensor data acquired in step S100, each of the one or more canes 58 that were grouped into the same group in step S220 is determined as a cane to be removed or a cane to be retained. The process of step S222 is performed similarly to the process in the example of FIG. 9A. The process of step S222 is performed for each group. In other words, at step S222, for each group, each of the one or more canes grouped into that group is determined as a cane to be removed or a cane to be retained.

At step S290, based on the distribution of buds on the cane(s) determined as a cane(s) to be retained at step S222 with respect to each of the plurality of groups, each of the plurality of canes of the fruit tree is again subjected to a determination as to a cane to be removed or a cane to be retained. The distribution of buds is the distribution of buds on the entire fruit tree, and is, for example, a density of placement of buds along a direction that is in line with the direction in which the cordon 54 supporting the cane 58 extends (the right-left direction in FIG. 24). Information on the distribution of buds on the cane(s) determined as a cane(s) to be retained at step S222 may be acquired based on information on the cane(s) determined as a cane(s) to be retained at step S222 and on information on the number of buds to be retained on each cane to be retained. Information on the number of buds to be retained on each cane to be retained may be acquired based on a user input, for example.

The canes to be determined as canes to be retained at step S290 may include canes which were determined as canes to be removed in step S222. In other words, in addition to the cane(s) determined as a cane(s) to be retained in step S222, more canes to be retained may be determined at step S290. By changing (redetermining) a cane(s) that was determined as a cane(s) to be removed in step S222 into a cane(s) to be retained at step S290, the density of placement of buds on the canes to be retained can be made more uniform across the entire fruit tree.

An example of the process of step S290 will be described. Specifically, in addition to the cane(s) determined as a cane(s) to be retained in step S222, more canes to be retained may be determined in the following manner. For example, if a region exists in which the density of placement of the buds is locally low, among the plurality of canes of the fruit tree, more canes to be retained are determined from among one or more canes having been grouped into a group that is located near that region. For example, if the plurality of groups include a first group into which no canes have been grouped, more canes to be retained are determined from among one or more canes that have been grouped into a group that is adjacent to the first group. Regarding one or more canes having been grouped into the group that is adjacent to the first group, more canes to be retained may be determined from among canes extending toward the first group. The first group may be, for example, a group corresponding to spurs from which no canes have grown. If the plurality of groups include a second group which include no canes to be retained, more canes to be retained are determined from among one or more canes that have been grouped into a group that is adjacent to the second group. Regarding one or more canes having been grouped into the group that is adjacent to the second group, more canes to be retained may be determined from among canes extending toward the second group. The second group may be, for example, a group in which all of the one or more canes being grouped into that group have been determined as canes to be removed.

Information on the cultivation method of the fruit tree may be acquired, and at step S290, each of the plurality of canes of the fruit tree may be subjected to a determination as to a cane to be removed or a cane to be retained based on the information on the cultivation method of the fruit tree and on the distribution of buds on the cane(s) determined as a cane(s) to be retained in step S222.

Based on the determination in step S290, the process of step S300 is performed.

After step S300, step S400 may further be included as in the example of FIG. 4B. In other words, the cut-point data generated in step S300 may be input to a controller configured or programmed to control a three-dimensional position of a cutter that cuts canes of the fruit tree (e.g., the cutting tool 24 in the cutting system 1 of FIG. 1). Thus, it is possible to use a cutter to perform cutting of canes of the fruit tree.

The flowchart of FIG. 23 may be modified in combination with the above-described flowcharts or processes. For example, based on the sensor data acquired in step S100, for each of the one or more canes that are grouped into the same group, a process of acquiring a measurement value(s) concerning one or more attributes and a process of determining each of the one or more canes as a cane to be removed or a cane to be retained based on the measurement value(s) may further be performed. Such processes may be performed through similar processes to step S230 and step S240 in FIG. 9B.

The techniques utilized in example embodiments of the present disclosure are applicable to agricultural machines for use in smart agriculture.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A method for using a computer or computers to generate cut-point data including information indicating a three-dimensional position of a point on a cane of a fruit tree where the cane is to be cut off, the method comprising:

for each of one or more canes of the fruit tree, acquiring a measurement value(s) concerning one or more attributes, including an attribute concerning vigor of the fruit tree, based on sensor data of the one or more canes being acquired by a sensor or sensors;

determining the one or more canes each as a cane to be removed or a cane to be retained based on the measurement value(s);

based on the measurement value(s), determining a number of buds to be retained on each cane having been determined as a cane to be retained;

generating the cut-point data for each cane determined as a cane to be removed;

based on the number of buds to be retained, generating the cut-point data for each cane having been determined as a cane to be retained; and inputting the generated cut-point data to a controller configured or programmed to control a three-dimensional position of a cutter that cuts a cane of the fruit tree; wherein the one or more attributes include a thickness of the cane; and the determining the one or more canes each as a cane to be removed or a cane to be retained includes:

for each of the one or more canes, determining a factor score based on the thickness of the cane; and determining the one or more canes each as a cane to be removed or a cane to be retained based on the factor score.

2. The method of claim 1, wherein the factor score of each of the one or more canes regarding the thickness of the cane is determined to be:

if the thickness of the cane is larger than a predetermined range, lower than when the thickness of the cane is within the predetermined range; and if the thickness of the cane is smaller than the predetermined range, lower than when the thickness of the cane is larger than the predetermined range.

3. The method of claim 2, further comprising:

acquiring information on a setting value for the number of buds to be retained; wherein the determining the number of buds to be retained includes:

when the thickness of the cane determined as a cane to be retained is smaller than the predetermined range, determining the number of buds to be retained so as to have a smaller value than the setting value.

4. The method of claim 3, wherein the acquiring information on a setting value for the number of buds to be retained includes:

acquiring information on the setting value based on a user input.

5. The method of claim 1, further comprising:

grouping a plurality of canes of the fruit tree into a plurality of groups based on sensor data of the plurality of canes; wherein the acquisition of the measurement value(s), the determination as to a cane to be removed or a cane to be retained, the determination of the number of buds to be retained, and the generation of the cut-point data are performed for one or more canes that are grouped into a same group among the plurality of groups.

6. The method of claim 1, wherein the one or more attributes include two or more attributes;

the method further comprises acquiring information on priority levels of the two or more attributes; and determining the one or more canes each as a cane to be removed or a cane to be retained includes:

determining the one or more canes each as a cane to be removed or a cane to be retained based on the measurement values and the priority levels.

7. The method of claim 1, further comprising:

acquiring information on a number of buds to be retained on each cane having been determined as a cane to be retained;

based on the number of buds to be retained, generating the cut-point data for each cane to be retained.

8. The method of claim 7, wherein the generating the cut-point data for each cane having been determined as a cane to be retained includes:

generating the cut-point data so that each cane having been determined as a cane to be retained includes one or more buds after being cut.

9. A method for using a computer or computers to generate cut-point data including information indicating a three-dimensional position of a point on a cane of a fruit tree where the cane is to be cut off, the method comprising:

for each of one or more canes of the fruit tree, acquiring a measurement value(s) concerning one or more attributes, including an attribute concerning vigor of the fruit tree, based on sensor data of the one or more canes being acquired by a sensor or sensors;

determining the one or more canes each as a cane to be removed or a cane to be retained based on the measurement value(s);

based on the measurement value(s), determining a number of buds to be retained on each cane having been determined as a cane to be retained;

generating the cut-point data for each cane determined as a cane to be removed;

based on the number of buds to be retained, generating the cut-point data for each cane having been determined as a cane to be retained; and inputting the generated cut-point data to a controller configured or programmed to control a three-dimensional position of a cutter that cuts a cane of the fruit tree; wherein the one or more attributes include a size of buds on the cane; and the determining the one or more canes each as a cane to be removed or a cane to be retained includes:

for each of the one or more canes, determining a factor score based on the size of buds on the cane; and determining the one or more canes each as a cane to be removed or a cane to be retained based on the factor score.

10. The method of claim 9, further comprising:

acquiring information on a setting value for the number of buds to be retained; wherein the determining the one or more canes each as a cane to be removed or a cane to be retained includes:

for each of the one or more canes, among buds on the cane, determining the factor score based on a mean value of sizes of as many buds as the setting value; and determining the one or more canes each as a cane to be removed or a cane to be retained based on the factor score.

11. The method of claim 10, wherein the acquiring information on a setting value for the number of buds to be retained includes:

acquiring information on the setting value based on a user input.

12. The method of claim 10, wherein the factor score of each of the one or more canes regarding the size of buds on the cane is determined to be:

if the mean value of the sizes of buds on the cane is larger than a predetermined range, lower than when the mean value of the sizes of buds on the cane is within the predetermined range; and if the mean value of the sizes of buds on the cane is smaller than the predetermined range, lower than when the mean value of the sizes of buds on the cane is larger than the predetermined range.

13. The method of claim 12, wherein the determining the number of buds to be retained includes:

when the mean value of the sizes of buds on the cane determined as a cane to be retained is larger than the predetermined range, determining the number of buds to be retained so as to have a larger value than the setting value; and when the mean value of the sizes of buds on the cane determined as a cane to be retained is smaller than the predetermined range, determining the number of buds to be retained so as to have a smaller value than the setting value.

14. The method of claim 9, further comprising:

grouping a plurality of canes of the fruit tree into a plurality of groups based on sensor data of the plurality of canes; wherein the acquisition of the measurement value(s), the determination as to a cane to be removed or a cane to be retained, the determination of the number of buds to be retained, and the generation of the cut-point data are performed for one or more canes that are grouped into a same group among the plurality of groups.

15. The method of claim 9, wherein the one or more attributes include two or more attributes;

the method further comprises acquiring information on priority levels of the two or more attributes; and determining the one or more canes each as a cane to be removed or a cane to be retained includes:

determining the one or more canes each as a cane to be removed or a cane to be retained based on the measurement values and the priority levels.

16. The method of claim 9, further comprising:

acquiring information on a number of buds to be retained on each cane having been determined as a cane to be retained;

based on the number of buds to be retained, generating the cut-point data for each cane to be retained.

17. The method of claim 16, wherein the generating the cut-point data for each cane having been determined as a cane to be retained includes:

generating the cut-point data so that each cane having been determined as a cane to be retained includes one or more buds after being cut.

18. A system for generating cut-point data including information indicating a three-dimensional position of a point on a cane of a fruit tree where the cane is to be cut off, the system comprising:

a sensor or sensors to acquire sensor data of one or more canes of the fruit tree;

a data processor configured or programmed to generate the cut-point data for a cane of the fruit tree based on the sensor data; and a cutter to cut a cane of the fruit tree and a controller configured or programmed to control a three-dimensional position of the cutter; wherein the data processor is configured or programmed to:

based on the sensor data, for each of the one or more canes, acquire a measurement value(s) concerning one or more attributes, including an attribute concerning vigor of the fruit tree;

based on the measurement value(s), determine the one or more canes each as a cane to be removed or a cane to be retained;

based on the measurement value(s), determine a number of buds to be retained on each cane having been determined as a cane to be retained;

generate the cut-point data for each cane determined as a cane to be removed;

based on the number of buds to be retained, generate the cut-point data for each cane having been determined as a cane to be retained;

the one or more attributes include a thickness of the cane;

the determining the one or more canes each as a cane to be removed or a cane to be retained includes:

for each of the one or more canes, determining a factor score based on the thickness of the cane; and determining the one or more canes each as a cane to be removed or a cane to be retained based on the factor score;

the data processor is configured or programmed to input the generated cut-point data to the controller; and the controller is configured or programmed to control the three-dimensional position of the cutter based on the cut-point data.

19. An agricultural machine comprising the system of claim 18.

20. The agricultural machine of claim 19, further comprising:

an arm supporting the cutter, a support supporting the arm, and a driver to move the support; wherein the controller is configured or programmed to control the three-dimensional position of the cutter by controlling an operation of the arm.

* * * * *